United States Patent [19]
Tsujimoto et al.

[11] Patent Number: 5,625,764
[45] Date of Patent: Apr. 29, 1997

[54] WEIGHTED AVERAGE CIRCUIT USING DIGIT SHIFTING

[75] Inventors: Taizou Tsujimoto; Masaru Uya, both of Osaka, Japan

[73] Assignee: Matsushita Electric Industrial Co., Ltd., Osaka, Japan

[21] Appl. No.: 213,445

[22] Filed: Mar. 15, 1994

Related U.S. Application Data

[63] Continuation-in-part of Ser. No. 70,681, Jun. 2, 1993, abandoned.

[30] Foreign Application Priority Data

| Mar. 16, 1993 | [JP] | Japan | 5-054484 |
| May 26, 1993 | [JP] | Japan | 5-123731 |
| Aug. 24, 1993 | [JP] | Japan | 5-209314 |
| Jan. 31, 1994 | [JP] | Japan | 6-008960 |

[51] Int. Cl.$^6$ .................... G06T 15/00
[52] U.S. Cl. .................... 395/135; 395/131; 395/133; 395/501
[58] Field of Search .................... 395/133, 135, 395/153, 154, 162–166, 125, 126, 128–132, 141; 364/DIG. 1, DIG. 2; 345/138

[56] References Cited

U.S. PATENT DOCUMENTS

5,384,912  1/1995  Ogrinc et al. .................... 395/164

FOREIGN PATENT DOCUMENTS

63-182781  7/1988  Japan.

*Primary Examiner*—Almis R. Jankus
*Attorney, Agent, or Firm*—McDermott, Will & Emery

[57] ABSTRACT

An image blend circuit comprising a first image memory and a second image memory output pixel data according to pixel location information containing a pixel clock signal generated by an image location information supply unit, and a counter counts. Blend ratios are read from the counter and a blend ratio buffer. A data selector selects between these blend ratios according to a control signal from an attribute buffer and applies a selected blend ratio to a pixel blend unit. The pixel blend unit, depending upon the received blend ratio, translucently synthesizes or selects pixels from the first and second image memories. In an information processor, when opening a plurality of windows on a display screen produces an overlap field between the windows, such overlapped images are translucently blended for translucent image display. Therefore, the blend ratio can be set with less write information.

27 Claims, 56 Drawing Sheets

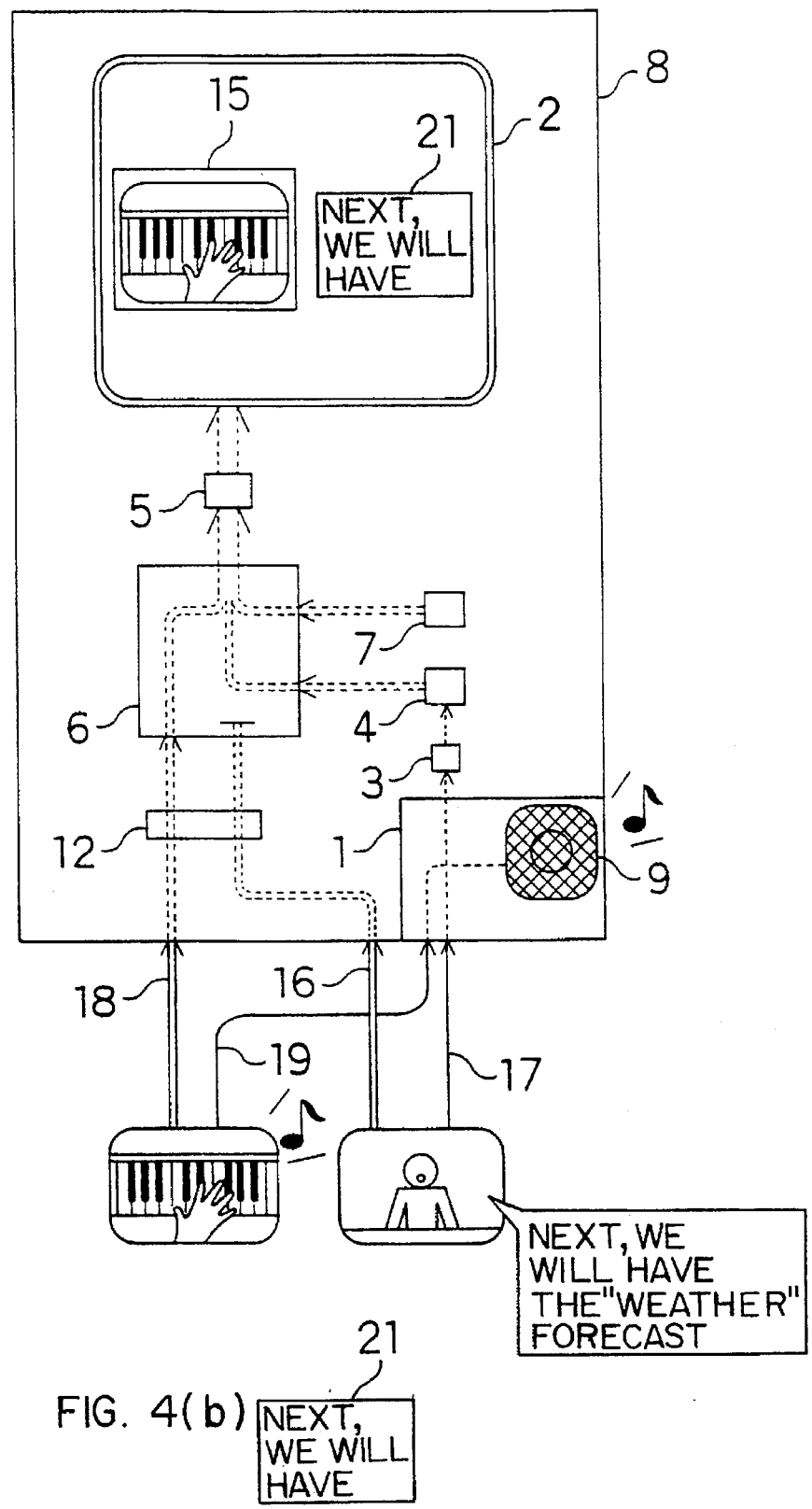

| INPUT | OUTPUT |
|---|---|
| S | Y |
| 1 | A |
| 0 | B |

FIG.13

FIG.19(a)
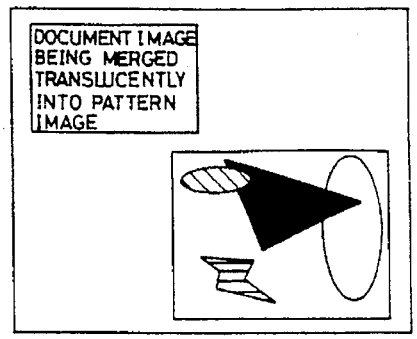
CONTENTS OF STORAGE OF FIRST IMAGE MEMORY
FIG.19(b)
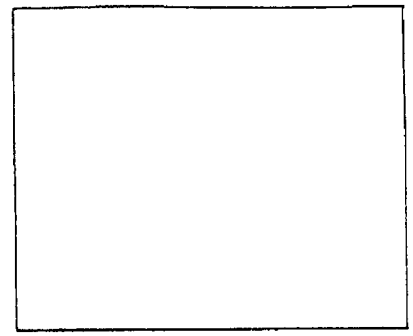
CONTENTS OF STORAGE OF SECOND IMAGE MEMORY
FIG.19(c)
10,10,10, · · · · · · · · · · ,10,10,10
10,10,10, · · · · · · · · · · ,10,10,10
DISTRIBUTION OF BLEND RATIOS STORED BY BLEND RATIO BUFFER
0,0,0,0, · · · · · · · · · · ,0,0,0,0
0,0,0,0, · · · · · · · · · · ,0,0,0,0
DISTRIBUTION OF CONTROL SIGNAL VALUES STORED BY ATTRIBUTE
FIG.19(d)
FIG.19(e)
10,10,10, · · · · · · · · · · ,10,10,10
10,10,10, · · · · · · · · · · ,10,10,10
DISTRIBUTION OF BLEND RATIOS FED TO PIXEL BLEND UNIT
COUNTER
FIG.19(f)

FIG.21(a)
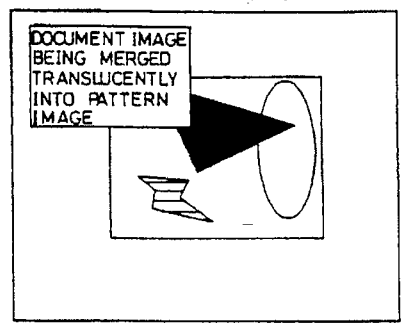
CONTENTS OF STORAGE
OF FIRST IMAGE
MEMORY
FIG.21(b)
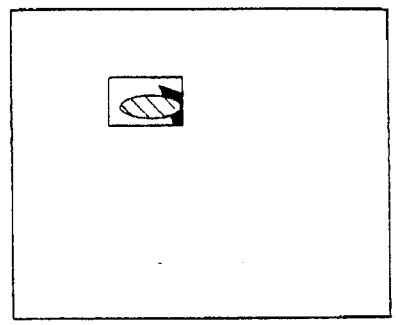
CONTENTS OF STORAGE
OF SECOND IMAGE
MEMORY
FIG.21(c)
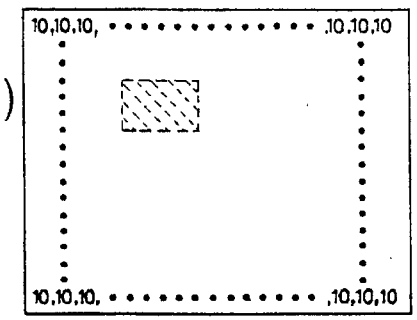
DISTRIBUTION OF BLEND
RATIOS STORED BY
BLEND RATIO BUFFER
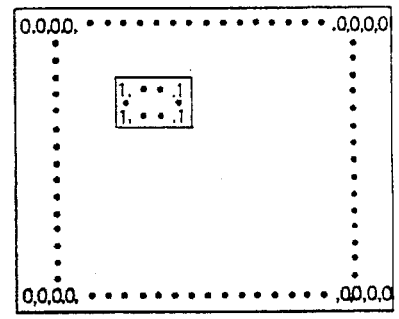
DISTRIBUTION OF
CONTROL SIGNAL VALUES
STORED BY ATTRIBUTE
FIG.21(d)
FIG.21(e)
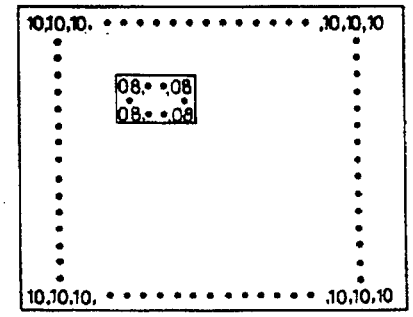
DISTRIBUTION OF BLEND
RATIOS FED TO PIXEL
BLEND UNIT
[08]
COUNTER
FIG.21(f)

| INPUT | | OUTPUT |
|---|---|---|
| S1 | S0 | Y |
| 0 | 1 | A |
| 0 | 0 | B |
| 1 | 1 | MSB = 1 OTHER BITS = 0 |
| 1 | 0 | EVERY BIT = 0 |

FIG. 23

FIG.24(a)
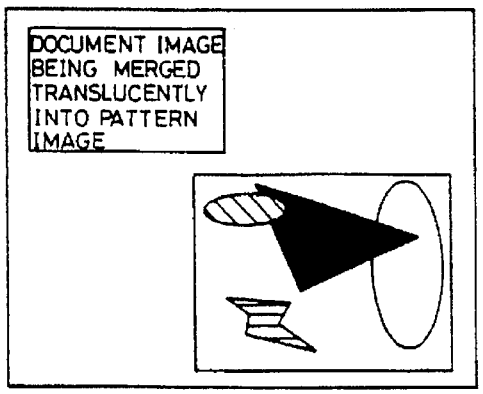
CONTENTS OF STORAGE OF FIRST IMAGE MEMORY
FIG.24(b)
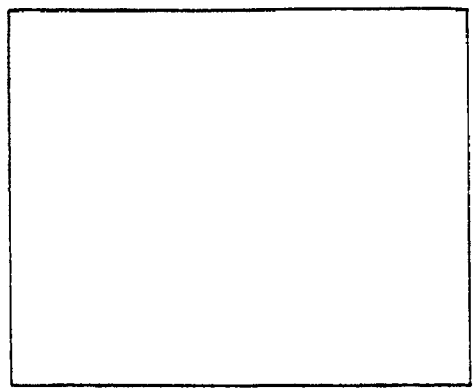
CONTENTS OF STORAGE OF SECOND IMAGE MEMORY
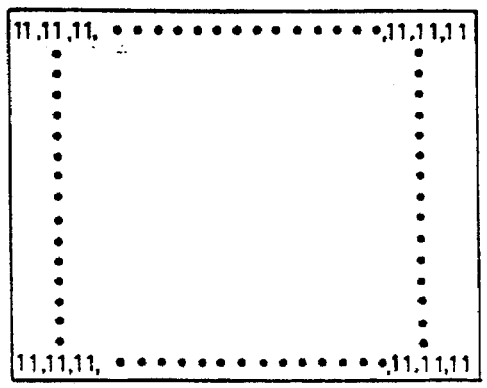
FIG.24(c)
DISTRIBUTION OF BLEND RATIOS STORED BY BLEND RATIO BUFFER
COUNTER
FIG.24(d)
```
11,11,11, • • • • • • • • • • • ,11,11,11
  •                                    •
  •                                    •
  •                                    •
  •                                    •
  •                                    •
  •                                    •
  •                                    •
  •                                    •
  •                                    •
  •                                    •
11,11,11, • • • • • • • • • • • ,11,11,11
```
FIG.24(e)
DISTRIBUTION OF BLEND RATIOS FED TO PIXEL BLEND UNIT

FIG.25(a)
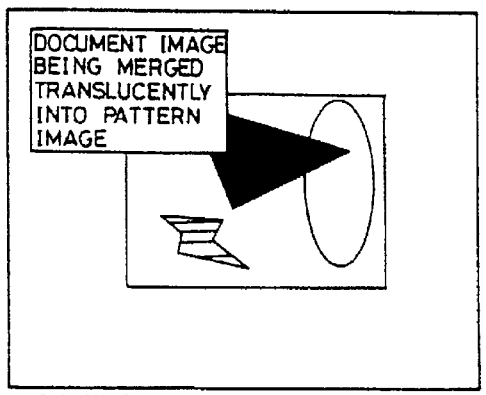
CONTENTS OF STORAGE OF FIRST IMAGE MEMORY
FIG.25(b)
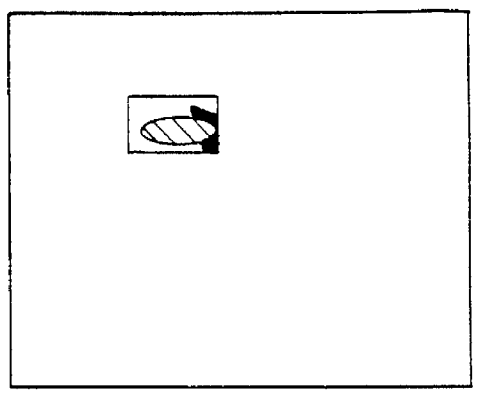
CONTENTS OF STORAGE OF SECOND IMAGE MEMORY
FIG.25(c)
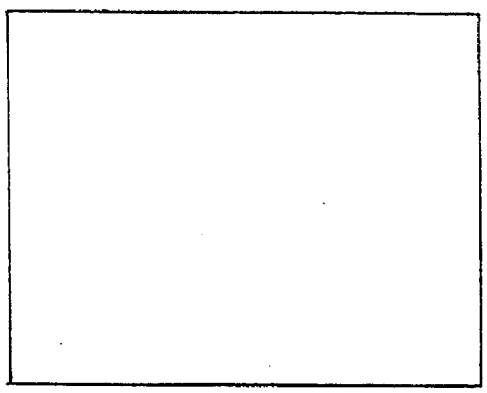
DISTRIBUTION OF BLEND RATIOS STORED BY BLEND RATIO BUFFER
FIG.25(d)
| 08 |
COUNTER
FIG.25(e)
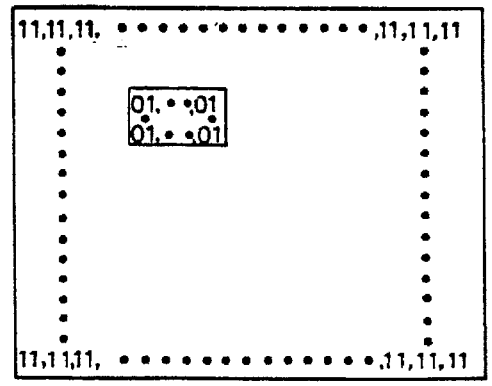
DISTRIBUTION OF BLEND RATIOS FED TO PIXEL BLEND UNIT

| COORDINATES UPPER LEFT LOWER RIGHT | PRIORITY | BLEND RATIO SELECTION [S1,S0] | REMARKS WINDOW CONTENTS | AREAS |
|---|---|---|---|---|
| (0,0)-(1151,899) | 0 | CONSTANT VALUE 1 | ROOT WINDOW | 30 |
| (50,50)-(529,349) | 1 | CONSTANT VALUE 1 | DOCUMENT | 25 |
| (450,400)-(1089,879) | 1 | CONSTANT VALUE 1 | PATTERN | 26 |

FIG. 27

| COORDINATES UPPER LEFT LOWER RIGHT | PRIORITY | BLEND RATIO SELECTION [S1,S0] | REMARKS WINDOW CONTENTS | AREAS |
|---|---|---|---|---|
| (0,0)-(1151,899) | 0 | CONSTANT VALUE 1 | ROOT WINDOW | 30 |
| (50,50)-(529,349) | 1 | CONSTANT VALUE 1 | DOCUMENT | 25 |
| (300,200)-(939,679) | 1 | CONSTANT VALUE 1 | PATTERN | 27 |
| (300,200)-(529,349) | 2 | REGISTER | IMPORTANCE IS GIVEN TO DOCUMENT PATTERN | 28 |

FIG. 28

| INPUT | | | OUTPUT | |
|---|---|---|---|---|
| A | B | CI | S | CO |
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

FIG. 32

WEIGHTED AVERAGE CIRCUIT USING DIGIT SHIFTING

This application is a Continuation-In-Part of application Ser. No. 08/070,681 filed Jun. 2, 1993 now abandoned.

TECHNICAL FIELD OF THE INVENTION

This invention generally relates to computers. In particular, it pertains to a computer which not only has audio signal input/output capability but also employs a multi-window display system.

The present invention further relates to a window controlled image blend circuit capable of displaying a translucently synthesized image in an overlapping field created between windows on a visual display screen and to a weighted average circuit incorporated into such an image blend circuit having the capability of blending two different images.

BACKGROUND OF THE INVENTION

The computer industry has continuously introduced various multi-media computers, many of which have audio signal input/output capability together with animated image display capability. Such a multi-media computer generally employs a multi-window display system to display different information simultaneously and independently on different areas called windows resulting from splitting a display screen, and plural icons are usually displayed so that an operator can activate any one of them uslng a device called a mouse.

In a conventional multi-window display system, a window, in which information that is not currently referred to by an operator is being displayed, can be closed to display an alternative to that window. i.e., an icon image with a smaller area. Thus, the area of a screen is effectively used. When closing an unnecessary window to display it as an icon image, a pattern to be applied to an icon image is read from a corresponding memory for display. Thereafter, such an icon image is displayed as a still image keeping the same pattern until it is activated to open a window.

There are a certain type of icon images capable of changing their patterns whilst being displayed on the screen of a display unit. For example, when an icon image is selected by an operator with a mouse for initiating input operations, such an icon image changes its pattern so as to indicate its current status of "being selected". For the case of an icon image of a clock, such an icon image can change its pattern so as to show time. For the case of an icon image indicative of whether an electronic mail is received, it can change its pattern when a monitoring system detects the receipt of an electronic mail. However, it will take at least a period of some several seconds for an icon image to be able to change its pattern. Any shorter period than that results in disadvantageously increasing the burden to be handled by a CPU. This prevents conventional techniques from producing an icon image which shows no awkward movements.

There are several drawbacks presented by conventional multi-media computers.

For example, with a first piece of information being displayed in a first window, and with a first audio signal corresponding to the first piece of information being output through a loudspeaker in the form of a sound, if the first window is closed and displayed as an icon image in order that a second piece of information is displayed in a second window, both the first and second audio signals will be output in the form of a sound at the same time. This causes hearing confusion to an operator.

Meanwhile, if an audio signal corresponding to information of a closed window in the form of an icon image is stopped, that is to say, if such an audio signal is not output currently through a loudspeaker in the form of a sound, this allows an operator to clearly hear a sound corresponding to information displayed in a new-opened window. However, this presents a problem that it is most hard for an operator to visually realize theft there exists a concealed sound behind a closed window now in the form of an icon image, since such a closed window is displayed as a still image with no movements.

Recently, user-friendly information processors such as personal computers and workstations have been developed. Several windows are opened at the same time on a display screen so that different information items can be displayed in such opened windows. Additionally, in some information processors, video signals are input for live-video image display in a window.

In conventional information processors, for example, if two different windows are opened at a time to create an overlapping field between the windows, one of these two windows becomes a foreground scene so that its entire information can be displayed without any "wane", while the other window becomes a background scene so that its entire information cannot be displayed. In other words, the background scene window is partly hidden by the foreground scene window. The amount of displayable information on a display screen is restricted by the screen size. The operator must change the foreground-to-background scene hierarchically relationship between overlapping windows or drag an obstructive window from over a target window if the operator wants to view information hidden, which is troublesome.

A solution to the above-described problem may be given employing an image translucent synthetic technique used in the field of television broadcast, more specifically, by introducing such a technique into a multiwindow information processor. For example, every pixel is assigned a respective blend ratio $\alpha$ ($0 \leq \alpha \leq 1$). Each blend ratio $\alpha$ is stored at and read from a blend ratio buffer. PIXEL A of a window and PIXEL B of another window are blended by a pixel blend system according to the following calculation formula:

$$\alpha \times A + (1-\alpha) \times B \qquad \text{(i)}$$

This allows a translucently synthesized image to be displayed at a window overlapping filed. Since the blend ratio can be determined for every pixel, the setting of the blend ratio can be made with more flexibility.

The above-described image blend system contains a weighted average circuit used to blend two pixels. Three different types of weighted average circuits are known in the art.

FIG. 57 shows a first type of weighted average circuit used to blend images. The first type weighted average circuit comprises two multipliers 632 and 633 each of which performs calculations according to the calculation formula (i) and an adder 634.

FIG. 58 shows a second type weighted average circuit used to blend images. The second type weighted average circuit is formed by a subtracter 635, a multiplier 636, and an adder 637 for performing calculations according to the following calculation formula as a result of changing the calculation formula (i):

$$\alpha \times (A-B) + B \qquad \text{(ii)}$$

FIG. 59 shows a third type weighted average circuit used to blend images. The third type weighted average circuit is formed by an adder 638 and n selectors (only four selectors 639, 640, 641, and 642 are shown in the figure). Weights are set with respect to the adder 638 as follows. If the number of selectors is n, n weights 1/2, 1/4 ... $1/2^n$ are set in such a way that these n weights form a geometrical progression of a common ratio of 1/2. Each of the n selectors selects either one of input A and input B both represented by binary numbers, as a result of which n values are selected by the n selectors. Each of the n values is multiplied by an assigned weight, thereafter those products being summed for image blend.

In the above-described conventional weighted average circuit, every pixel is given a respective blend ratio. Although various types of translucently synthesized images may be set and the flexibility of image display is good, the conventional weighted average circuit, however, produces the problem that all the blend ratios assigned to pixels forming a window must be updated one by one. As a result, the updating of blend ratios cannot be carried out at high speed. This gives a poor response time when, for example, moving a window from one place to another. Such a problem becomes more serious when the number of blend ratio change steps is increased so as to smoothly perform translucent image change at the time of the change in blend ratio. The number of bits necessary for representing blend ratios by binary numbers increases. This gives a poorer response time in updating blend ratios.

The first type weighted average circuit requires two multipliers so that it becomes large in circuit size.

The second type weighted average circuit, compared with the first type weighted average circuit, employs only one multiplier so that it does not become large in circuit size. The second weighted average circuit, however, suffers from a problem. Use of a subtracter produces some points within the circuit where a negative number must be represented for transmission. At such points, arithmetic operation corresponding to the negative number is performed. This somewhat complicates circuit organization. Since the number of arithmetic operation circuit levels is great, this not only lengthens the time required for calculation (i.e., delays in signal transmission) but also decreases the speed of operation.

The third type weighted average circuit, formed by selectors and a multi-input adder, has nearly the same circuit size and operation speed as a single multiplier. The third type weighted average circuit, however, suffers from the problem that its actual output value does not preciously agree with $\alpha \times A + (1-\alpha) \times B$. The actual output value becomes $K \times \{\alpha \times A + (1-\alpha) \times B\}$ ($K=(2^n-1)/2^n$, slightly smaller than 1). The brightness of video signals is decreased.

If the blend ratio $\alpha=1$ or the blend ratio $\alpha=0$ (i.e., if the blending of plural input signals is not required), it should be sufficient to select one from among input signals and output the as-selected input signal with no calculations involved. Even in such a condition, each conventional weighted average circuit, however, performs unnecessary calculations based on the blend ratio. This increases the amount of power consumption.

In the third type weighted average circuit, if the number of bits for a blend ratio is increased and the number of bits for an adder is correspondingly increased in order to designate the value of the blend ratio a at short intervals, this may produce a problem. More specifically, when a blend ratio represented by many bits is designated, this may give rise to such a situation that another different blend ratio represented by a smaller number of bits can be used with the same blend operation effect. In such a case, unnecessary power is consumed.

SUMMARY OF THE INVENTION

Bearing in mind the foregoing disadvantages in the prior art techniques, the present invention was made. It is a general object of this invention to provide an improved computer which not only has audio signal input/output capability but also employs a multi-window display system. In accordance with a computer of the present invention, even when a window is displayed as an icon image on the screen of a display unit while an audio signal corresponding to that window is not output through a loudspeaker in the form of a sound, this situation can be realized visually by an operator. In other words, this allows an operator to learn that there exists a concealed sound behind an icon image without causing any difficulties in hearing to the operator.

A first computer in accordance with the invention comprises (a) a display unit for displaying different information on different windows assigned on its screen, (b) an audio signal input/output unit for receiving a plurality of external audio signals, and for outputting a particular audio signal selected from among all the audio signals in the form of a sound, (c) an audio information extract unit for extracting real-time information from an audio signal other than the particular audio signal, (d) an icon image generator for generating an animated icon image according to the real-time information, and (e) a display controller for exerting control to make the display unit display the animated icon image on the screen in stead of displaying information corresponding to the audio signal from which the real-time information has been extracted.

A second computer in accordance with the invention comprises (a) a display unit for displaying different information on different windows assigned on its screen, (b) an audio signal input/output unit for receiving a plurality of external audio signals, and for outputting a particular audio signal selected from among all the audio signals in the form of a sound, (c) an audio information extract unit for extracting real-time information from an audio signal other than the particular audio signal, (d) an icon image generator for generating an animated icon image according to the real-time information, (e) a display controller for exerting control to make the display unit display the animated icon image on the screen in stead of displaying information corresponding to the audio signal from which the real-time information has been extracted, and (f) a comparator for making a comparison between the real-time information and information predetermined by an operator so as to detect whether comparison requirements are satisfied, and for delivering a detection signal to control the audio signal input/output unit or both the icon image generator and the display controller upon detecting the comparison requirements to be satisfied.

In accordance with the invention, with first information displayed in a first window, and with a first audio signal corresponding to the first information output through a loudspeaker in the form of a sound after selected by an audio signal input/output unit, if second information is displayed in a second window while at the same time a second audio signal corresponding to the second information is output through the loudspeaker after selected by the audio signal input/output unit, this stops the first audio signal from being output through the loudspeaker. Then, from the first audio signal which is not currently output in the form of a sound through the loudspeaker, real-time information is extracted, such as the level of volume, a sentence as a result of the speech recognition, and a pair of a pitch and a length as a result of the musical note recognition or a sound source if audio signals represent a music sound. According to such real-time information, animated icon images are produced, such as an image which changes its size with time, an image of a volume level indicator which indicates the level of volume with time, or a caption which represents a sentence with time. In stead of displaying the first information corresponding to the first audio signal which has been stopped, the display unit displays such an animated icon image on the screen. This makes an operator able to realize visually that there exists a concealed sound behind an icon image, without causing any difficulties in hearing to the operator.

Especially, changing the size of an icon image is a most attractive way for an operator to realize the above-described condition.

Additionally, if a sentence, resulting from the speech recognition of an audio signal which is currently prevented from being output through a loudspeaker, is designed to be displayed on a screen, this allows an operator to easily monitor information not currently displayed due to a window containing such information being displayed as an icon image. Accordingly, an operator can timely activate such an icon image to re-open that window to obtain without fail every piece of information which has not been displayed by then.

The above-described case, however, presents such a problem that an operator cannot obtain desired information due to some working situation which prevents him or her from intensively monitoring an icon image on display although such information as to the contents of an audio signal which is currently prevented from being output in the form of a sound is displayed as an icon image. This problem, however, is eliminated by means of a comparator to which for example, a character string representing information that an operator wants to hear is previously established. Such a comparator makes a comparison between real-time information extracted from an audio signal which is not currently output through a loudspeaker in the form of a sound (for example, a sentence as a result of recognizing speech within that audio signal) and the previously established information. When the comparator detects requirement conditions to be satisfied, that is to say, when an audio signal which is not output currently in the form of a sound is found to carry information that an operator wants to hear, an audio signal input/output unit is so controlled that such an interrupted audio signal automatically starts being output in the form of a sound. At the same time an icon image generator and a display controller are also controlled to bring the generation of icon images to a halt, and meanwhile a display unit automatically displays information corresponding to the audio signal which has been stopped by then, instead of displaying a corresponding icon image. Accordingly, this enables an operator not only to monitor information contained in an audio signal which is not output currently in the form of a sound but also to timely hear such information without fail.

It is an object of the present invention to provide an image blend circuit suitable for use with a multi-window information processor capable of permitting rapid response to, for example, movement of a translucently synthesized widow to effectively use a display screen surface.

It is another object of the present invention to provide a weighted average circuit capable of blending plural input signals such as video signals with high precision to suppress the decrease in image brightness.

It is still another object of the present invention to provide a weighted average circuit in which the operation of an addition circuit is limited so that it operates only at a particular stage to reduce the amount of power consumption.

It is a further object of the present invention to provide a weighted average circuit in which, if the blending of a plurality of input signals at a given blend ratio can be calculated by a portion of a relatively small number of bits of an addition circuit, the remaining redundant part of the addition circuit is made not to operate, thereby reducing the amount of power consumption.

The present invention discloses an image blend circuit in which a blend ratio buffer is provided which stores individual blend ratios of all of the pixels of a display screen space and a blend ratio hold means is provided which stores a single blend ratio that is shared when translucently synthesizing plural pixels at a field where windows are overlapped.

In the present invention, weights for an addition circuit are adequately set so that the blending of plural input video signals can be carried out with high precision.

The present invention discloses a weighted average circuit in which a constant value is given to an addition circuit so that it stops operating if a blend ratio has a value equivalent to selecting one from among plural input signals, and a selector is provided which selects an input signal.

The present invention discloses a weighted average circuit in which two addition circuits are provided so that, if the blending of plural input signals at a given blend ratio can be made by a portion of an addition circuit of a relatively small number of bits, such blend is performed by one of these two addition circuits.

More specifically, the present invention discloses an image blend circuit that is window-controlled so as to display a translucently synthesized image at an overlapping field of windows opened on a display screen. This image blend circuit comprises:

(a) a pixel location information supply means which outputs pixel location information containing a synchronous pixel clock signal so as to display an image on the display screen by means of a raster scan technique, (b) a plurality of image output means each of which sequentially outputs pixel information about an image whose dimensions are the same as those of the display screen according to the pixel location information, (c) a blend ratio buffer means which stores items of blend ratio information set to pixels of the display screen and sequentially outputs the stored blend ratio information items according to the pixel location information, (d) a blend ratio hold means which stores a single item of blend ratio information and repeatedly outputs the stored blend information item according to the pixel location information, (e) an attribute buffer means which stores items of selection information set to each pixel of the display screen and sequentially outputs the stored selection information items according to the pixel location information, (f) a data selection means which selects between the blend ratio information from the blend ratio buffer means and the blend ratio information from the blend ratio hold means and outputs selected blend ratio information according to the selection information from the attribute buffer means, (g) a pixel blend means which synchronous-inputs the image information items from the plurality of image output means and the blend ratio information from the data selection means according to the pixel location information, blends the input image information items according to the input blend ratio information, and outputs blended image information, and (h) a window control means which, in order to display a target image in each of a plurality of windows opened on the display screen, stores window locations, window shapes, window dimensions, and display objects as control information, updates the control information at an operator's request, and forms and updates data held by the blend ratio buffer means and the attribute buffer means depending on the stored control information.

The present invention discloses a modification of the above-described image blend circuit wherein the pixel blend means includes a plurality of weighted average means each of which blends pixel information items from the plural image output means by color component, each weighted average means comprising:

(a) an addition means which inputs j signals represented by the base i number system, multiplies the j signals by j weights respectively, sums those products, and outputs a sum in the form of a signal represented by the base i number system, (b) j selection means each of which selects among m digital input signals represented by the base i number system, wherein j signals selected by the j selection means are applied to the addition means, and (c) a control means, on receipt of a blend ratio, controls the j selection means so that m digital input signals are merged at the received blend ratio, wherein the total of the j weights is set to an integral multiple of a product of the maximum value of the j weights and the number i, with those numbers i, j, and m being integers equal to or greater than 2.

The present invention discloses another modification of the above-described image blend circuit wherein the pixel blend means includes a plurality of weighted average means each of which blends pixel information items from the plural image output means by color component. Each weighted average means comprises:

(a) an addition means which inputs j signals represented by the base i number system, multiplies the j signals by j weights respectively, sums those products, and outputs a sum in the form of a signal represented by the base i number system, (b) j first selection means each of which selects one from among m digital input signals represented by the base i number system and a constant value signal, wherein j signals selected by the j first selection means are applied to the addition means, (c) a second selection means which selects one from among the output signal of the addition means and the m digital input signals, wherein the total of the j weights is set to an integral multiple of a product of the maximum value of the j weights and the number i, and (d) a control means, on receipt of a blend ratio, controls the j first selection means and the second selection means depending on the received blend ratio, with those numbers i, j, and m being integers equal to or greater than 2.

The present invention discloses a modification of the above-described image blend circuit wherein the pixel blend means includes a plurality of weighted average means each of which blends pixel information items from the plural image output means by color component. Each weighted average means comprises:

(a) first addition means which receives j signals as a result of summing a first signal set formed by k signals represented by the base i number system and a second signal set of j–k (j>k) signals represented by the base i number system, multiplies the j signals by j weights respectively, sums those products, and outputs a sum in the form of a signal represented by the base i number system, (b) k third selection means each of which selects one from among m digital input signals represented by the base i number system, wherein k signals selected by the k third selection means are applied to the first addition means as the first signal set, (c) second addition means which receives n signals, multiplies the n signals by n weights respectively, sums those products, and outputs a sum in the form of j–k signals represented by the base i number system, (d) j–k fourth selection means which are provided so as to correspond to the number of output signals of the second addition means and each of which selects one from among j–k output signals of the second addition means and the m digital input signals, wherein the j–k signals selected by the j–k fourth selection means are applied to the first addition means as the second signal set, (e) n fifth selection means each of which selects one from among the m digital input signals and a constant value signal represented by the base i number system, wherein n signals selected by the n fifth selection means are applied to the second addition means, and (f) control means, on receipt of a blend ratio, controls the j selection means so that m digital input signals are merged at the received blend ratio, with the numbers i, j, m, and n being integers equal to or greater than 2 and the number k being a natural number.

In accordance with the image blend circuit of the present invention, all the pixels being resolved are assigned corresponding blend ratios stored by the blend ratio hold means or by the blend ratio buffer. If a window overlap occurs, the window control means updates the contents of the blend ratio buffer and the attribute buffer for translucent synthesis of pixels at such an overlap field.

If an overlap field value of the attribute buffer is set so as to select an overlap field value, held by the blend ratio hold means as an overlap field blend ratio, movement and modification of the overlap filed due to window movement can be dealt with by updating the contents of the attribute buffer. Since the number of bits per pixel required by the attribute buffer is lower than that of the blend ratio buffer, the updating of the contents of the attribute buffer requires a less amount of write data as compared with the updating of the contents of the blend ratio buffer. Additionally, the change in overlap field blend ratio can be made by rewriting values held by the blend ratio hold means.

In the weighted average circuit of the present invention, the total of weights is an integral multiple of a product of i and the maximum value of all the weights. Here, that the weight total is an integral multiple of a product of i and the maximum value of all the weights and that the weight total is 1 are equivalent in circuit organization constraints.

Weighting depends on digit shift so that the maximum weight value can be written $1/i^m$. If the weight total is $i^s$ times the maximum weight value i, its value is $i^{(s-m)}$ and the value of output can be written $i^{(s-m)} \times \{\alpha \times A + (1-\alpha) \times B\}$. The output value can freely be aligned by decimal point, because of which the output value can be multiplied or divided by an integral multiple of a product of i and the maximum value of all the weight. Therefore, decimal point alignment can be carried out in such a way that the output value can be written $\alpha \times A + (1-\alpha) \times B$. This may be regarded as a multiplication of an output times a factor of $i^{(m-s)}$ by digit shift, or as a multiplication of each weight times $i^{(m-s)}$. As described above, it is possible to change each weight value so that the weight total becomes 1 by rearranging digit places without any modification made to the circuit organization. Conversely, if the weight total=1 (i.e., $i^m$ times the maximum weight value $1/i^m$), this meets the requirement that the weight total is an integral multiple of a product of i and the maximum weight value. Therefore, as mentioned above, that the total of weights is an integral multiple of a product of i and the maximum value of all the weights) and that the total of weights is 1 are equivalent in circuit organization constraints.

According to the weighted average circuit of the present invention, the weight total is set to an integral multiple of a product of i and the maximum value of the j weights and the weight total is 1. As a result, $\alpha \times A + (1-\alpha) \times B$ can be calculated correctly. The decrease in brightness can be prevented. The present weighted average circuit has about the same circuit size and performance speed as a single multiplier formed by AND gates and multiinput addition circuits.

Additionally, it is the first selector that determines outputs when a digital input signal is selected. Then, the second selector applies a constant value to the addition circuit. Therefore, the addition circuit will consume no alternating current.

Finally, in cases where the blend ratio can be realized by the sum of relatively heavy weights only, the third and fourth selectors each select one of the m digital input signals as an input to the first addition circuit for adding operations and all of the fifth selectors each select a constant value so that the second addition circuit stops operating. This reduces the amount of power consumption.

BRIEF DESCRIPTION OF THE DRAWINGS

In the accompanying drawings in which:

FIG. 4 shows how a computer of a third embodiment of the invention operates;

FIG. 13 is a function table of a data selector of FIG. 12;

FIG. 19 shows an example in which two different items of information are not overlapped;

FIG. 21 shows the contents of storage of each means in the case of FIG. 20;

FIG. 23 is a function table of a data selector of FIG. 22;

FIG. 24 shows the contents of storage of each means in the case of FIG. 18;

FIG. 25 shows the contents of storage of each means in the case of FIG. 20;

FIG. 27 shows an example of the contents of storage of a window information storage unit of FIG. 26 in such a case where windows are not overlapped;

FIG. 28 shows an example of the contents of storage of the window information storage unit of FIG. 26 in such a case where windows are overlapped;

FIG. 32 is an operation true table of a 1-bit full adder;

PREFERRED EMBODIMENTS OF THE INVENTION

With reference to the accompanying drawings, preferred embodiments of the present invention are now described below. In this invention, by "to display a signal on a screen" or "a signal is displayed on a screen", what is meant is that information corresponding to a signal is displayed as an image on a screen.

First embodiment

Figure 1:
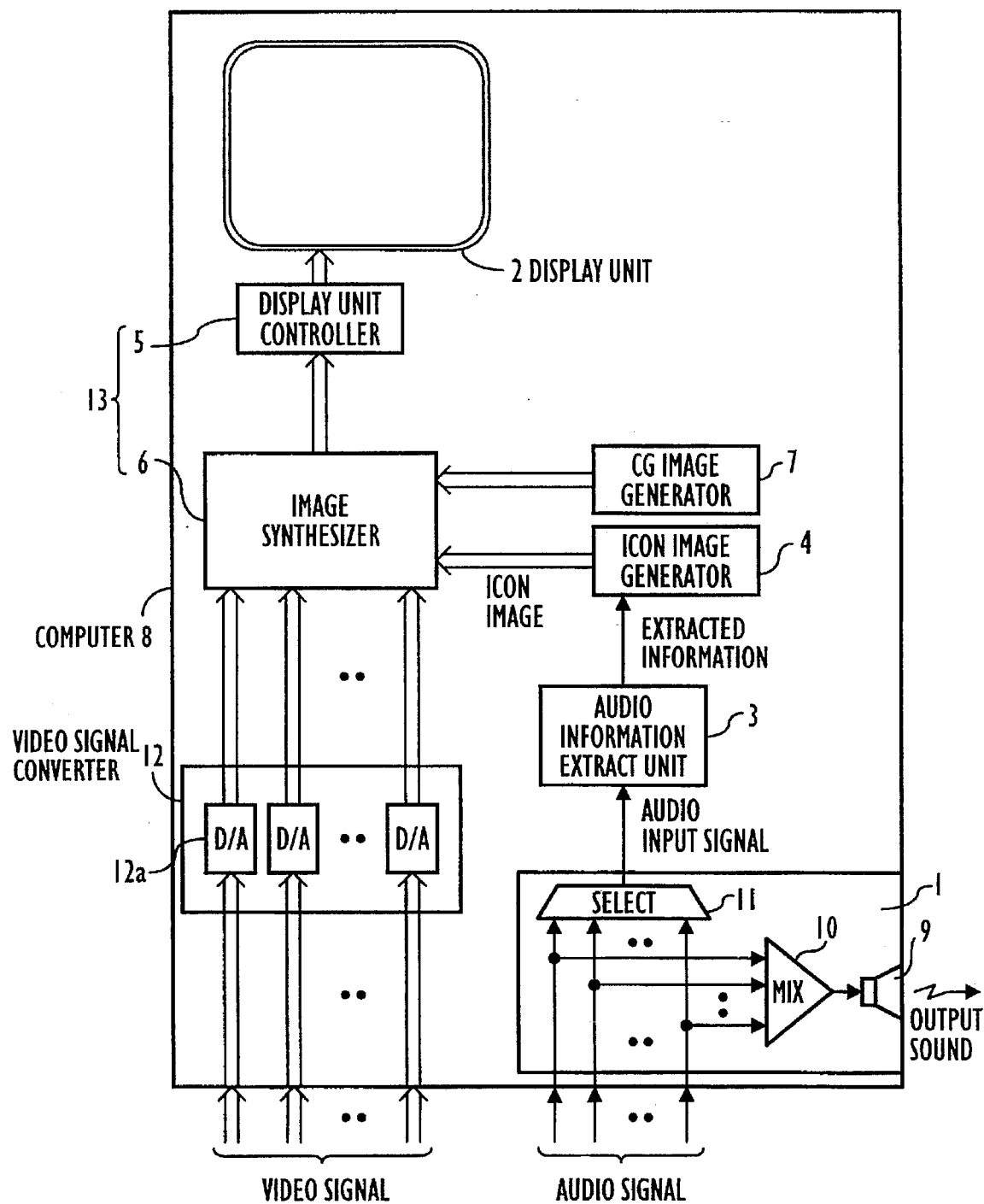
FIG. 1 is a block diagram showing the configuration of a computer of a first embodiment of the invention.

FIG. 1 schematically shows a computer 8 which comprises an audio signal input/output unit 1, a display unit 2, an audio information extract unit 3, an icon image generator 4, a display unit controller 5, an image synthesizer 6, a CG (computer graphic) image generator 7, and a video signal converter array 12.

The audio signal input/output unit 1 is fed with external audio signals, and is composed of a loudspeaker 9, an audio signal mixing/amplifying unit 10, and an audio signal selector 11. The audio signal mixing/amplifying unit 10 has a mixing function so that it can perform the function of weighting each audio signal according to a predetermined weight. After summing numerical values obtained by such weighting, the audio signal mixing/amplifying unit 10 outputs calculation results through the loudspeaker 9. Further, this mixing function of the audio signal mixing/amplifying unit 10 includes a selective output function so as to exclusively output a particular audio signal selected from among the audio signals, or to stop outputting a particular audio signal. The foregoing weight is variable. The audio signal selector 11 performs the function of selecting from among the audio signals an audio signal, which has been prevented from being output due to the selective output function of the audio signal mixing/amplifying unit 10, to output it.

Although not shown in FIG. 1, the display unit 2 has a plurality of windows on its screen.

Upon receiving an audio signal delivered from the audio signal selector 11, the audio information extract unit 3 extracts a volume level of that audio signal as real-time information.

Figure 2A:
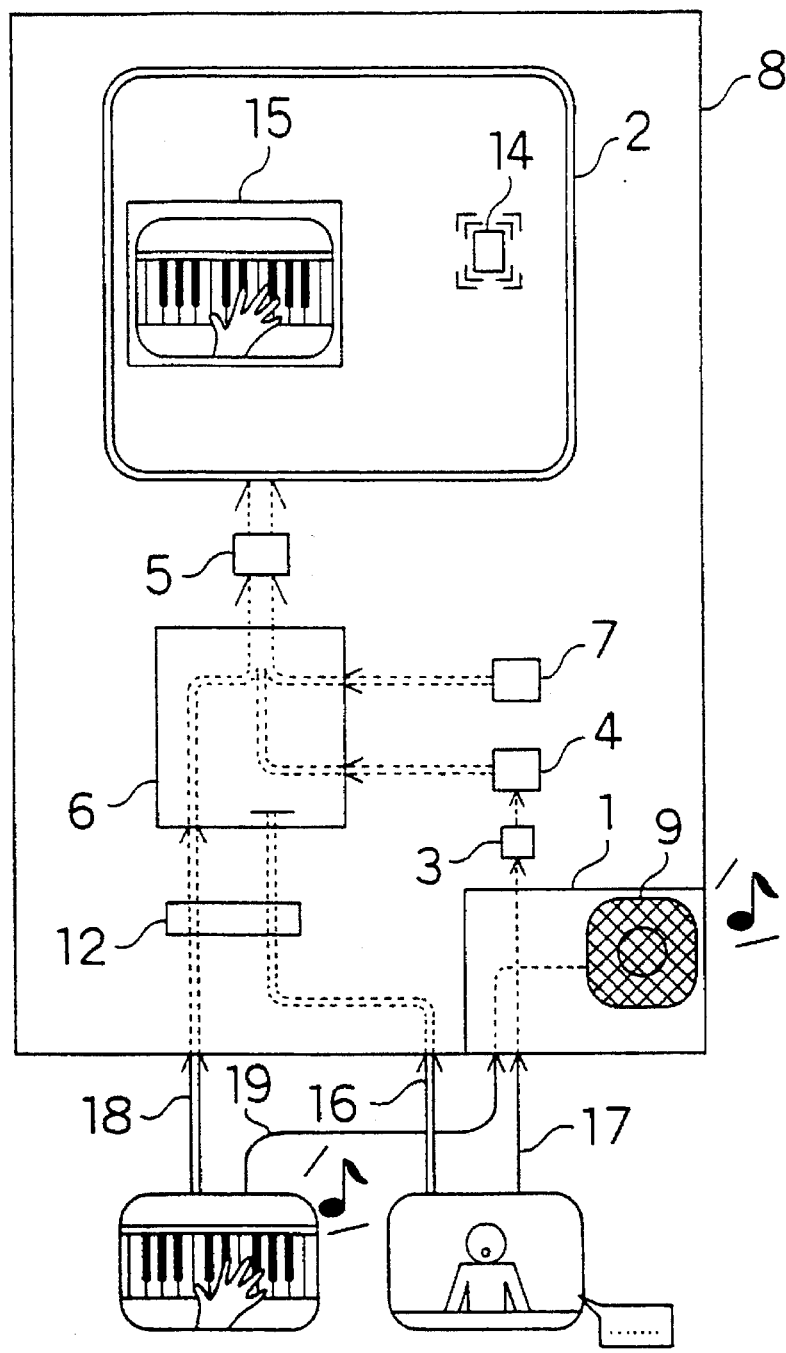
FIG. 2 shows how the computer of the first embodiment operates.

According to the volume level extracted by the audio information extract unit 3 as real-time information, the icon image generator 4 generates an icon image. More specifically, the icon image generator 4 generates, according to the extracted volume level, an icon image whose size varies with time as shown in FIG. 2(c). This makes such an icon image look animated.

Figure 2B:
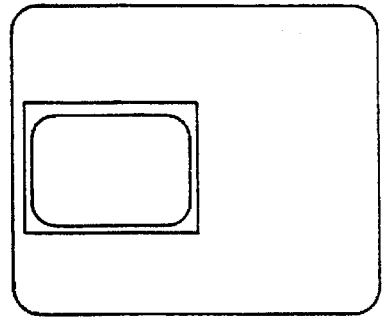
Figure 2C:

As shown in FIG. 2(b), the CG image generator 7 performs the function of generating a still image which serves as a window on the screen of the display unit 2.

The video signal converter array 12 comprises plural digital-to-analog converters (DAC's) 12a. Each of the DAC's 12a converts analog video signals into digital video signals, thereafter outputting them.

The image synthesizer 6 performs the function of selecting a predetermined video signal from among the video signals delivered from the video signal converter array 12 so as to display the selected video signal in a window generated by the CG image generator 7. The image synthesizer 6 performs the further function of synthesizing video signals, static images, and icon images in order to display an icon image generated by the icon image generator 4 on a predetermined area of the screen of the display unit 2.

Based on a signal synthesized by the image synthesizer 6, the display unit controller 5 performs the function of controlling the display unit 2 so that a video signal and an icon image are displayed on the screen of the display unit 2.

The display unit controller 5 and the image synthesizer 6 together constitute a display controller 13. Under control of the display controller 13, an icon image generated by the icon image generator 4 is displayed on the screen of the display unit 2 in stead of information corresponding to the audio signal from which the real-time information has been extracted.

The operation of the computer 8 with the above-described configuration is explained by reference to FIG. 2. In FIG. 2, an icon image resulting from closing or iconizing a window is indicated by reference numeral 14, an image displayed in another window by reference numeral 15, a first video animation signal by reference numeral 16, a first audio signal corresponding to the first video animation signal 16 by reference numeral 17, a second video animation signal by reference 18, a second audio signal corresponding to the second video animation signal 18 by reference numeral 19. Although neither the audio signal mixing/amplifying unit 10 nor the audio signal selector 11 is not shown in FIG. 2, their functions are represented by the flow of signals.

As an example, consider a case in which, with the first video animation signal 16 (announcer) being displayed in a first window of the screen of the display unit 2, and with the first audio signal 17 (voice tone) being output through the loudspeaker 9, the second video animation signal 18 (pianist), is displayed on a second window and the second audio signal 19 (piano sound) is output in the form of a sound through the loudspeaker 9 after it is selected at the audio signal input/output unit 1. This case is explained below.

In this case, the audio signal mixing/amplifying unit 10 (not shown) prevents the first audio signal 17 from passing through the loudspeaker 9. This first audio signal 17 which is stopped by the unit 10 is forwarded to the audio information extract unit 3 from the audio signal selector 11. The audio information extract unit 3 then extracts a volume level from the first audio signal 17 as real-time information, thereafter forwarding it to the icon image generator 4. The icon image generator 4 reduces or enlarges the size of a predetermined icon image according to the volume level extracted by the audio information extract unit 3 thereby producing an animated icon image. After being combined with the second video animation signal 18 by the image synthesizer 6, such an animated icon image is displayed on the screen of the display unit 2 under control of the display controller 5, as the animated icon image 14.

The animated icon image 14 varies its size in order to show an operator the fact that it corresponds to the second audio signal 17, as a result of which it is most easy for an operator to visually recognize that the audio signal 17 is correspondingly existent with respect to the icon image 14.

Since the loudspeaker 9 sends out only the second audio signal 19 (piano sound) while the first audio signal 17 (voice tone) is being stopped, this causes no problems of operator's hearing piano sounds.

In the foregoing description, the animated icon image 14 is generated according to the volume level of the first audio signal 17 which is not output currently in the form of a sound through the loudspeaker 9. By changing the icon image 14 into a much more conspicuous one at the point that the volume level of the first audio signal 17 goes beyond a predetermined value, it is possible to monitor excessive volume levels.

Second Embodiment

Figure 3A:
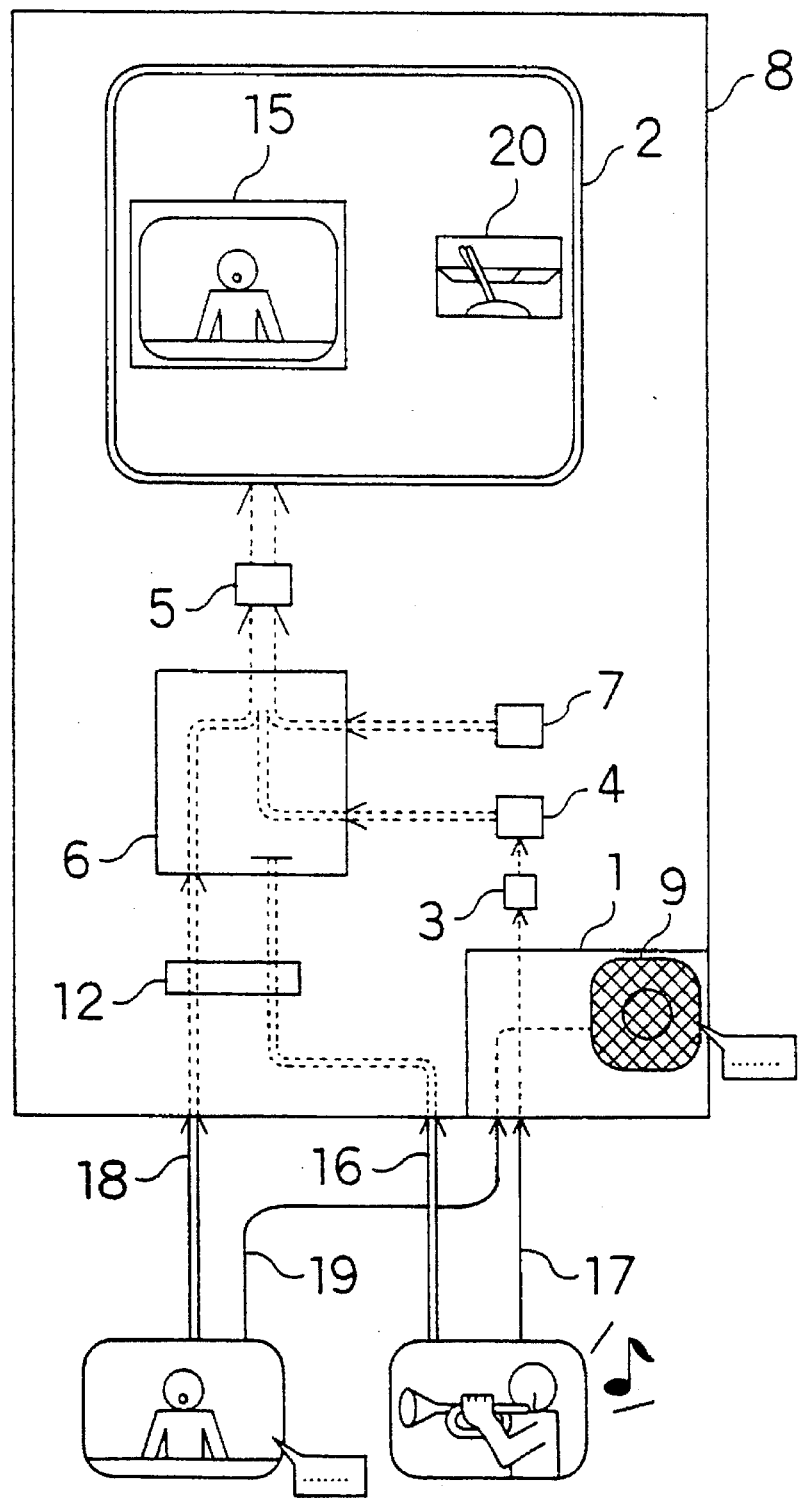
FIG. 3 shows how a computer of a second embodiment of the invention operates.
Figure 3B:
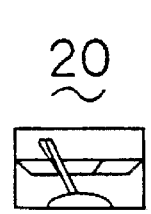

A second embodiment of the present invention is described by referring to FIG. 3. The first video animation signal 16, which corresponds to the audio signal 17 which is not output currently in the form of a sound through the loudspeaker 9, represents an animated image of a trumpeter. The icon image generator 4 generates an animated icon image 20 of a volume level indicator as shown in FIG. 3(b) which indicates, with time, volume levels extracted by the audio information extract unit 3 from the audio signal 17 (trumpet sound).

This embodiment makes it possible for an operator to monitor the volume level of the audio signal 17 which is not output currently in the form of a sound through the loudspeaker 9.

Third Embodiment

A third embodiment of the present invention is described by reference to FIG. 4. Here, the first video animation signal 16, which corresponds to the audio signal 17 which is not output currently in the form of a sound through the loudspeaker 9, represents an animated image of an announcer who is reading something, say, an item of news. The audio information extract unit 3 extracts a sentence as real-time information by means of the speech recognition of the audio signal 17 (for example, such a sentence may be "Next, we will have the weather forecast..." as shown in FIG. 4). The icon image generator 4 meanwhile generates an animated news caption 21 (FIG. 4(a,b)) according to the sentence extracted by the audio information extract unit 3.

In this embodiment, it is possible to monitor the contents of the audio signal 17 which is not output currently in the form of a sound through the loudspeaker 9.

Fourth Embodiment

Figure 5A:
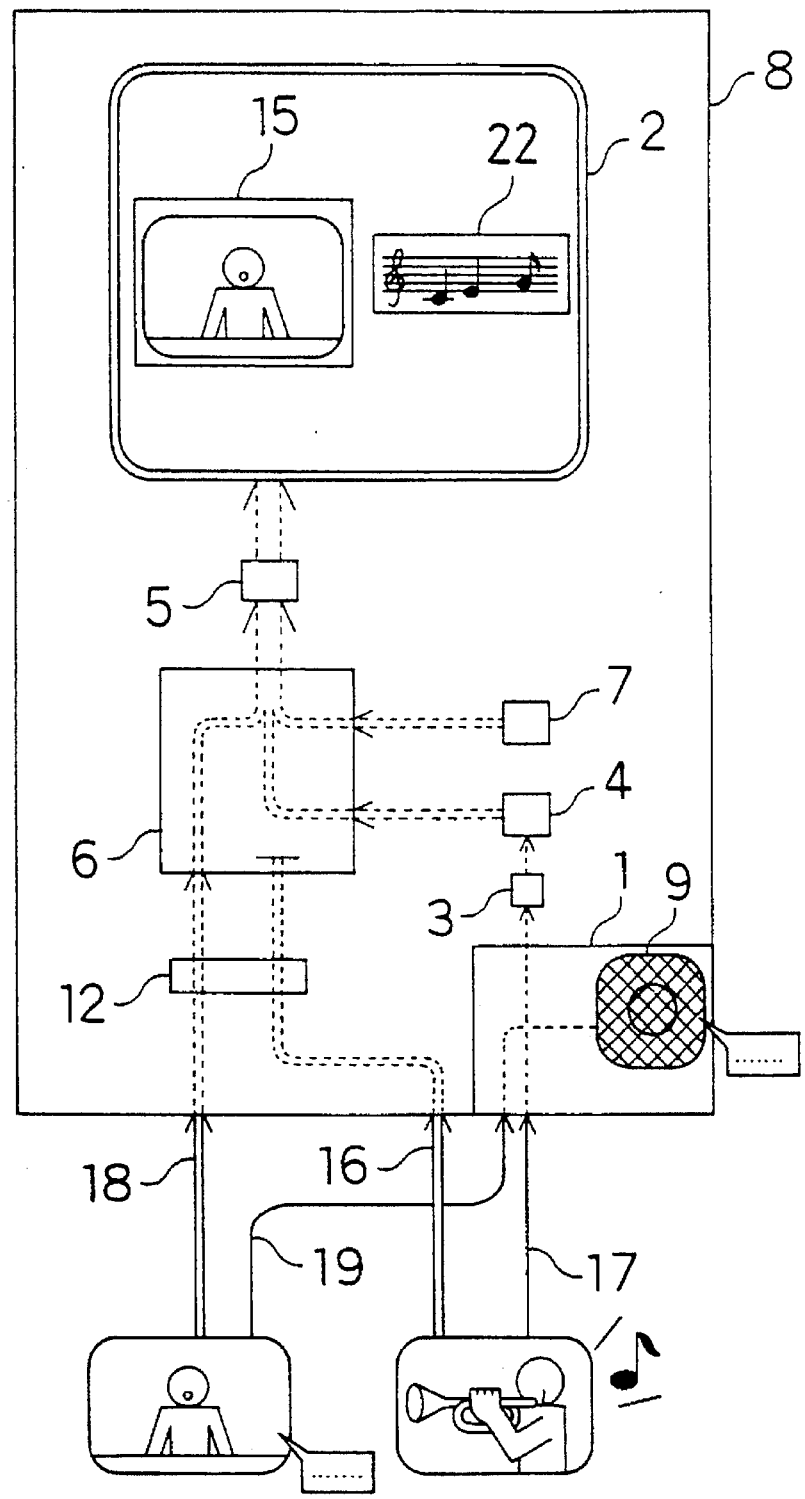
FIG. 5 shows how a computer of a fourth embodiment of the invention operates.
Figure 5B:
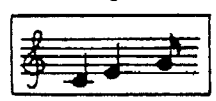

A fourth embodiment of the present invention is described by reference to FIG. 5. The first video animation signal 16, which corresponds to the audio signal 17 which is not output currently in the form of a sound through the loudspeaker 9, represents an animated image of a trumpeter. The audio information extract unit 3 extracts, with time, a pair of a pitch and a length as real-time information by recognizing the musical note within the audio signal 17 (trumpet sound). The icon image generator 4 meanwhile generates a music sheet 22 as an animated icon image carrying thereon musical notes (each of which has a pair of a pitch and a length) extracted by the audio information extract unit 3 from the audio signal 17.

In this embodiment, it is possible to monitor the contents of an audio signal which is not output currently in the form of a sound through the loudspeaker 9. Because of this, such a monitor function is most beneficial when audio signals represent music sounds. Additionally, automatic transcription is made available by storing in a storage medium a music sheet composed automatically with extracted musical notes. Further, it is also possible to monitor the process of automatic transcription by displaying the music sheet as an animated icon image in real time while at the same time storing it.

Fifth Embodiment

Figure 6A:
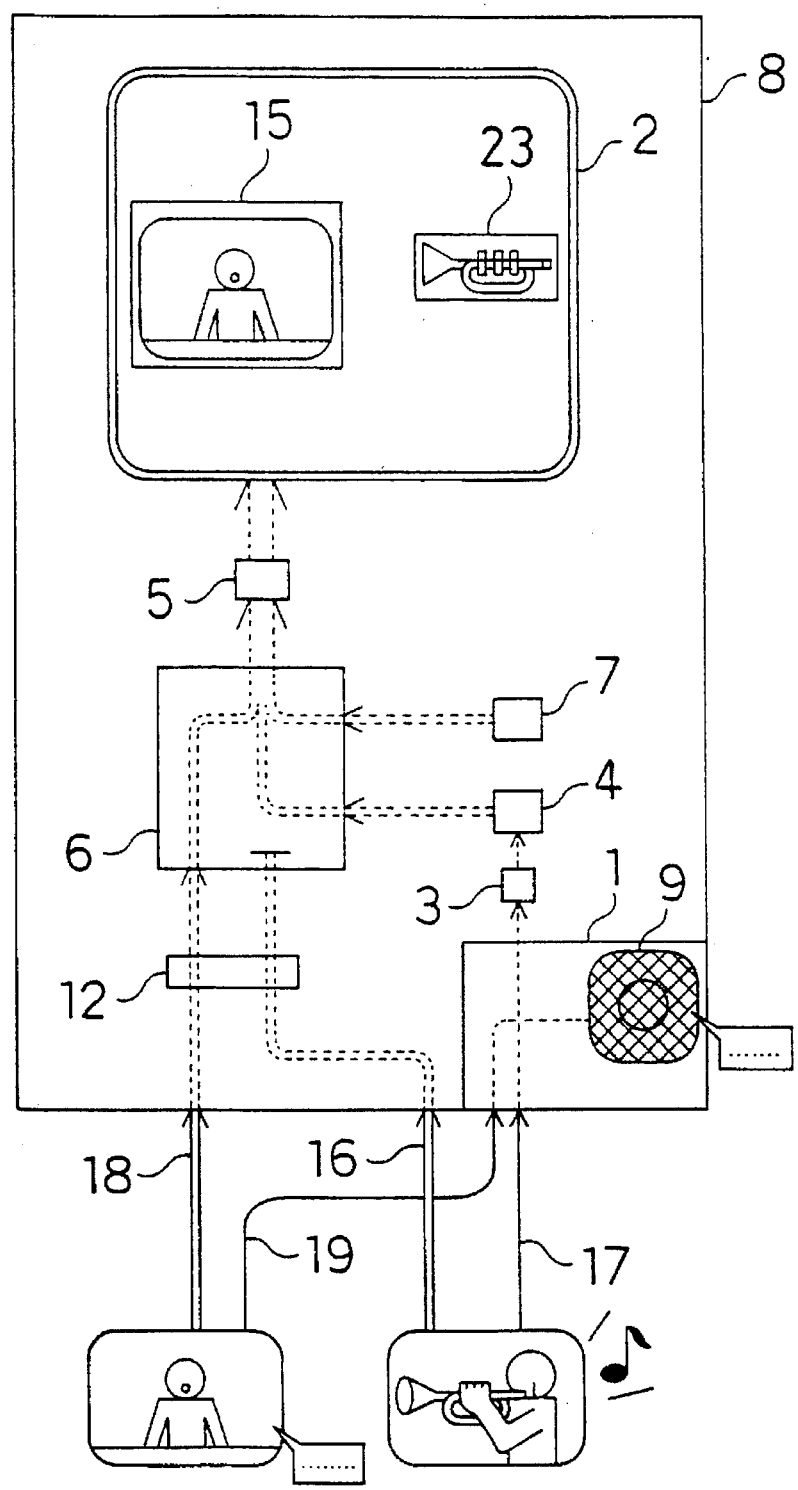
FIG. 6 shows how a computer of a fifth embodiment of the invention operates.
Figure 6B:
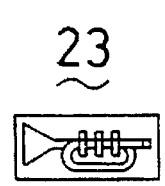

FIG. 6 shows a fifth embodiment of the invention. In this embodiment, at the same condition as that of the fourth embodiment of FIG. 5, the audio information extract unit 3 performs the function of recognizing the audio signal's 17 sound source as real-time information, thereby extracting a result of sound source recognition (trumpet), and the icon image generator 4 meanwhile generates a pattern of a trumpet according to such a sound source recognition result, as shown in FIG. 6(b).

In this embodiment, it is possible to monitor the sound source of an audio signal which is not output currently in the form of a sound through the loudspeaker 9, and to give some indication as to the type of audio signal. This embodiment makes use of a devise of a trumpet, however, the exact word "trumpet" may be displayed as an icon image.

In the foregoing descriptions, the audio information extract unit 3 extracts real-time information in the form of a volume level, however, an audio signal envelop may be extracted by the audio information extract unit 3 as real-time information, which simplifies circuitry of the audio information extract unit 3. Further, the full frequency spectrum of an audio signal or part of it may be extracted as real-time information. In this case, a frequency spectrum measuring function is added, so that it is possible to display a signal level at a particular frequency.

Further, in the foregoing descriptions, to accomplish animation effect, an icon image is made to change its size, however, such may be obtained by making an icon image roll or move laterally, reshaping its form, or changing its colors. The case for creating animation effect to an icon image by making it move laterally over a screen is that the icon image generator 4 will have a simpler circuit configuration. There is an advantage in reshaping an icon image that a most conspicuous animated icon image can be available by choosing an adequate icon image as a reference icon image.

For the case of changing icon image colors, unwanted overlapping between an icon image and a different window or another icon image can be prevented, since this process involves no changes as to display areas. There is another technique for producing animation effect to an icon image, in which each frame of an icon image is pre-stored in a storage for every sign of real-time information, and every time each sign is extracted a corresponding frame of the icon image is read from the storage to make it become animated as a whole. In this case, by preparing many frames of an icon image in advance to prevent the icon image making no awkward changes, it is possible to display a most conspicuous animated icon image.

Sixth Embodiment

Figure 7:
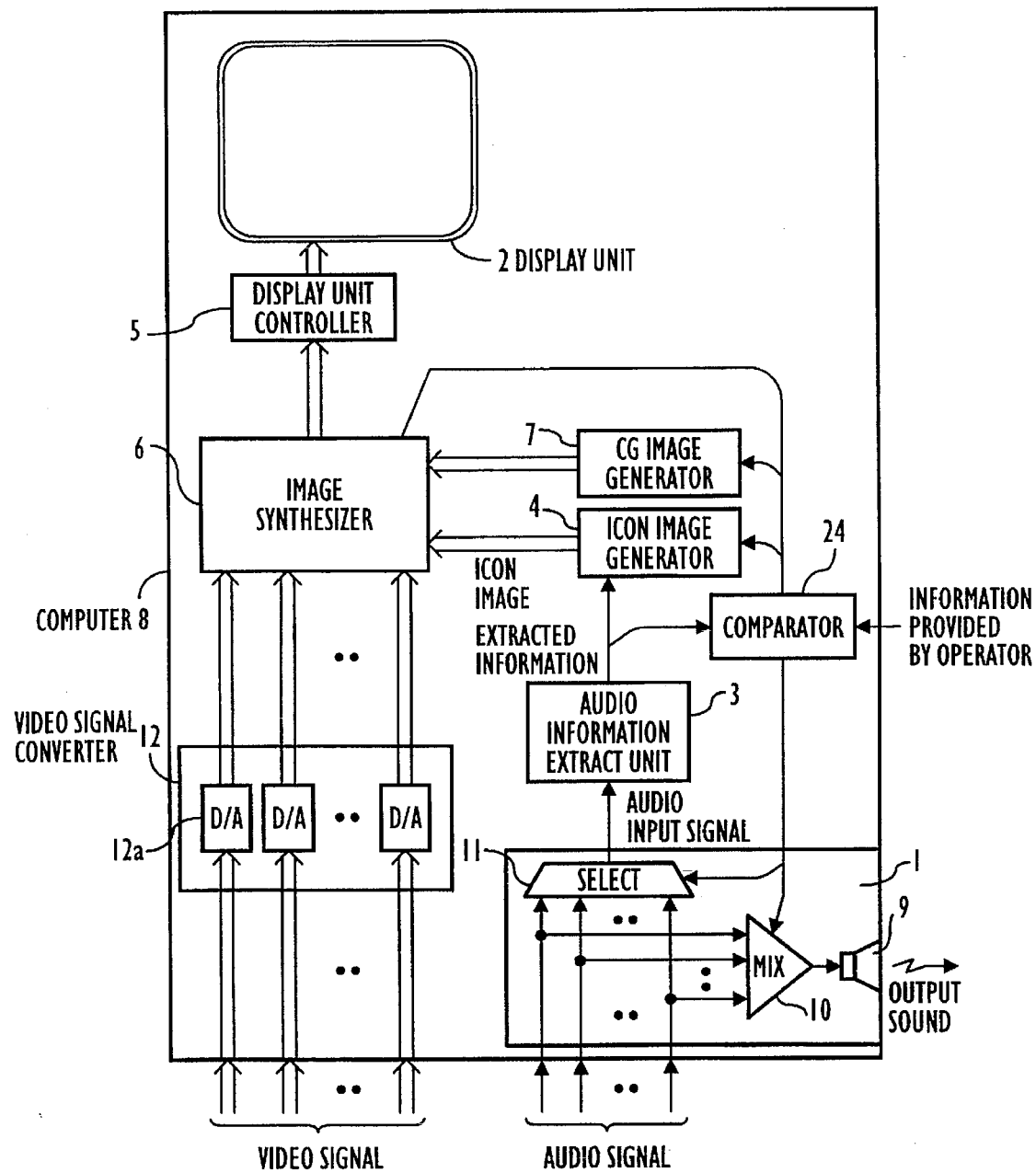
FIG. 7 is a block diagram showing the configuration of a computer of a sixth embodiment of the invention.

A sixth embodiment of the present invention is explained. This embodiment, as seen from FIG. 7, further includes a comparator 24 in addition to the elements described in the first embodiment of FIG. 1. The comparator 24 stores in advance items of predetermined information such as a character string, and is fed with real-time information such as a sentence extracted by the audio information extract unit 3 from an audio signal by means of the speech recognition. The comparator 24 then makes a comparison between the predetermined information and the real-time information, i.e., the sentence. When the comparator detects comparison requirements to be satisfied, that is to say, when a correspondence exists between the real-time information and the predetermined information, the audio signal mixing/ amplifying unit 10 is so controlled that every audio signal including one from which the real-time information has been extracted is weighted according to a predetermined weight, and is output through the loudspeaker 9 of the audio signal input/output unit 1 in the form of a sound. At the same time, the audio signal selector 11 is controlled not to select any one of audio signals applied to the audio signal input/output unit 1. The icon image generator 4 is also controlled not to generate any further icon images. Further, the CG image generator 7 and the image synthesizer 6 are controlled so that the synthesis of a static image generated by the CG image generator 7 and all the video signals delivered from the video signal converter array 12 is made to display a synthesized signal on the screen of the display unit 2. The remaining elements are not described here, since they are identical to those shown in FIG. 1. The same reference numerals are assigned to them, accordingly.

Figure 8:
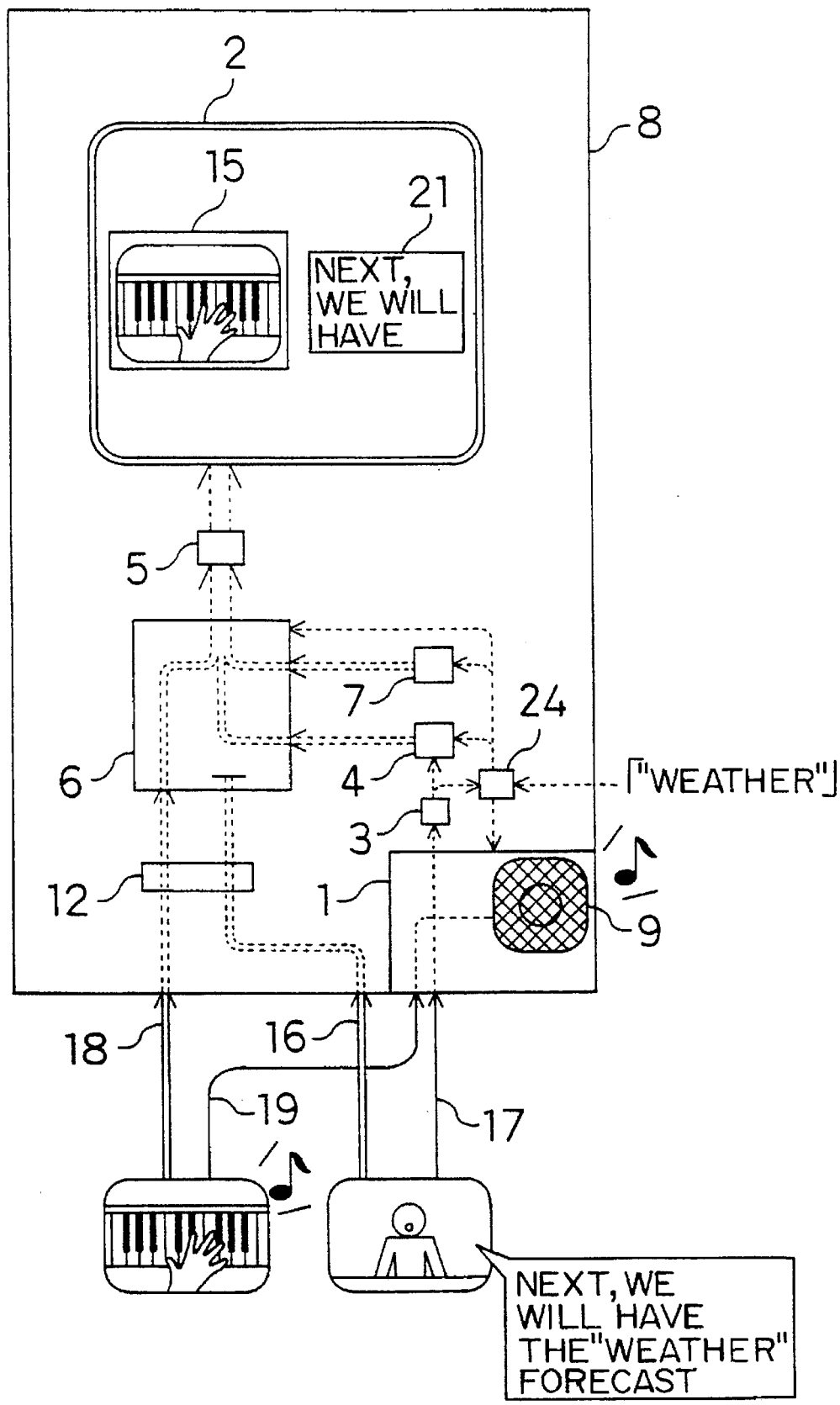
FIG. 8 is a diagram describing operations of the computer of the sixth embodiment before the detection of a correspondence.
Figure 9:
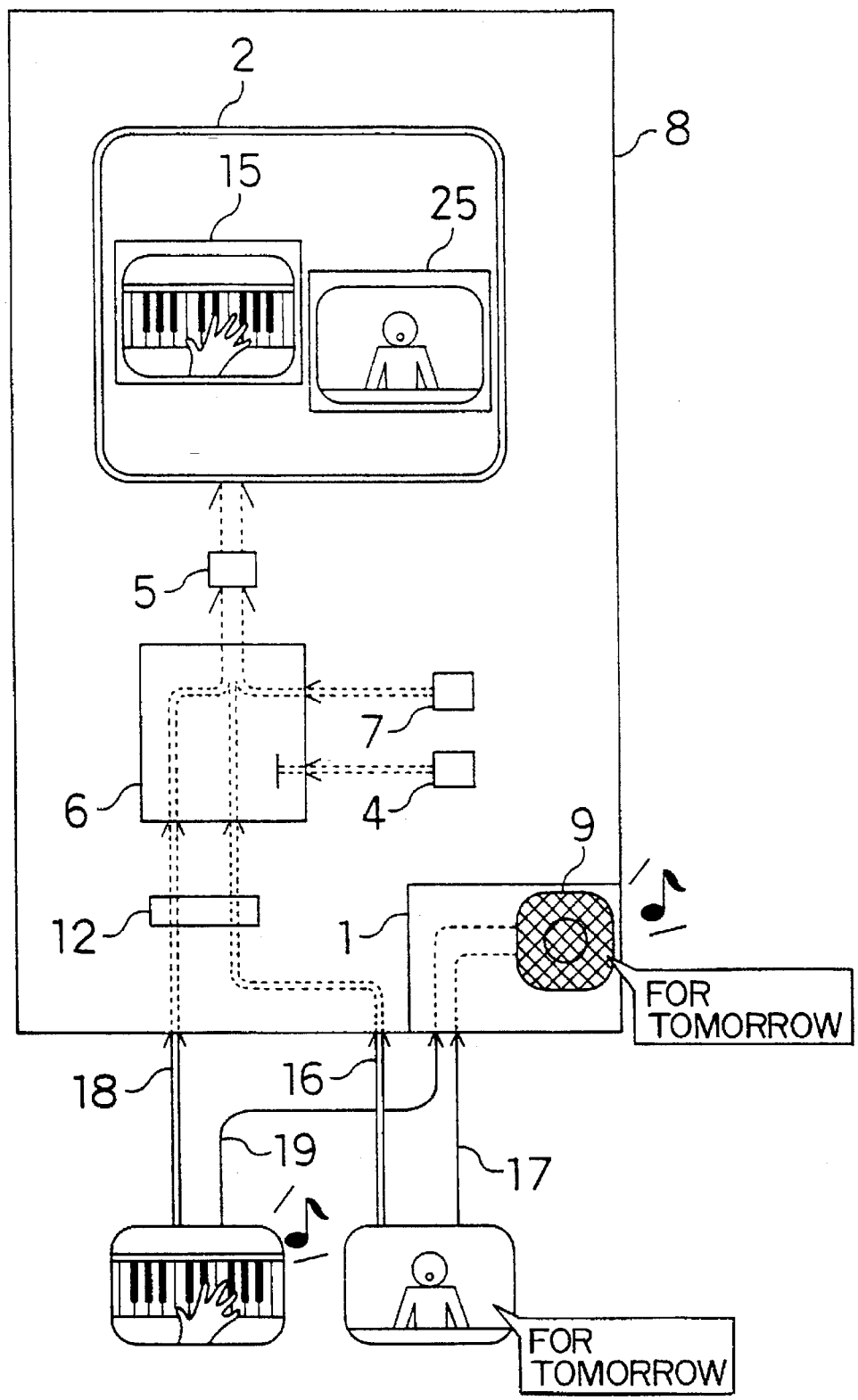
FIG. 9 is a diagram describing operations of the computer of the sixth embodiment after the detection of a correspondence.

The operation of the computer 8 according to this embodiment is describe by reference to FIGS. 8 and 9. This description is made on the condition: (a) that the audio signal 17 (announcer's voice tone) is not output in the form of a sound (that is, the signal 17 is not output in the form of a sound through the loudspeaker 9), (b) that the audio information extract unit 3 extracts a sentence as real-time information by recognizing speech within the audio signal 17, (c) that the icon image generator 4 correspondingly displays the animated news caption 21 as an animated image according to the extracted sentence, and (d) that the display unit controller 5 exerts control so that the animated news caption 21 is displayed on the screen of the display unit 2. In other words, this is a status prior to FIG. 8.

Here, a sentence extracted from the audio signal 17, i.e., "Next, we will have the "weather" forecast . . . ", is fed to the comparator 24 for comparison with a particular item of information predetermined by an operator (a character string of the word "weather" in FIG. 8). When an equal comparison occurs, the comparator 24 sends out a detection signal indicating such a correspondence to the audio signal input/ output unit 1, the icon image generator 4, the CG image generator 7, and the image synthesizer 6. As a result, the icon image generator stops generating the animated news caption 21. The image synthesizer 4, as shown in FIG. 9, is fed with both the video animation signal 18 (pianist) and the video animation signal 16 (announcer), whereby these two video animation signals 16 and 18 are combined with their respective static images generated by the CG image generator 7 so as to display resulting synthesized signals on windows 15 and 25 of the screen of the display unit 2, respectively. As a result of this, the display unit 2 now displays an animated image of an announcer who is reading an item of news in the window 25 in stead of displaying the animated news caption 21. In synchronism with the image synthesizer 6, the audio signal 17 is output in the form of a sound. This accordingly allows an operator to timely hear even information, temporarily and deliberately excluded by the operator, by means of the automatic monitoring of such information.

In this embodiment, the comparator 25 makes a comparison between real-time information extracted from an audio signal and information predetermined by an operator so as to detect whether they agree with each other. However, if information predetermined by an operator is a volume level having a predetermined value, the comparator 25 may detect a difference between real-time information and operator's information when an extracted volume level goes beyond that predetermined value. The main point is to detect timing that an equal comparison occurs.

In this embodiment, as real-time information extracted by the audio information extract unit 3 from an audio signal, a sentence as a result of the speech recognition is used for comparison with a character string previously established by an operator. Other than this, a musical note as a result of the musical note recognition or a result obtained by recognizing the type of sound source may be used for comparison with a musical note or sound source name predetermined.

Further, in this embodiment, the generation of icon images is brought to a halt by a detection signal which is delivered when an equal comparison occurs so as to redisplay an animated image of an announcer who is reading news in a window. However, such a detection signal may be notified to an operating system as an interruption signal. This reduces the burden to be handled by an information processing unit which monitors signals.

Seventh Embodiment

Figure 10:
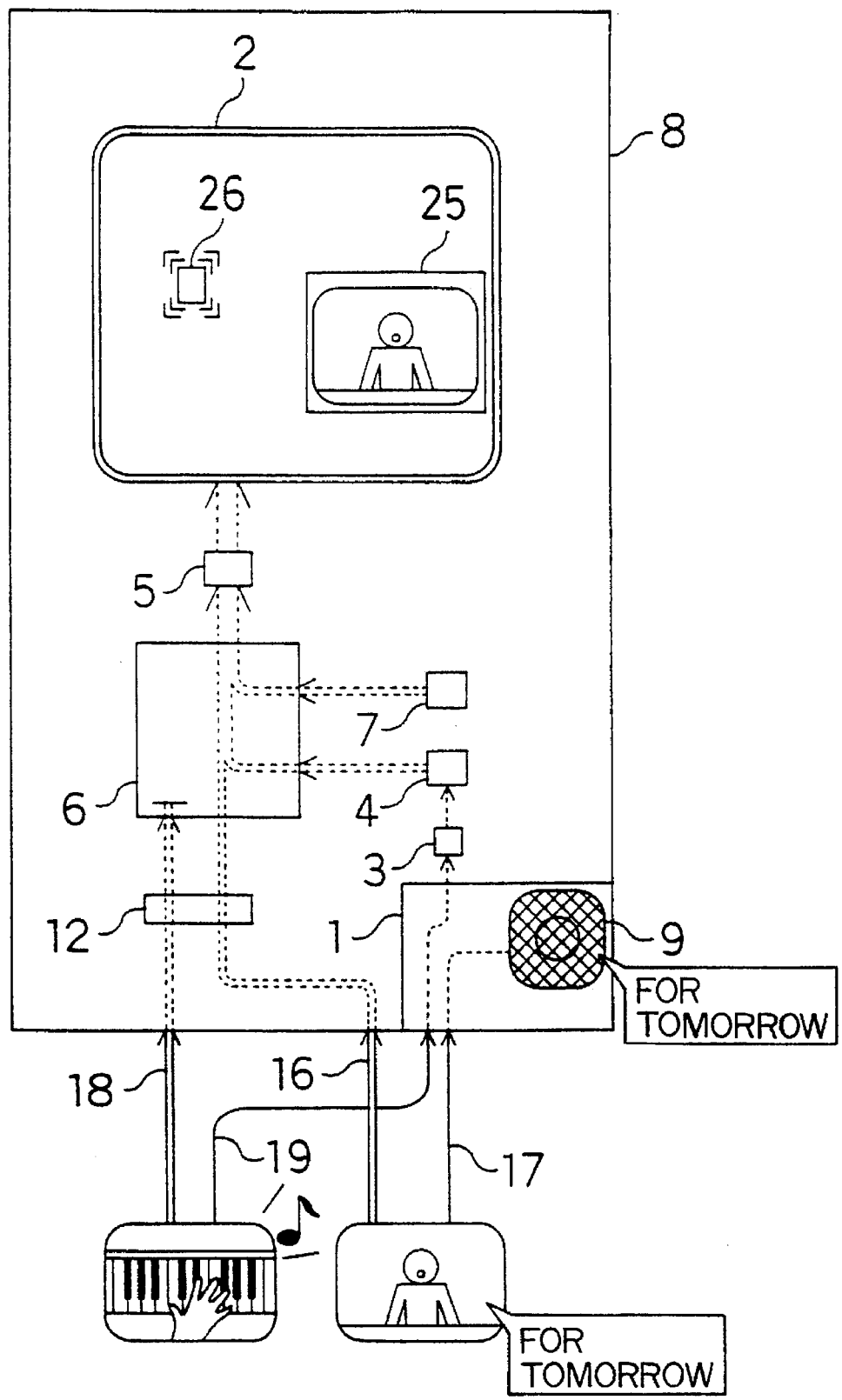
FIG. 10 shows how a computer of a seventh embodiment of the invention operates.

A seventh embodiment is described by reference to FIG. 10. This embodiment is a variation of the sixth embodiment of FIG. 9. Upon detecting a correspondence between the audio signal 17 (voice tone) and information previously established, i.e., a character string of the word "weather", the audio signal input/output unit 1 stops the audio signal 19 (piano sound) from being output in the form of a sound thereby outputting only the audio signal 17 in the form of a sound through the loudspeaker 9. The image synthesizer 6 stops being fed with the video animation signal 18 (pianist). The audio information extract unit 3 extracts real-time information out of the audio signal 19 (piano sound) for the generation of an animated icon image 26. Under control, both the animated icon image 26 and the animated image 25 of an announcer are displayed on the screen of the display unit 2.

In this embodiment, an operator can hear nothing but information about the weather forecast which the operator wishes to hear. In other words, no audio signals representing a piano sound are output through the loudspeaker 9 in the form of a sound. Further, since an animated image of a pianist corresponding to information which is not being referred to by an operator is displayed as a small icon image, this allows the operator to hear his or her target information with ease.

FIRST EMBODIMENT OF IMAGE BLEND CIRCUIT

Figure 11:
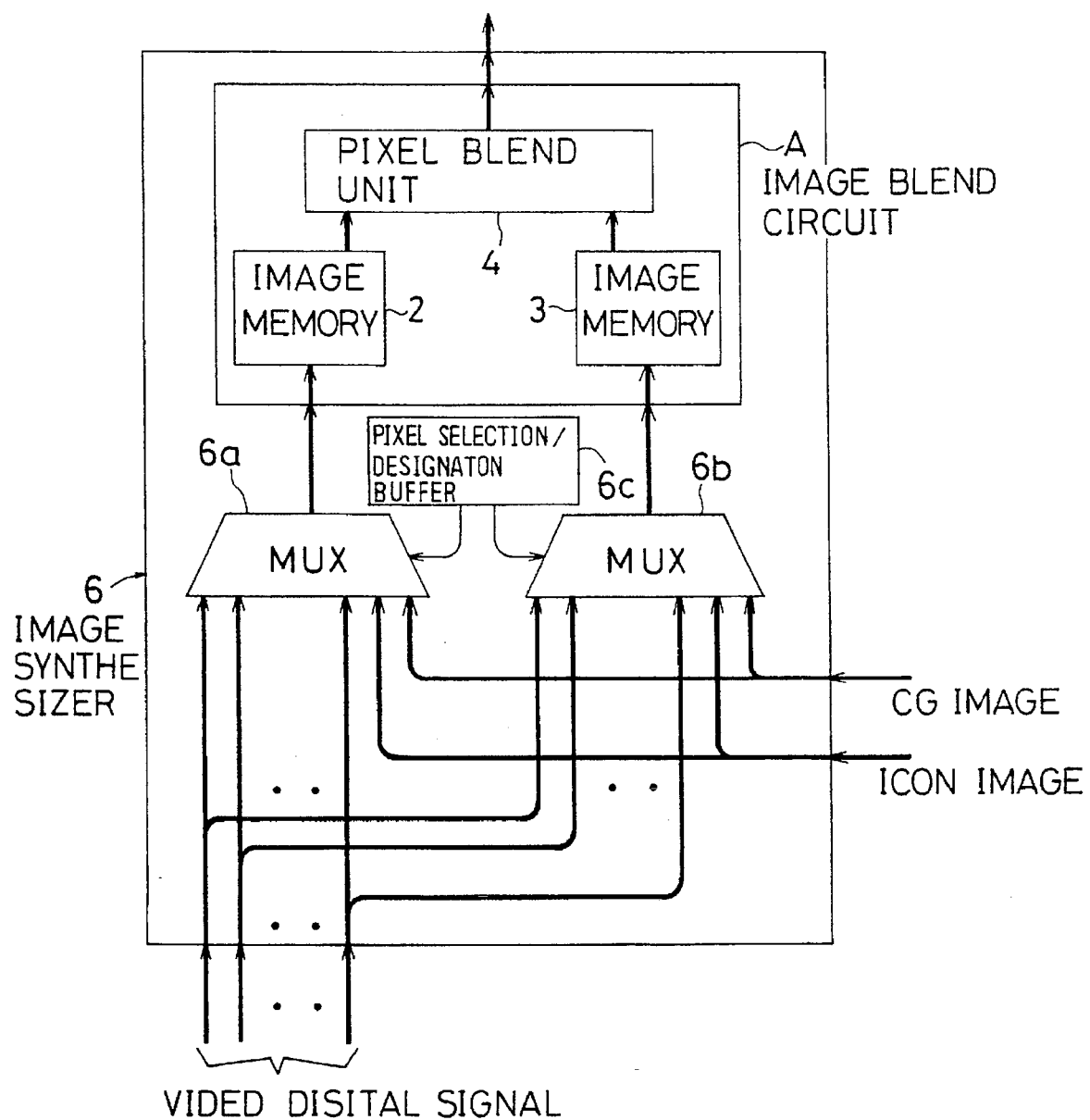
FIG. 11 shows a modification of the image synthesizer of FIG. 1.

FIG. 11 schematically shows a first image blend circuit according to the present invention. In this first image blend circuit, when two windows in each of which an item of information is displayed are opened at the same time on the display screen of the display unit 2 with an overlapping field created between the two windows, portions of these two information items corresponding to the overlapping field are displayed in the form of a translucently synthesized image.

FIG. 11 corresponds to FIG. 1. In the image synthesizer 6 of FIG. 1, video signals, computer graphic (CG) image signals, or icon image signals are selected for each pixel of the display screen surface of the display unit 2 according to designation information. FIG. 11 shows an image synthesizer 6'. In this image synthesizer 6', two overlapped information items on the display screen are synthesized for translucent display.

The image synthesizer 6' has two multiplexers 6a and 6b, a pixel selection/designation buffer 6c, and a window-controlled image blend circuit A. The image blend circuit A contains two image memories 102 and 103 and an image blend unit 104.

The pixel selection/designation buffer 6c has a two-dimensional zone whose dimensions correspond to those of the display screen of the display unit 2. For every pixel forming the 2-D zone, the pixel selection/designation buffer 6c stores selection/designation information comprising two different types of information: one is selection information based on which the multiplexers 6a and 6b select between input signals and the other is information used to decide whether such selection information is written into the image memories 102 and 103.

Each of the multiplexers 6a and 6b has a function of selecting one from among a plurality of input signals according to the selection/designation information sequentially provided from the pixel selection/designation buffer 6c, as a pixel being resolved.

Like the pixel selection/designation buffer 6c, each of the image memories 102 and 103 has a two-dimensional zone whose dimensions correspond to those of the display screen of the display unit 2. Each of the image memories 102 and 103 stores color information as to every pixel and also holds pixel information or outputs of the multiplexers 6a and 6b according to the selection/designation information sequentially provided from the pixel selection/designation buffer 6c. The pixel blend unit 4 has the capability of synthesizing outputs of the image memory 102 and the image memory 103 for translucent image display or of selecting either one of an output of the image memory 102 and an output of the image memory 103.

Figure 12:
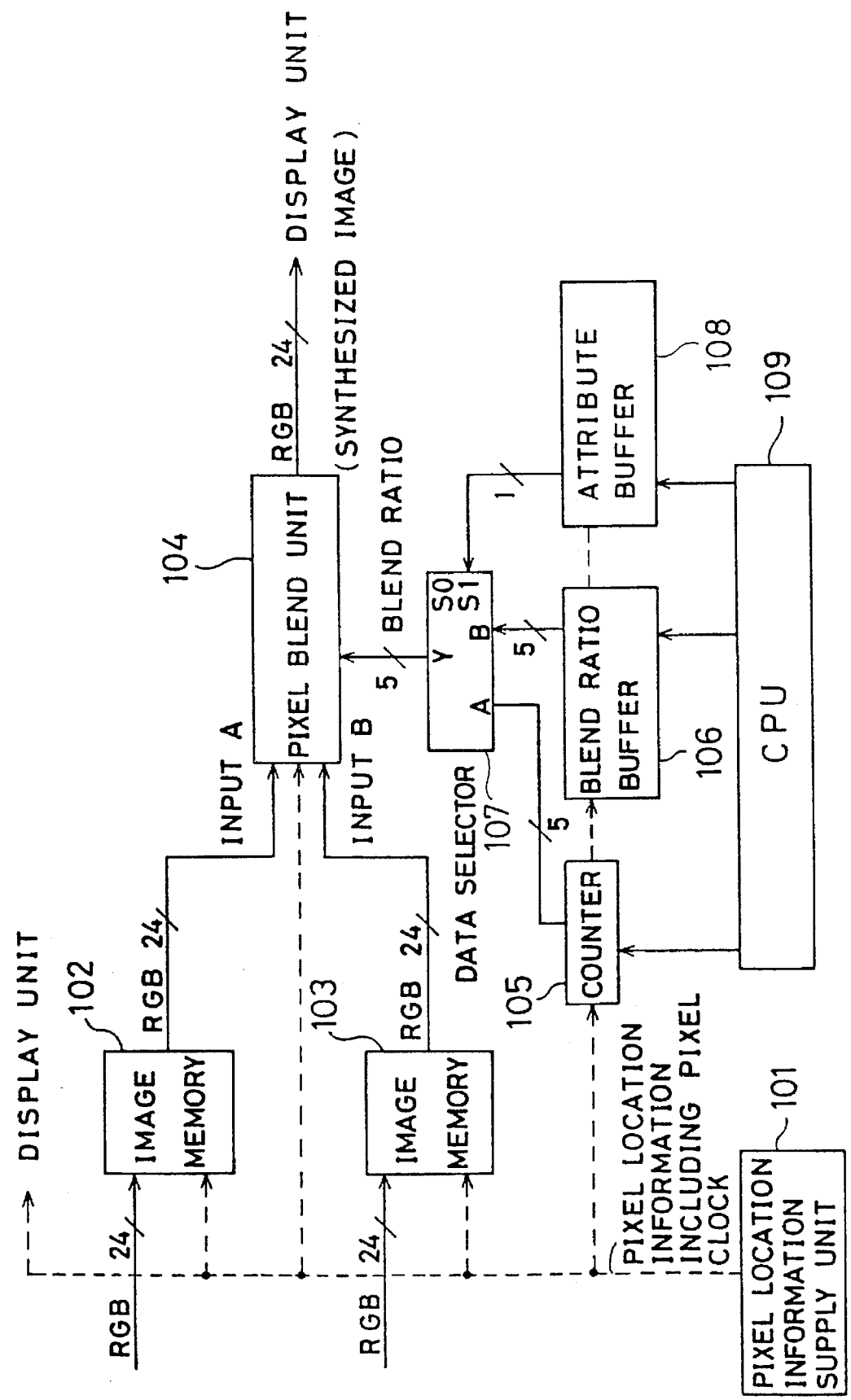
FIG. 12 is a block diagram showing an organization of an image blend circuit according to the present invention.

Referring now to FIG. 12, the image blend circuit A is described in detail.

Figure 13:
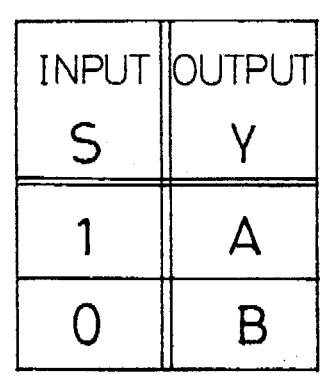

The image blend circuit A further includes a pixel location information supply unit 101, a counter 105, a blend ratio buffer 106, a data selector 107, an attribute buffer 108, and a central processing unit (CPU) 109. In FIG. 12, bold solid lines with additional remarks of bit width represent pixel information transfer, broken lines represent transfer of pixel location information containing a pixel clock signal, and thin solid lines represent other information transfer. FIG. 13 is a function table of the data selector 107.

Figure 14:
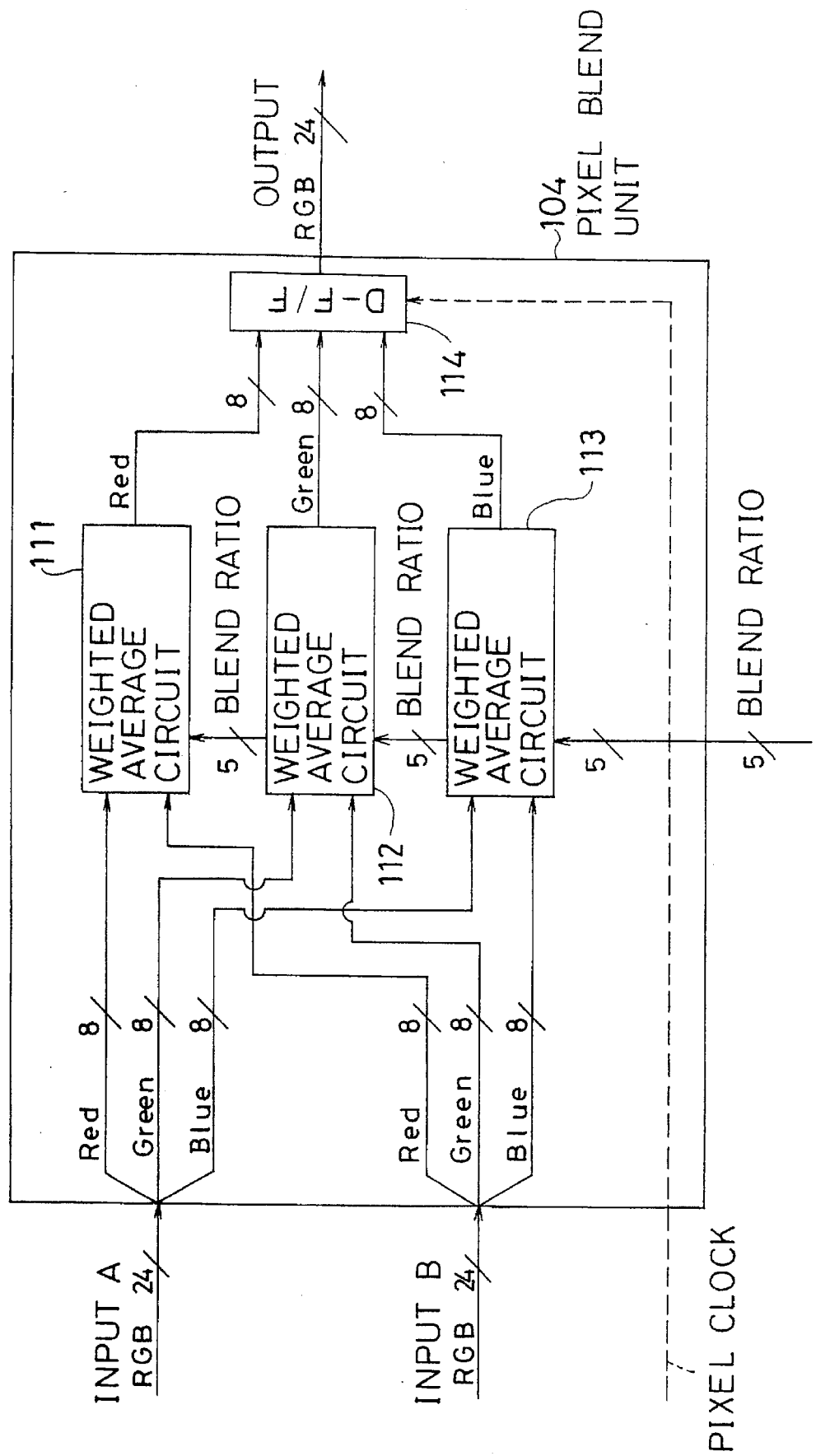
FIG. 14 is a block diagram showing an internal organization of a pixel blend unit of FIG. 12.
Figure 15:
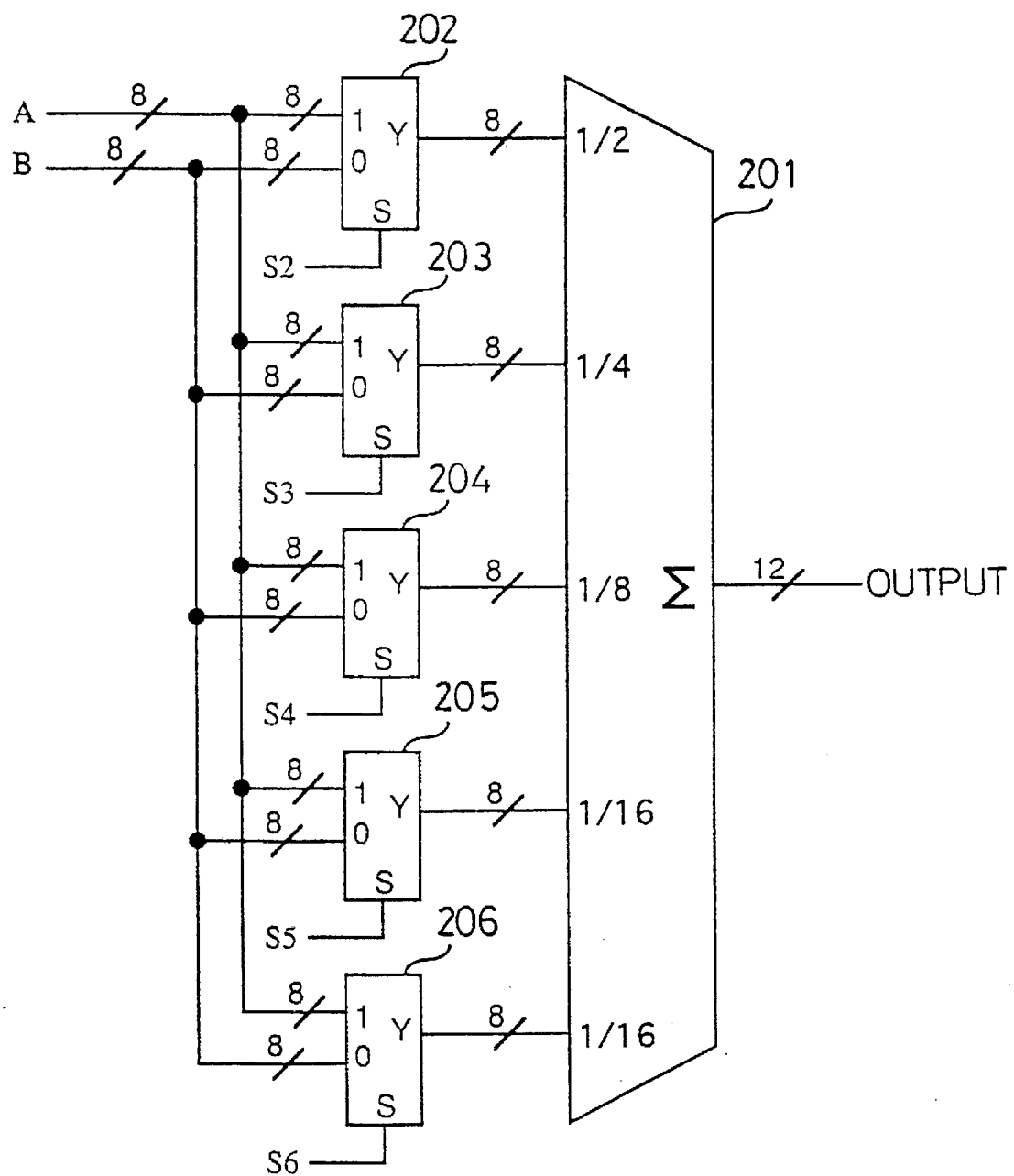
FIG. 15 is a circuit diagram showing an internal organization of one weighted average circuit of FIG. 12.

FIG. 14 shows an organization of the pixel blend unit 104. The pixel blend unit 104 has a first weighted average circuit 111, a second weighted average circuit 112, a third weighted average circuit 113, and a D-type flip-flop (D-F/F) 114. FIG. 15 shows an organization of the weighted average circuit and detailed description thereof will be made later. 201 is an addition circuit. 202–206 indicate input selectors provided on the input side of the addition circuit 201. 282 is a decoder.

The operation of the image blend circuit A is explained below.

In the present embodiment, a rectangle display screen (1152 pixels×900 pixels) is used. The pixel blend unit 104 outputs a digital RGB pixel signal. This digital RGB pixel signal is converted by a display control unit containing a D/A converter into an analog video signal and is transferred to the display unit.

The pixel location information supply 101 generates pixel location information containing a pixel clock signal for sequentially transmitting, by a raster scan technique, pixels being resolved on the screen in the form of digitized information and outputs the generated pixel location information. In raster scanning, 1152 pixels forming one of the rows of the screen are resolved one by one from side to side. If a row is swept from left to right, then the next row is swept from right to left. When the lowermost row is swept, scanning returns to the uppermost row. In this way, pixel information is transmitted sequentially. In such a raster scanning technique, since there is a distance between the rightmost pixel and the leftmost pixel of a row, this results in requiring time called the horizontal blank period that is a period from a point at which a pixel at one end of a row is resolved until a point at which a pixel at the other end is resolved. During the horizontal blank period, there is no pixel information transfer, or even if pixel information transfer occurs, no pixels are resolved. A period from a point at which the lowermost pixel row is resolved until a point at which the uppermost pixel row is resolved (i.e., a period of 1-frame data transfer) is called the vertical blank period. The pixel location information supply unit 101 provides a signal indicative of the horizontal blank period and a signal indicative of the vertical blank period as pixel location information, in addition to a pixel clock signal. Each pixel clock signal has a frequency of 20 MHz.

On receipt of a pixel clock signal, a horizontal blank period signal, and a vertical blank period signal, the first and second image memories 102 and 103, the counter 105, the blend ratio buffer 106, and the attribute buffer 108 each synchronize respective information corresponding to pixels at the same location for output. Timing of when a pixel at a certain location is output is determined by the change in the horizontal blank period signal, by the change in the vertical blank period signal, and by counting pixel clock signals.

Each of the first and second image memories 102 and 103 outputs pixel information corresponding to the dimensions of the display screen of the display unit. In the present embodiment, each pixel is represented by 24-bit digital information about red (R), green (G), and blue (B) components, and the intensity of each of RGB is represented by an unsigned 8-bit binary integer. Either a pixel information item provided by the first image memory 102 or a pixel information item provided by the second image memory 103 is selected for display and the other is not displayed if none of these two pixel information items are not subjected to a blending process by the pixel blend unit 104. In such a case, dummy pixel information may be used. For example, in the second image memory 103, when fetching and then outputting video signals captured by a video camera, a size actually fetched may become smaller than a size of 1152 pixels×900 pixels due to video signal resolution and display size problems. In such a case, the second image memory 103, at the time of output of pixel information about areas other than an area assigned to the fetched image, may output dummy data.

RGB pixel data from the first image memory 102 and RGB pixel data from the second image memory 103 are synchronously fed to the pixel blend unit 104. Then, the pixel blend unit 104 blends these RGB pixel data according to a blend ratio that is supplied to the unit 104 in synchronization with the RGB pixel data supply thereby outputting the result of the blending operation. In the present embodiment, the blend ratio is represented by a 5-bit fixed-point binary number and its MSB represents units. Such a 5-bit fixed-point binary number may be greater than 1, but values exceeding 1 are not suitable for the blend ratio. To cope with this problem, when exceeding 1, the blend ratio automatically become 1. The pixel blend unit 104 calculates:

$$\alpha \times A + (1-\alpha) \times B \qquad (1)$$

where $\alpha$ is the blend ratio, A is the value of any one of RGB components output from the first image memory 102, and B is the value of the same color component as above output from the second image memory 103. Since each of RGB components are formed by 8 bits, decimal place values are rounded-down.

Within the pixel blend unit 104, the first, second, and third weighted average circuits 111, 112, and 113 perform calculations of the formula (1) on RGB components respectively with a common blend ratio. Time required for performing the formula (1) calculation varies depending on the blend ratio value. Therefore, outputs of the weighted average circuits 111, 112, and 113 are received by the D-F/F 114, thereafter being output with a constant timing regardless of the blend ratio value.

Each of the weighted average circuits 111–113 having an organization of FIG. 15 performs the formula (1) calculation. If the blend ratio $\alpha$ lies between 1 and 0, the formula (1) calculation is performed by the addition circuit 201 and the input selectors 202–206 and the result is output from the addition circuit 201.

In this way, the pixel blend unit 104 generates a synthetic image of an image output from the first image memory 102 and an image output from the second image memory 103. Pixels forming this synthetic image are ones output from the first image memory 102, ones output from the second image memory 103, or ones as result of translucent synthesis of pixels output from the first image memory 102 and pixels output from the second image memory 103.

The pixel blend unit 104 receives a blend ratio that is generated by the counter 105, the blend ratio buffer 106, the data selector 107, and the attribute buffer 108.

The counter 105 stores blend ratio values from the CPU 109 and constantly applies the stored values to the data selector 107. Upon receipt of commands as to initial values, termination values, and speed from the CPU 109, the counter 105 counts, for example, vertical blank period signals for automatic change. If the counter 105 receives no commands, it acts as a register to hold a constant value.

The blend ratio buffer 106 stores blend ratio values per pixel. In other words, the blend ratio buffer 106 stores 1152×900 blend ratio values, so that any blend ratio distribution can be realized over the display screen. According to the pixel location information containing pixel clock information, blend ratio data items held by the blend ratio buffer 106 are sequentially read out into the data selector 107.

According to a control signal from the attribute buffer 108, the data selector 107 selects between an output value from the counter 105 and an output value from the blend ratio buffer 106 for each pixel thereby outputting a selected output value to the pixel blend unit 104.

The attribute buffer 108 stores a control signal value applied to the data selector 107. In other words, the attribute buffer 108 holds data of a 1-bit binary number based on which either an output of the counter 105 or an output of the blend ratio buffer 106 is designated as a blend ratio. The attribute buffer 108 sequentially outputs such data to the data selector 107 according to the pixel location information.

The CPU 109 updates the contents of the blend ratio buffer 106 as well as the contents of the attribute buffer 108 to the operator's window operation.

The operation at the time when windows are opened on the display screen is described below.

Figure 16:
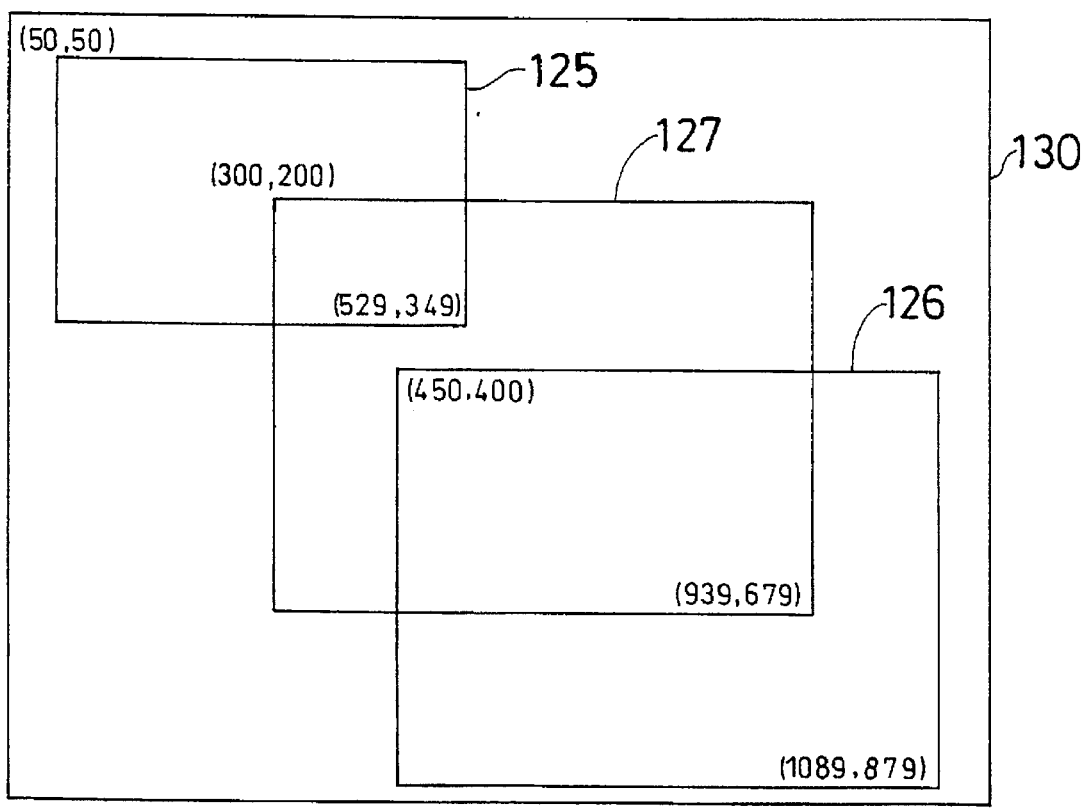
FIG. 16 shows three different windows opened on a display screen of an information processor employing the image blend circuit of FIG. 12.

Coordinates on the display screen are as follows. On the display screen, the upper left end is represented by (0,0). If (0,0) is right-shifted x pixels and down-shifted y pixels, the resulting position is represented by (x,y). As an example, the locations and sizes of windows are shown in FIG. 16. FIG. 16 shows a display screen 130 in which a first area 125, a second area 126, and a third area 127 are defined. The first to third areas 125–127 are rectangle and all the sides thereof run parallel with the corresponding sides of the display screen 130. As seen from FIG. 16, the first area 125 is a rectangle area defined by (50,50, upper left end) and (529, 349, lower right end) and has a size of 480×300 pixels. The second area 126 is a rectangle area defined by (450,400, upper left end) and (1089,879, lower right end) and has a size of 640×480 pixels. The third area 127 is a rectangle area defined by (300,200, upper left end) and (939,679, lower right end) and has a size of 640×480 pixels.

Figure 17:
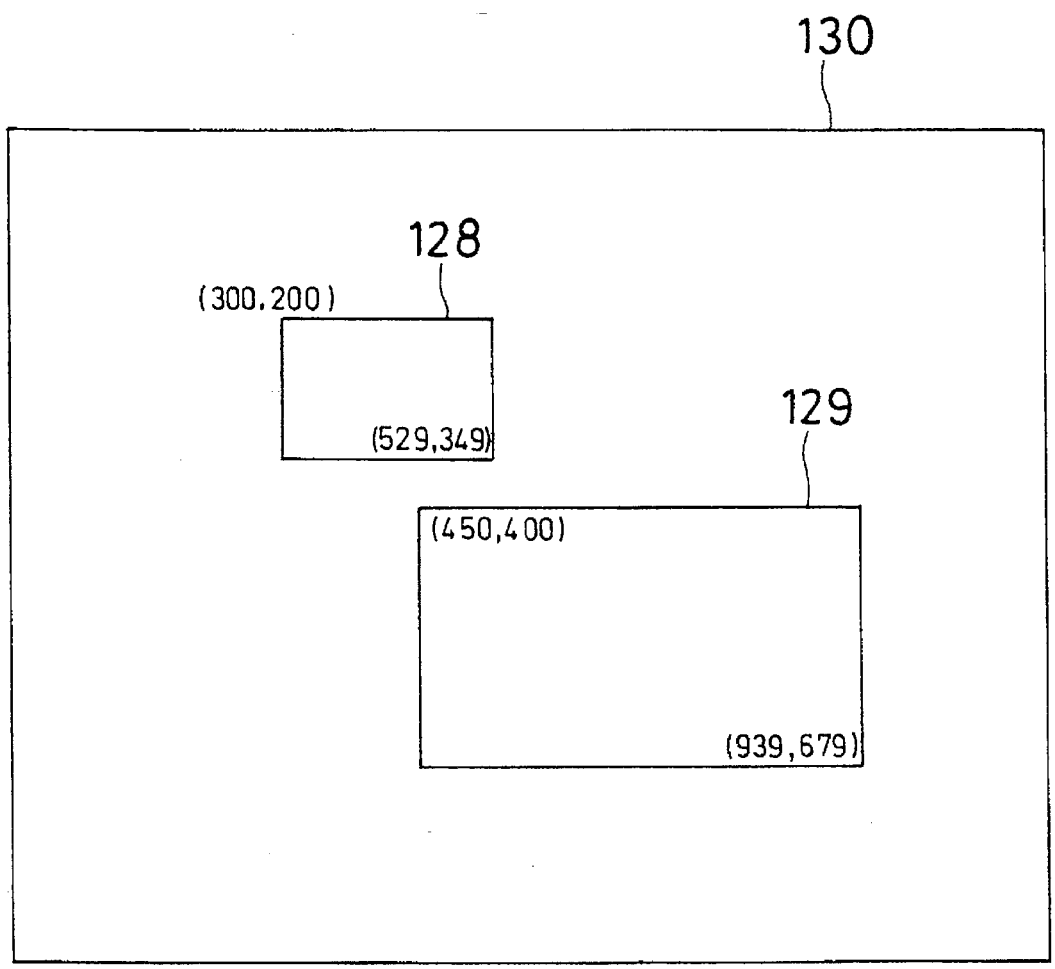
FIG. 17 shows overlapped fields of the windows of FIG. 16.

FIG. 17 shows a fourth area 128 which is an area where the first area 125 and the third area 127 overlap. The fourth area 128 is a rectangle area defined by (300, 200, upper left end) and (529, 349, lower right end) and has a size of 230×150 pixels. FIG. 17 also shows a fifth area 129 which is an overlapping area of the second area 126 and the third area 127. The fifth area 129 is a rectangle area defined by (450, 400, upper left end) and (939, 679, lower right end) and has a size of 490×280 pixels.

Figure 18:
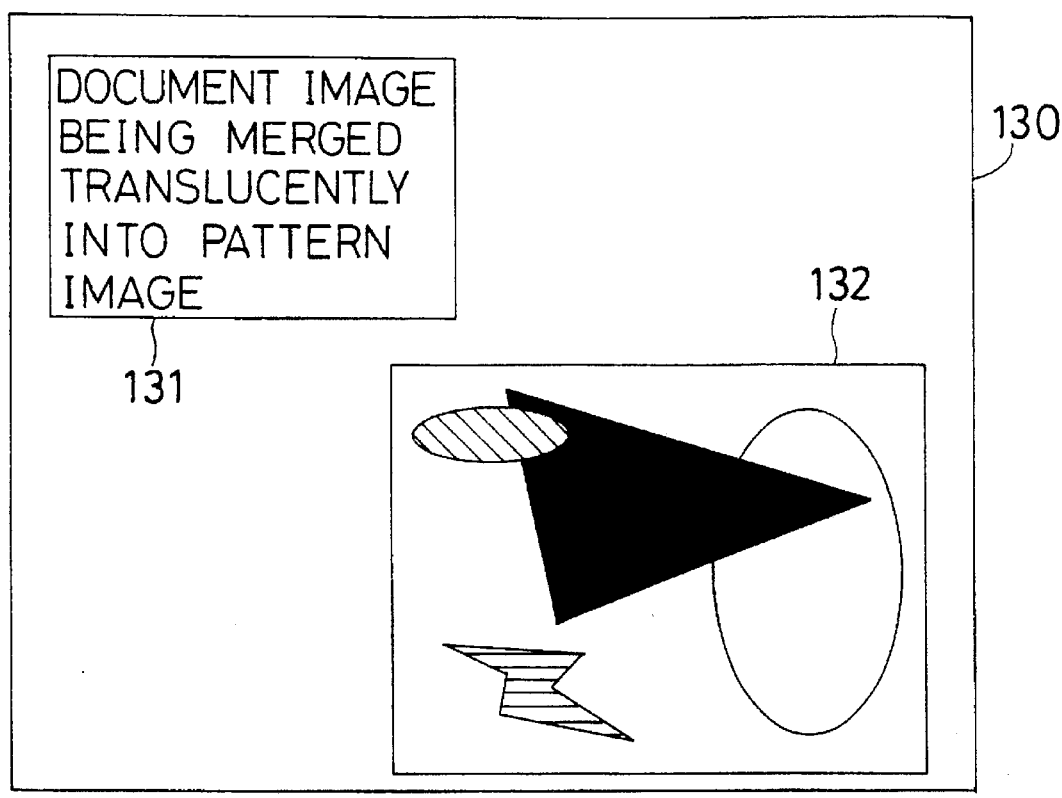
FIG. 18 is an example in which a document and a pattern are displayed in the first and second windows of FIG. 16 respectively.

The first and second image memories 102 and 103 correspondingly store images with regard for the display screen and output pixel information on the stored images. As shown in FIG. 18, a document 131 is displayed in the first area 125 and a pattern 132 is displayed in the second area 126. The first image memory 102 stores image data about the document 131 and the pattern 132 and outputs the stored image data. The blend ratio buffer 106 holds blend ratios of 1 with respect to each pixel of the display screen 130. Suppose each blend ratio, represented by 2-digit hexadecimal notation (originally 5 bits), is arranged on the display screen 130. This is shown in FIG. 19. The contents of the attribute buffer 108 are 0's so that outputs of the blend ratio buffer 106 are selected for each pixel of the display screen 130 (see FIG. 19). As a result, the data selector 107 selects an output of the blend ratio buffer 106. The pixel blend unit 104 selects outputs of the first image memory 102 for each pixel and applies a selected output to the display unit. In this case, the stored blend ratio value in the counter 105 is not referred to.

If a window in which the pattern 132 is displayed is moved to the third area 127, an overlap between the document 131 and the pattern 132 takes place in the fourth areas 128. Then, the document 131 and the pattern 132 are translucently synthesized at the fourth area 128 (see FIG. 20). This translucent synthetic image generation process is explained. A part of the pattern 132 that has just been shifted to over the fourth area 128 is not overwritten to a part of the fourth area 128 but transferred to a part of the second image memory 103 corresponding to the fourth area 128. That is, a part of the document 131 exists in a corresponding area of the first image memory 103. A part of the pattern 132 exists in a corresponding area of the second image memory 103. If the blend ratio is set at between 0 and 1 when pixel information on the area 128 stored in the first image memory 102 and pixel information on the area 128 stored in the second image memory 103 are output at the same time, the document 131 and the pattern 132 are partially translucently synthesized at the area 128 (see FIG. 20).

There are two ways of setting the blend ratio value at between 0 and 1 for the fourth area 128. One is to change the contents of the area 128 of the blend ratio buffer 106 without changing the contents of the attribute buffer 108. This requires data write of 230×150×5=172,500 bits. Another way is to set a value between 0 and 1 to the counter 105 and change the contents of the area 128 of the attribute buffer 108 to a value of selecting an output of the counter 105, without changing the contents of the blend ratio buffer 106. This requires data write of 230×150×1=34,500 bits which is one fifth the first way does.

As shown in FIG. 21, the blend ratio buffer 106 holds a blend ratio of 1 for every pixel of the display screen 130 with the exception of pixels of the fourth area 128. Like the blend ratio of FIG. 19, the blend ratio of FIG. 21 is represented by 2-digit hexadecimal notation. As to pixels of the area 128, no reference is made so that any value, as indicated by oblique lines of FIG. 19, may be useful. The counter 105 stores a blend ratio value of 08 by 2-digit hexadecimal notation (see FIG. 21). The attribute buffer 108 holds blend ratio values of 0 to select outputs of the blend ratio buffer 106 for every pixel of the display screen 130 with the exception of pixels of the area 128. The attribute buffer 108 holds blend ratio values of 1 for pixels of the area 128 to select outputs of the counter 105. The data selector 107 selects outputs of the blend ratio buffer 106 for every area of the display screen 130 with the exception of pixels of the area 128. On the other hand, outputs of the counter 105 are selected for the area 128. As a result, the pixel blend unit 104 selects outputs of the first image memory 102 for every pixel of the display screen 130 with the exception of pixels of the area 128. Then, at the area 128, outputs of the first image memory 102 and outputs of the second image memory 103 are translucently synthesized and the result is fed to the display unit.

Figure 20:
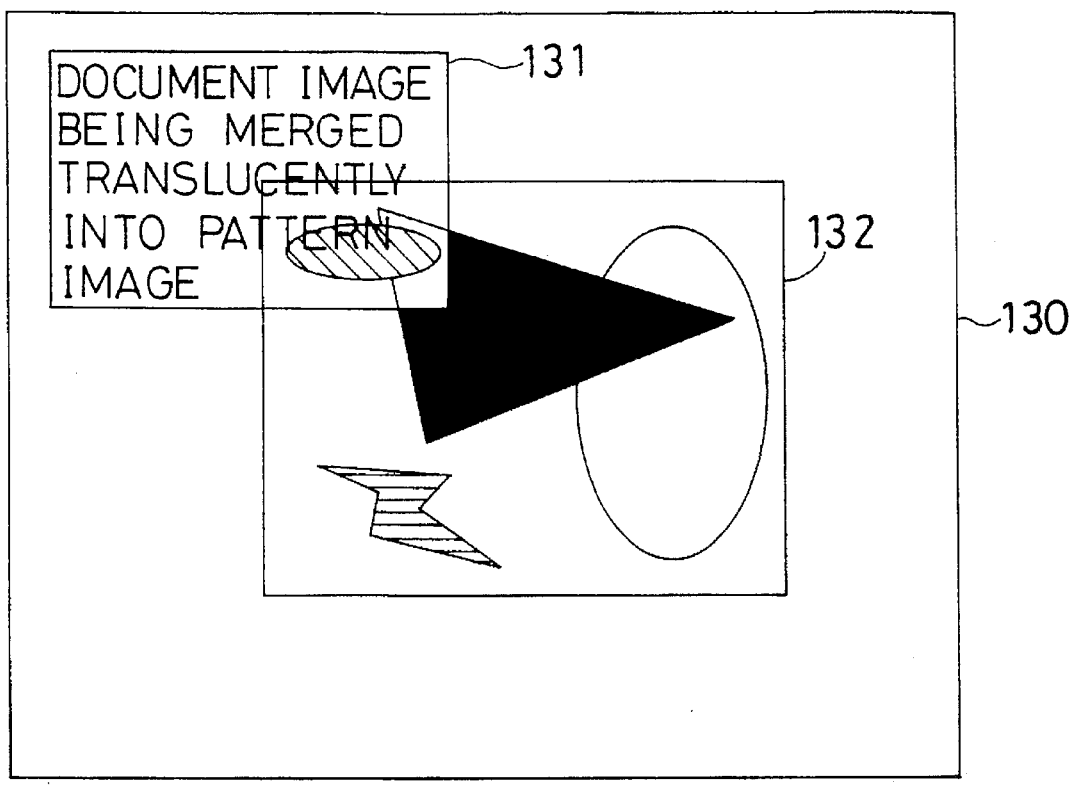
FIG. 20 is an example in which the pattern displayed in the second window of FIG. 16 is now displayed in the third window.

As shown in FIG. 20, when of 1152×900=1,036,800 pixels only 230×150=34,500 pixels of the area 128 are blended at a blend ratio value between 0 and 1, the operation of each addition circuit is limited so that it (the addition circuit) only operates while pixels of the area 128 are being output. Assuming no power is consumed when the addition circuit 210 stops operating, power consumption can be cut down to 34,500/1,036,800×100=3.3%.

Further, by making the counter 105 start its counting operation, it is possible to gradually change the blend ratio value at translucent synthesis execution time without involving each blend ratio write by the CPU 109. The blend ratio can be changed smoothly relieving the CPU 109 of the burden of rewriting blend ratios. When a live-video image is being displayed, the switching between scenes or between channels can be done with providing soft image. If, when windows having still images are overlapped as shown in FIG. 20, the blend ratio is changed smoothly at a adequate speed to alternately display information of one window and information of another window, this allows the operator to more easily view the information items of the overlapped part as compared with a way of displaying information items with a fixed blend ratio, thereby not tiring the operator's eyes as compared with a way of momentarily changing information items for alternate display.

SECOND EMBODIMENT OF IMAGE BLEND CIRCUIT

A second image blend circuit of the present invention is now described below.

Figure 22:
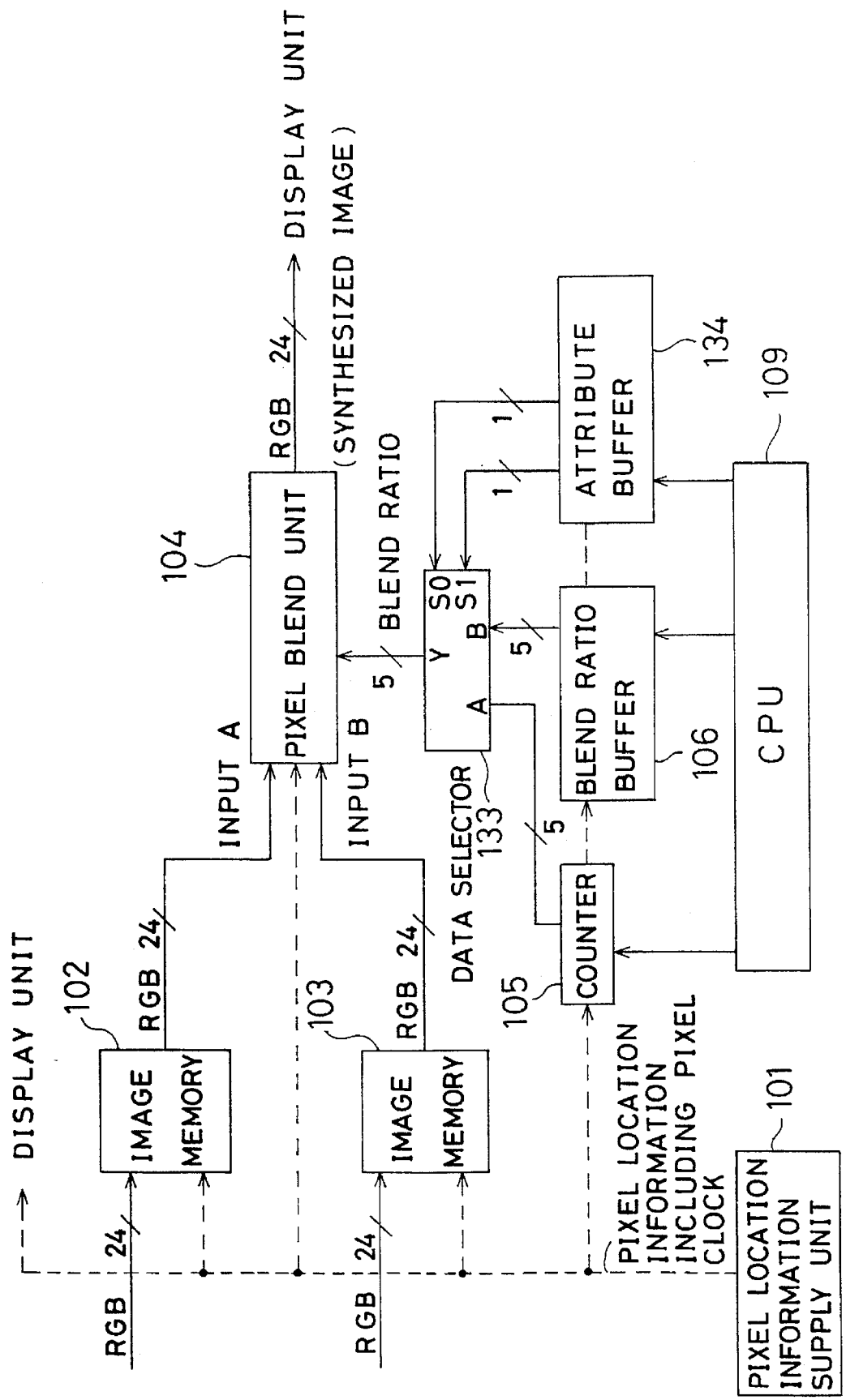
FIG. 22 is a block diagram showing an organization of another window-controlled image blend circuit according to the present invention.

FIG. 22 shows the second image blend circuit comprising a 2-bit selective input data selector 133 and a 2-bit output attribute buffer 134. The same reference numerals are used for like elements. FIG. 23 is a function table of the data selector 133.

In the second image blend circuit, the data selector 107 of the first image blend circuit is replaced by the data selector 133 capable of selecting among an output of the counter 105, an output of the blend ratio buffer 106, a fixed blend ratio, and another fixed blend ratio, thereby outputting a selected value. Further, the attribute buffer 108 of the first image blend circuit is replaced by the attribute buffer 134 having the capability of storing a 2-bit control signal per pixel, since a control signal of the data selector 133 is formed by two bits. As seen from FIG. 23, the foregoing two fixed blend ratio values are 0 and 1 respectively. In other words, the blend ratio value is selected from among these four values (i.e., the counter's 105 output, the blend ratio buffer's 106 output, and these two fixed blend ratio values) for every pixel by control of the attribute buffer's 134 value. Other operations are the same as in the first image blend circuit.

In the first image blend circuit, at the time of such a display state that no translucent synthesis is carried out, the blend ratio buffer 106 stores blend ratio values of 1 for every pixel so that the pixel blend unit 104 selects an output of the first image memory 102. This necessitates rewrite of all the pixel values of the blend ratio buffer 106, and data write of 1152×900×5=5,184,000 bits is necessary.

Conversely, in the second image blend circuit, the data selector 133 can select a constant value (i.e. a blend ratio value of 1) (see FIG. 24). In order to give every pixel being resolved a blend ratio value of 1, values corresponding to all the pixels of the attribute buffer 134 should be binary numbers of 11. Further, as shown in FIG. 24, this eliminates the need for blend ratio rewrite to the blend ratio buffer 106. Data write of 1152×900×2=2,037,600 bits is required which is two fifth what is required in the first image blend circuit.

A case, where an overlap of two items of information takes place only in the area 128, is described (see FIG. 20). As shown in FIG. 25, values of the attribute buffer 134 corresponding to areas other than the area 128 are set to a binary number of 11, whereby (a) the data selector 133 selects a blend ratio value of 1 and (b) the pixel blend unit 104 selects an output of the first image memory 102. Meanwhile values of the attribute buffer 134 corresponding to the area 128 are set to a binary number of 01 whereby (a') the data selector 133 selects a blend ratio value of 08 held by the counter 105 and (b') the pixel blend unit 104 synthesizes an output of the first image memory 102 and an output of the second image memory 103 using a blend ratio of 08.

In the second image blend unit, the 1-bit selective input data selector 107 of the first image blend circuit is replaced by the 2-bit selective input data selector 133 and the attribute buffer 108 of the first image blend circuit is replaced by the 2-bit output attribute buffer 134. As a result of such an arrangement, less write data is required in setting the blend ratio depending on the window.

THIRD EMBODIMENT OF IMAGE BLEND CIRCUIT

A third image blend circuit is described by making reference to the accompanying drawings.

Figure 26:
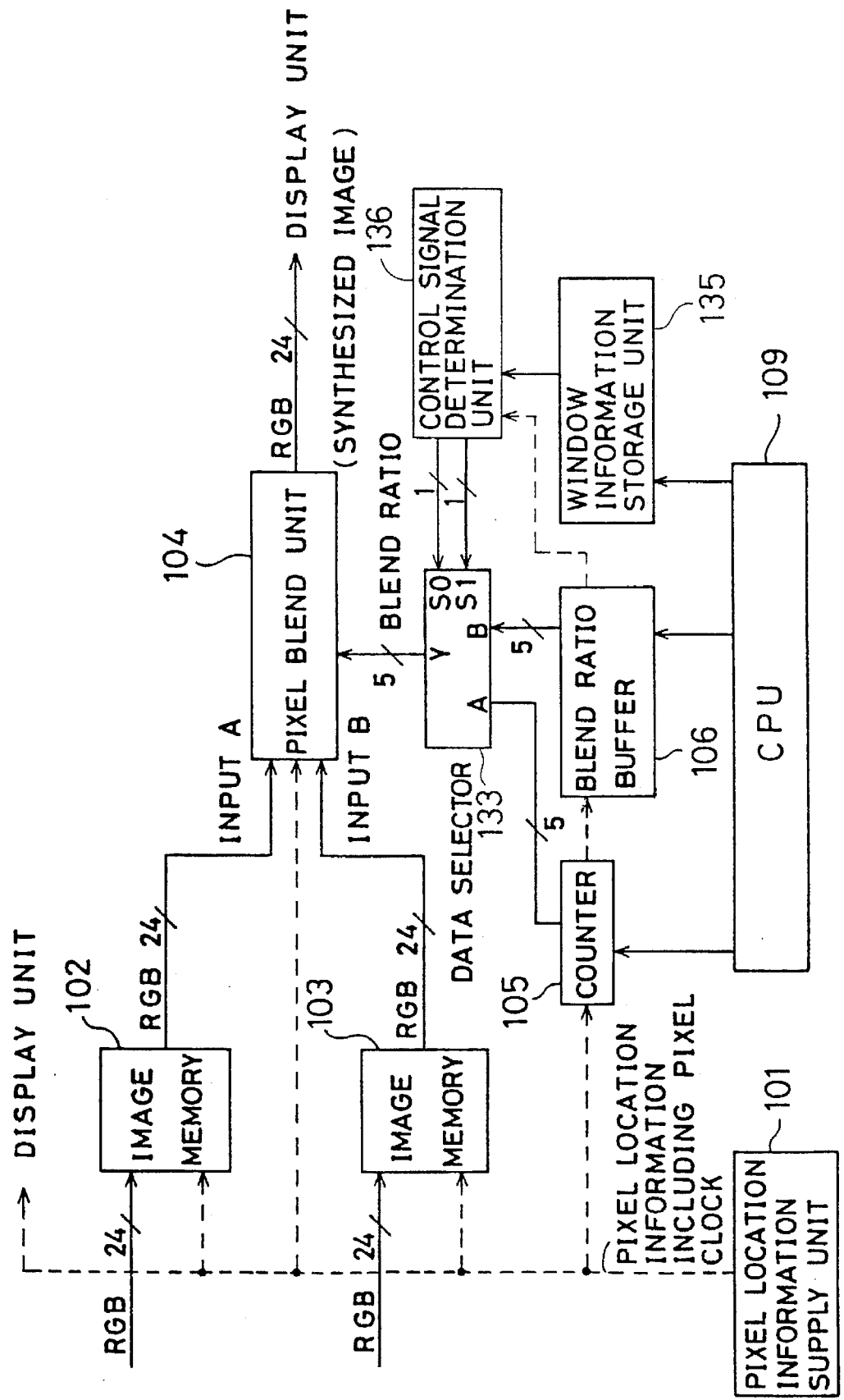
FIG. 26 is a block diagram showing an organization of still another window-controlled image blend circuit according to the present invention.

FIG. 26 shows the third image blend circuit. In FIG. 26, a window information storage unit 135 and a control signal determination unit 136 are shown. The same reference numerals are used for like elements.

In the third image blend circuit, the attribute buffer 134 of the second image blend circuit is replaced by the window information storage unit 135 and the control signal determination unit 136.

The window information storage unit 135 stores window coordinates, priority (i.e., overlap information), and blend ratio selection. For example, information stored at the window information storage unit 135 in the states of FIGS. 18 and 22 is shown in FIGS. 27 and 28. However, it is unnecessary for the window information storage unit 135 to store information in remarks columns of FIGS. 27 and 28. The stored information in the window information storage unit 135 is constantly referred to by the control signal determination unit 136.

The control signal determination unit 136 receives a pixel clock signal, a horizontal blank period signal, and a vertical blank period signal from the pixel location information supply unit 101 and counts the horizontal blank period signals and the pixel clock signals to calculate coordinates of pixel information being transferred. Then, the control signal determination unit 136 makes a comparison between the calculated coordinates and the coordinates stored by the window information storage unit 135 so that the choice of which pixel information to be included in which window is made. If an item of pixel information is included in two or more windows, it is included in a window with the highest priority. The control signal determination unit 136 determines a control signal of the data selector 133 by the blend ratio selection.

The contents of this output are the same as the contents of FIGS. 24 and 25.

Each information item stored by the window information storage unit 135 is assigned a respective window for display. In other words, if a certain information item is found to be included in two or more windows by coordinate calculations, the information must be included in a window with the highest priority ranking. The CPU 109 must follow this constraint when carrying out window setting and updating the contents of storage of the window information storage unit 135.

Each window, which corresponds to data of one line of FIG. 27 or FIG. 28 and which is stored in the window information storage unit 135, does not always correspond to a window as an operator operation unit. For example, in the display state of FIG. 20, windows as operator operation unit are the document 131 displayed in the first area 125 and the pattern 132 displayed in the third area 127. In addition to these windows, the window information storage unit 135 requires a root window for the entire display screen and window data corresponding to an overlap field equivalent to the fourth area 128 and stores information of FIG. 28. For example, within the fourth area 128, three registered windows other than the root window are found by coordinate calculations to match with one another; however, taking into account window priority ranking, only a window having priority 2 corresponding to an overlap of the document 131 and pattern 132 is selected. This meets the constraint described above.

Blend ratios for pixels are determined in the above-described way, and other operations of the third image blend circuit are the same as the second image blend circuit.

In the second image blend circuit, during a period from a point at which power is turned on until the display state of FIG. 18 in which no translucent synthesis is carried out, a binary number of 11 is written to each pixel information of the attribute buffer 134 in order that the pixel blend unit 104 selects an output of the first image memory 102. As a result, data write of 1152×900×2=2,037,600 bits is necessary.

Conversely, in the third image blend circuit, instead of data write by the attribute buffer 134 for transition to the display state of FIG. 18, the information of FIG. 27 is written to the window information storage unit 135.

For example, such data is formed by 11 bits for X-axis, 10 bits for Y-axis, 9 bits for priority ranking, and 2 bits for blend ratio selection so that each window needs 32 bits. There are three pieces of window information in FIG. 27 so that only 96 bits are required.

Further, when a window displaying the pattern 132 of FIG. 18 is moved for transition to the state of FIG. 20, information stored in the window information storage unit 135 corresponding to the pattern 132 is updated and window information corresponding to an overlap field equivalent to the area 128 is added instead of changing pixel information of 230×150=34,500 pixels, in order to change the contents of the area 128 of the attribute buffer to such a value as to select an output of the counter 105. Only 64-bit date write is necessary.

In the third image blend circuit, if the number of windows or the number of overlapped fields increases, then the amount of information to be stored at the window information storage unit 135 increases and the amount of information to be updated by window operations increases. Therefore, the window count and the overlap field count are limited by how much information the window information storage unit 135 can store. Allowing that there is such a limitation, the amount of write data required is lessened when the display area (i.e., the number of pixels) expands by means of window operation.

As described above, in the third image blend circuit, the attribute buffer 134 of the second image blend circuit is replaced by the window information storage unit 135 and the control signal determination unit 136, as a result of which the amount of write data required is lessened when setting the blend ratio depending on the window and updating the existing display state with respect to window operation.

Additionally, the attribute buffer 108 of the first image blend circuit may be replaced by the window information storage unit 135 and the control signal determination unit 136.

In each of the first to third image blend circuits, a single counter 105 which serves also as a register is provided. Two or more counters 105 may be provided. Particularly, in the second and third image blend circuits, the number of registers or the number of counters may be increased, and in stead of selecting a fixed value, an output of the register or counter may be selected. In such a case, it is possible to increase an area by a proportional amount to the number of registers where the blend ratio can be rewritten independently at high speed. It is however to be noted that the increase in the number of registers produces some drawbacks. For example, the number of choices for the data selector 107 or the data selector 133 increases. The number of bits of control signals for the data selector 107 and the data selection 133 increases. The capacitance of the attribute buffer 108, the attribute buffer 134, or the window information storage unit 135 increases. High-speed performance may be ill-influenced. In cases where the decrease in performance speed can be tolerated, any blend ratio distribution can be realized with the blend ratio buffer 106.

FIRST EMBODIMENT OF WEIGHTED AVERAGE CIRCUIT

A first weighted average circuit according to the present invention is described by reference to FIG. 15.

Figure 29:
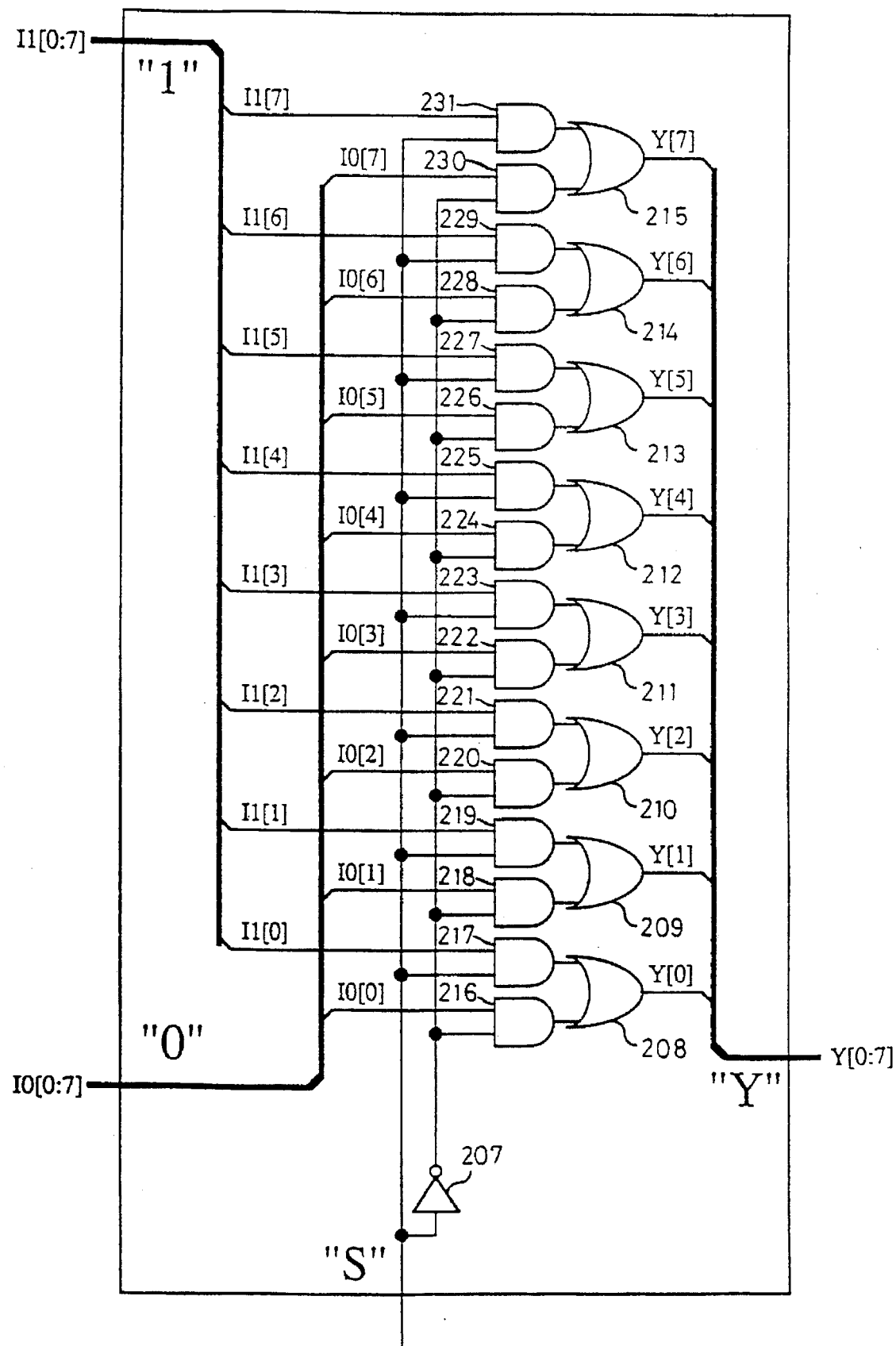
FIG. 29 shows a logic circuit of a selector of a first weighted average circuit according to the present invention.

FIG. 15 shows an organization of the first weighted average circuit. 201 indicates an addition or weighing circuit. 202–206 indicate selectors. FIG. 29 shows a logic circuit of the selector. 207 indicates an inverter. 208–215 indicate 2-input AND circuits. 216–231 indicate 2-input OR circuits.

Figure 30:
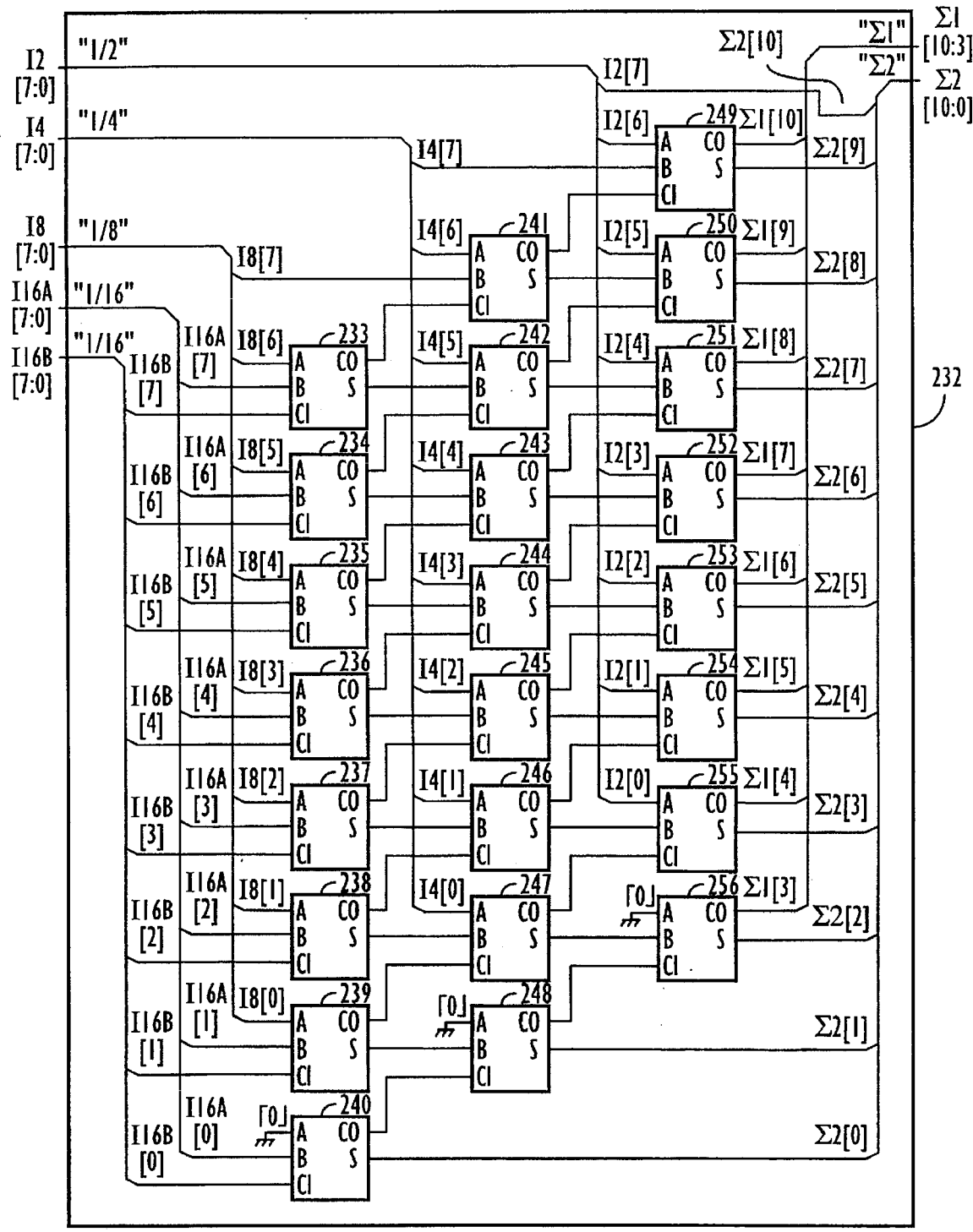
FIG. 30 is a block diagram of a first partial addition circuit of the first weighted average circuit.
Figure 31:
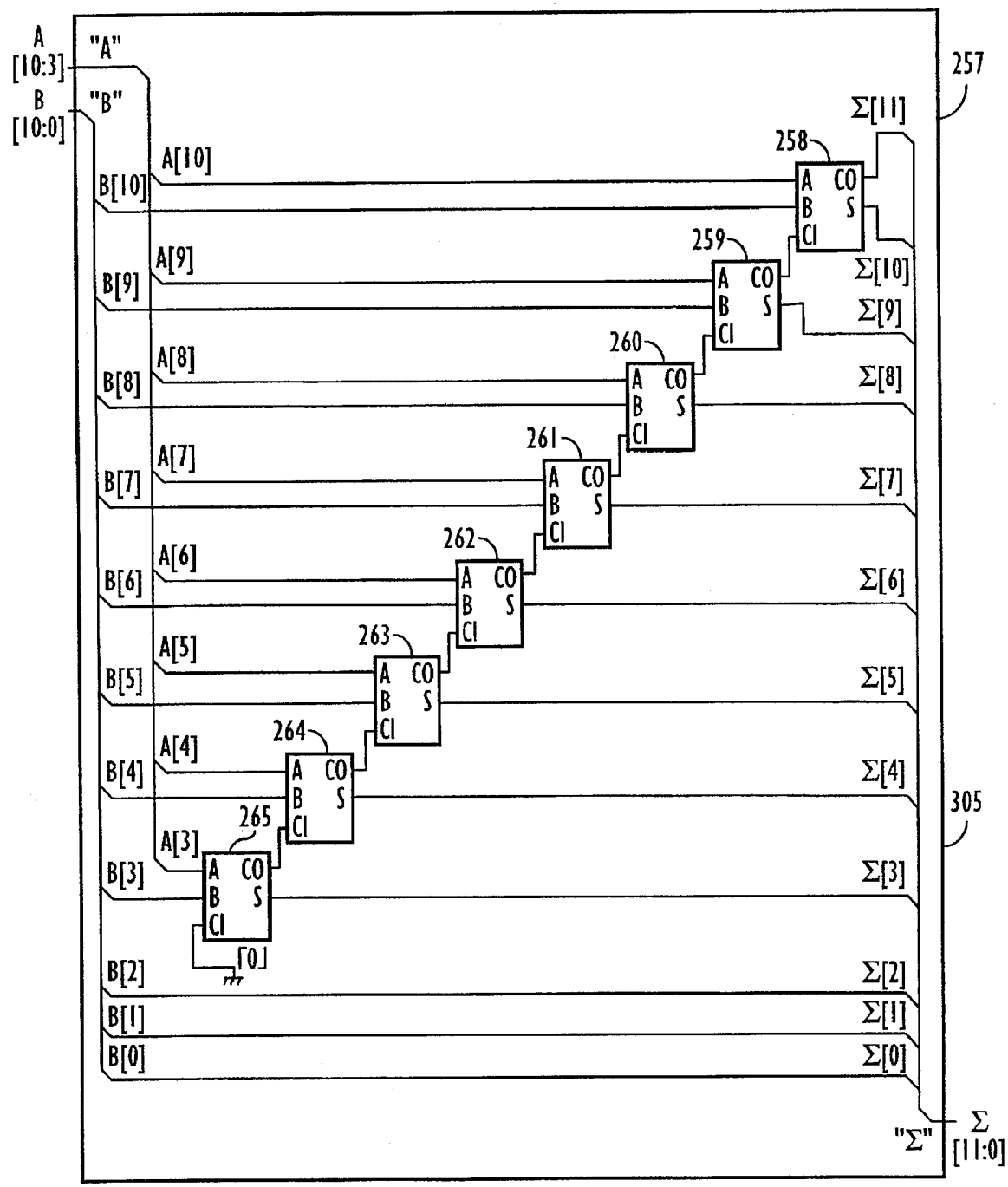
FIG. 31 is a block diagram of a second partial addition circuit.

The addition circuit 201 is formed by continuation-connecting a partial addition circuit 232 of FIG. 30 and a partial addition circuit 257 of FIG. 31. The partial addition circuit 232 gives an output of Σ1, the output Σ1 being connected to an input A of the partial addition circuit 257. The partial addition circuit 232 gives an output of Σ2, the output Σ2 being connected to an input B of the partial addition circuit 257. In FIGS. 30 and 31, 233–256 and 258–265 indicate 1-bit full adders. FIG. 32 shows a logic circuit operation true table of the full adder.

The addition circuit 201 inputs 8-bit binary numbers which have been multiplied by their respective weights (i.e., 1/2, 1/4, 1/8, 1/16 and 1/16) by means of digit shift, sums those products and outputs a sum. These weights total to 1 and form a geometrical progression of a common ratio of 1/2. The weight of output is the total of weights (i.e., 1) and is shifted 4 digit places from the minimum weight of 1/16. Therefore, the output is 12 bits. The selectors 202–206 select between an INPUT SIGNAL A and an INPUT SIGNAL B for their respective weight inputs. S2–S6 are selector control signals.

The operation of the addition circuit 201 is explained. A selector control signal input S has a value of 0 or 1. If S=1, an output Y=A. On the other hand, if S=0, Y=B. For example, the output Y of the selector 202 can be written Y=[S2×A+(1−S2)×B]. Outputs of the selectors 202–206 are multiplied by weights and those products are summed. If the value of an output of the addition circuit 201 is expressed by A, B, and S2–S6, this is the following formula (2). The following formula (3) is obtained by changing the formula (2) and the following formula (4) is obtained by changing the formula (3).

$$[S1 \times A + (1 - S2) \times B]/2 + [S3 \times A + (1 - S3) \times b]/4 + \quad (2)$$
$$[S4 \times A + (1 - S4) \times B]/8 + [S5 \times A + (1 - S5) \times B]/16 +$$
$$[S6 \times A + (1 - S6) \times b]/16$$

$$[S2/2 + S3/4 + S4/8 + S5/16 + S6/16] \times A + \quad (3)$$
$$[(1 - S2)/2 + (1 - S3)/4 + (1 - S4)/8 + (1 - S5)/16 +$$
$$(1 - S6)/16] \times B$$

$$[S2/2 + S3/4 + S4/8 + S5/16 + S6/16] \times A + \quad (4)$$
$$(1 - [S2/2 + S3/4 + S4/8 + S5/16 + S6/16]) \times B$$

If the blend ratio α=S2/2+S3/4+S4/8+S5/16+S6/16, the output is α×A+(1−α)×B. The first, second, third and fourth terms of α=S2/2+S3/4+S4/8+S5/16+S6/16 show that (S2, S3, S4, S5) represents a binary number with four decimal places. 16 different values can be represented at intervals of 0.0625 within the 0–0.9375 range with the first and fourth terms. If S6 is 0, then the fifth term becomes 0. Therefore, the blend ratio α becomes the above-shown value. On the other hand, if S6=1, then the fifth term has a value of 0.0625. As a result, the blend ratio α can take 16 different values at intervals of 0.0625 within the 0.0625–1 range. Of the number of values that the blend ratio α can take when S6=0 and the number of values that the blend ratio α can take when S6=1, 15 values are overlapped. In other words, it is possible to designate 17 different blend ratios at intervals of 0.0625 within the 0–1 range with (S2, S3, S4, S5, S6).

To sum up, with the first weighted average circuit, α×A+ (1−α)×B can be calculated accurately in the case of 17 different blend ratio values.

How the addition circuit 201 operates is explained specifically. If values of A and B are decimal numbers, say, 217 and 38, then those numbers can be binary-represented as 11011001 and 00100110. If (S2, S3, S4, S5, S6)=(1,0,1,1,0), this is expressed by the following formula (5):

$$\alpha = 1/2 + 1/8 + 1/16 = 11/16 = 0.6875 \quad (5)$$

Due to these inputs, the selectors 202, 204, 205 select the value of A, while on the other hand the selector 203, 206 select the value of B. Therefore, the following calculation is performed in the addition circuit 201.

```
    1101100.1        ... weight 1/2 × A
    001001.10        ... weight 1/4 × B
    11011.001        ... weight 1/8 × A
    1101.1001        ... weight 1/16 × A
 +) 0010.0110        ... weight 1/16 × B
    10100001.0001 (output)
```

The above output of 10100001.0001 (binary notation) is 161.0625 (decimal notation). This proves that 217×0.6875+ 38×0.3125 is calculated correctly.

Another example is shown. If values of A and B are decimal numbers, say, 25 and 131, then those numbers can be binary-represented as 00011001 and 10000011. If (S2, S3, S4, S5, S6)=(1,1,0,1,0), this is expressed by the following formula (6):

$$\alpha = 1/2 + 1/4 + 1/16 = 13/16 = 0.8125 \quad (6)$$

Due to these inputs, the selectors 202, 203, 205 select the value of A, while on the other hand the selectors 204, 206 select the value of B. Therefore, the following calculation is performed in the addition circuit 201.

```
    0001100.1        ... weight 1/2 × A
    000110.01        ... weight 1/4 × B
    10000.011        ... weight 1/8 × A
    0001.1001        ... weight 1/16 × A
 +) 1000.001         ... weight 1/16 × B
    00101100.1110 (output)
```

The above output of 00101100.11100001 (binary notation) is 44.875 (decimal notation). This proves that 25×0.8125+131×0.1875 is calculated correctly.

The first weighted average circuit of the present invention is now compared with a multiplier.

The first weighted average circuit is formed by the addition circuit 201 having five 8-bit inputs and the five 8-bit selectors 202–206, the five 8-bit inputs of the addition circuit 201 being connected to the corresponding selectors 202–206. As shown in FIG. 29, each of the 8-bit selectors 202–206 is formed by eight 2,2 input AND-OR circuits and a single inverter. The first weighted average circuit has 40 AND-OR circuits in all. The multiplier for multiplication of an 8-bit value times a 5-bit is formed by connecting five 8-bit inputs and forty 2-input AND gates which compute the AND of a multiplier bit with a multiplicand bit (8×5=40 AND's). As described above, the first weighted average circuit is identical in addition circuit size with the 8×5 bit multiplier. Although circuitry upstream of the addition circuit 201 becomes somewhat larger because of the provision of the forty AND gates and the forty AND-OR circuits, such expansion is negligible against the entire addition circuit. As a whole, the first weighted average circuit and the multiplier are almost the same in computing time and circuit size.

In the present embodiment, the multi-input addition circuit 201 is formed in such a way that the total of weights is twice the maximum weight of 1/2 (i.e., 1) and the selectors 202–206 select respective signals applied to the addition circuit 201 by weight. This makes it possible to provide an improved weighted average circuit with fewer gates capable of correctly computing $\alpha \times A + (1-\alpha) \times B$ at a high speed.

In the present embodiment, four input signals represented by binary notation are applied to the addition circuit 201. It is not necessary for such input signals to be represented by binary notation. The base i number system may be useful, which is also applied to the following embodiments.

SECOND EMBODIMENT OF WEIGHTED AVERAGE CIRCUIT

A second weighted average circuit of the invention is described by making reference to the accompanying drawings.

Figure 33:
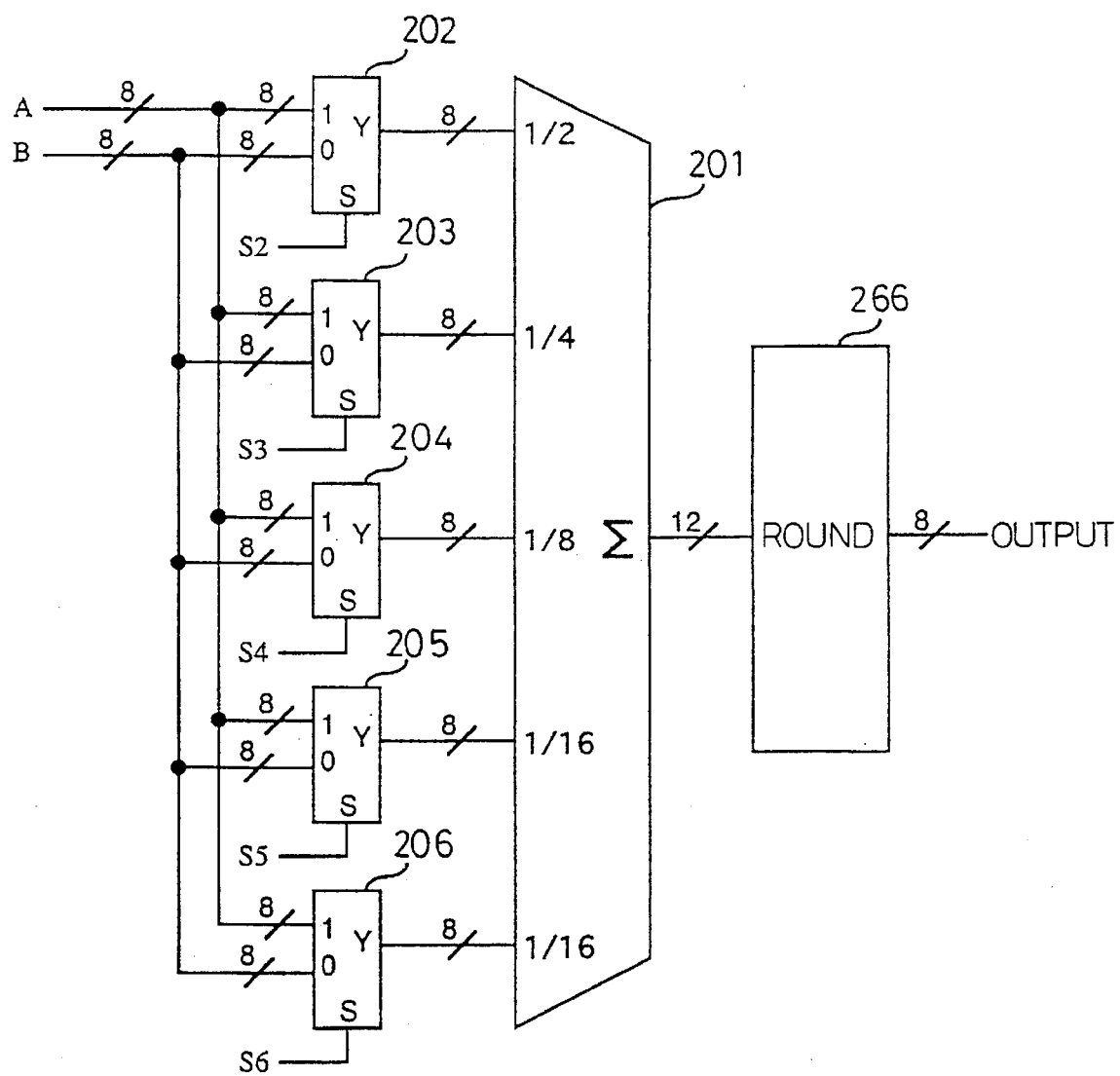
FIG. 33 is a block diagram of a second weighted average circuit according to the present invention.

FIG. 33 shows an organization of the second weighted average circuit. In FIG. 33, 266 indicates a round circuit in which 0 is rounded down and 1 is rounded up. The same reference numerals are used for like elements.

Figure 34:
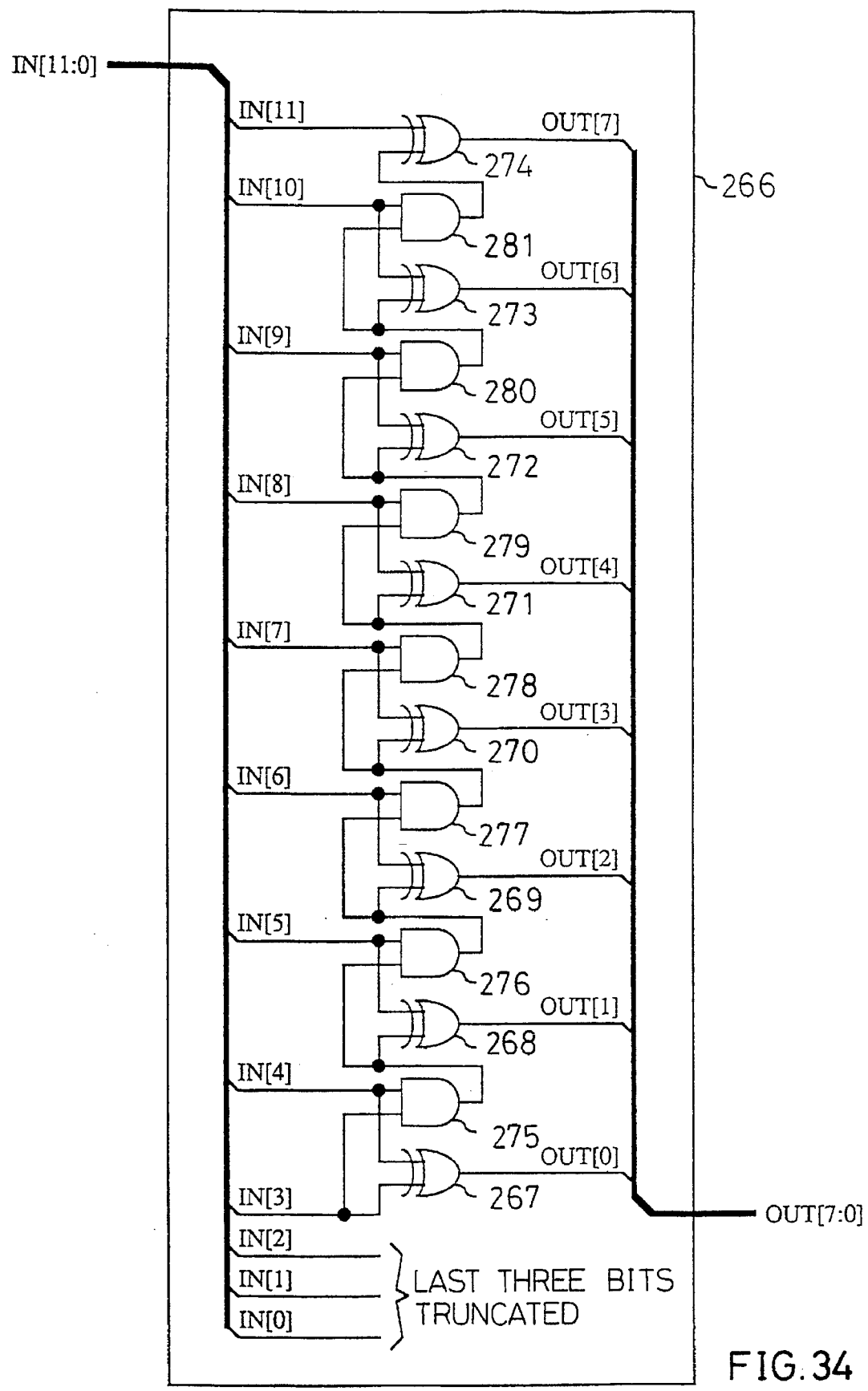
FIG. 34 is a logic circuit of a round circuit.

The circuit 266 has such a logic circuit as shown in FIG. 34. In FIG. 34, 267–274 are 2-input exclusive OR (XOR) circuits and 275–281 are 2-input AND circuits.

The circuit 266 is fed 12 bits. Of these 12 bits, the last three bits are truncated. If the last of the remaining 9 bits is a 0, the last bit is ignored and the remaining 8 bits are output. If the last of the remaining 9 bits is a 1, the last bit is moved up one bit place to an eighth bit place (i.e., an addition of 1). Then, an output of 8 bits is given.

In the present embodiment, $A \leq 11111111$ (binary notation), $B \leq 11111111$ (binary notation), and $0 \leq \alpha \leq 1$. Therefore, a value input to the circuit 266 (i.e., an output of the addition circuit 201) is $\alpha \times A + (1-\alpha) \times B \leq 11111111.0000$ (binary notation). In the circuit 266, no overflows occur due to a carry, so that it is unnecessary to compute the AND of an output of the AND circuit 281 with IN[11] for a carry up to a higher bit.

The operation of the second weighted average circuit is explained, which is completely the same as the first weighted average circuit up to a point where the addition circuit 201 outputs. Although the addition circuit 201 originally gives an output of 12 bits, such an output is rounded by the circuit 266 down to an 8-bit output.

The above operation is specifically described. Suppose A has a value of 217 (decimal notation) and B has a value of 38 (decimal notation). If (S2, S3, S4, S5, S6)=(1,0,1,1,0), that is, if $\alpha=0.6875$, the addition circuit 201 gives an output of 12 bits (i.e., 10100001.0001) that is equivalent to 161.0625 (decimal notation). This value 10100001.0001 is fed to the circuit 266 in which 4 decimal places thereof are truncated because the ninth bit of 10100001.0001 is a 0. Therefore, an output of the circuit 207 is an 8-bit output (i.e., 10100001) which is equivalent to a decimal number of 161. In this case, the rounding error is −0.625.

Another example is explained. Suppose A is a decimal number of 25 and B is a decimal number of 131. If (S2, S3, S4, S5, S6)=(1,1,0,1,0), that is, if $\alpha=0.8125$, the addition circuit 201 gives an output of 12 bits (i.e., 00101100.1110) that is equivalent to 44.875 (decimal notation). This output value 00101100.1110 is fed to the circuit 266 in which 00101100.1110 rounds up to 00101101 because the ninth bit of 00101100.1110 is a 1. Therefore, an output of the circuit 207 is an 8-bit output (i.e., 00101101) which is equivalent to a decimal number of 45. In this case, the rounding error is 0.125.

Here, the second weighted average circuit and the first weighted average circuit are compared in rounding error. Note that the decimal point lies between an eighth bit and a ninth bit. In other words, an eighth bit represents a unit. In the first weighted average circuit in which its output is rounded down to an 8-bit output, a rounding error $\epsilon$ is $-0.9375 \leq \epsilon \leq 0$ and an average of the error $\epsilon$ is $-0.46875$ if errors distribute in a uniform manner. Conversely, in the second weighted average circuit, the error $\epsilon$ is $-0.4375 \leq \epsilon \leq 0.5$ and an average of the error $\epsilon$ is $0.03125$ if errors distribute in a uniform manner.

In the second weighted average circuit, the provision of the circuit 266 decreases average error values.

Further, the partial addition circuit 257 of the addition circuit 201 may be modified so as to contain the circuit 266. This reduces the number of circuit levels thereby reducing the amount of circuitry as well as computing time.

THIRD EMBODIMENT OF WEIGHTED AVERAGE CIRCUIT

A third weighted average circuit of the present invention is described by reference to the accompanying drawings.

Figure 35:
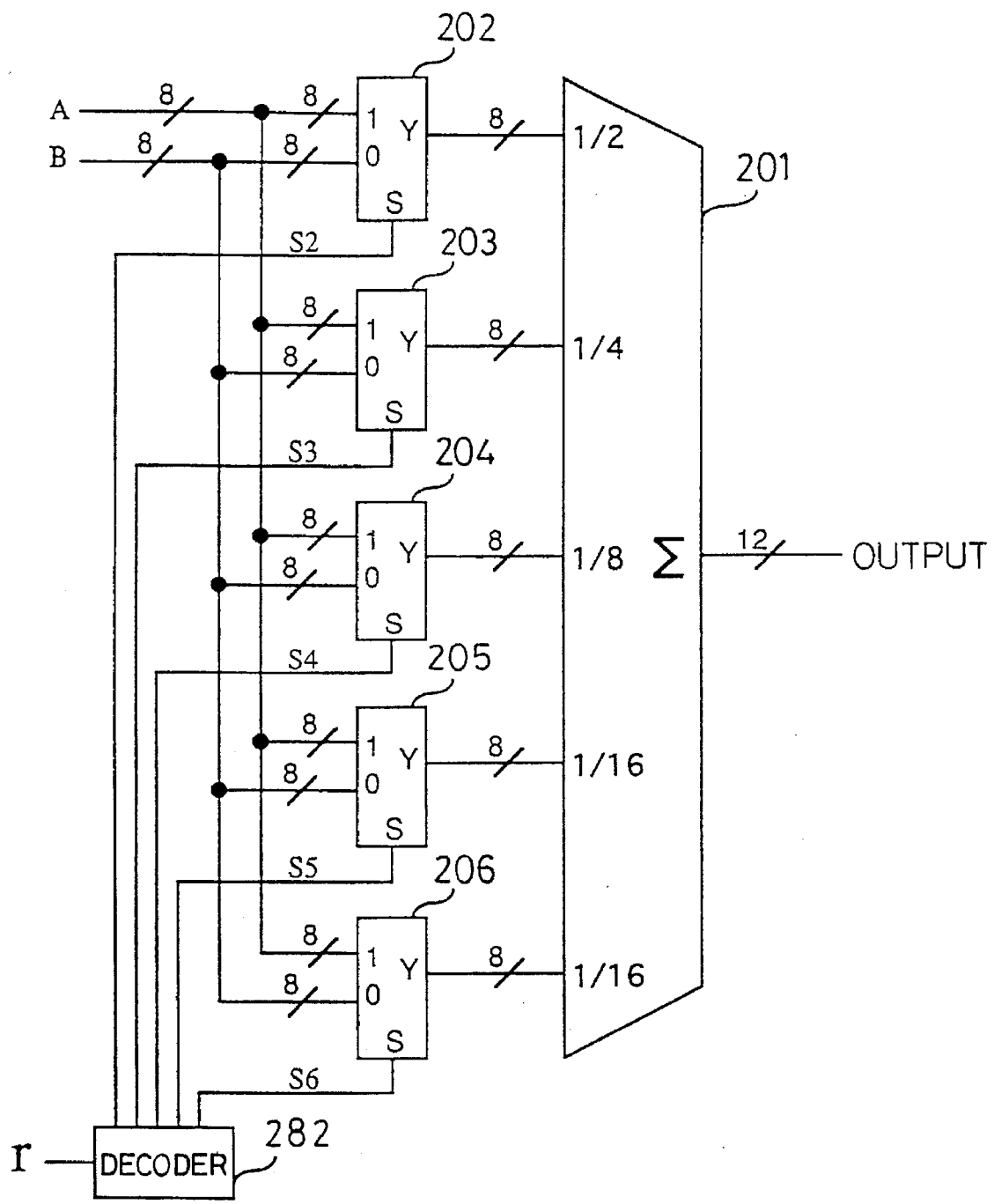
FIG. 35 is a block diagram of a third weighted average circuit according to the present invention.

FIG. 35 shows the third weighted average circuit. In FIG. 35, 282 is a decoder acting as a control means capable of outputting selection control signals to control the selectors 202–206. The same reference numerals are used for like elements.

Figure 36:
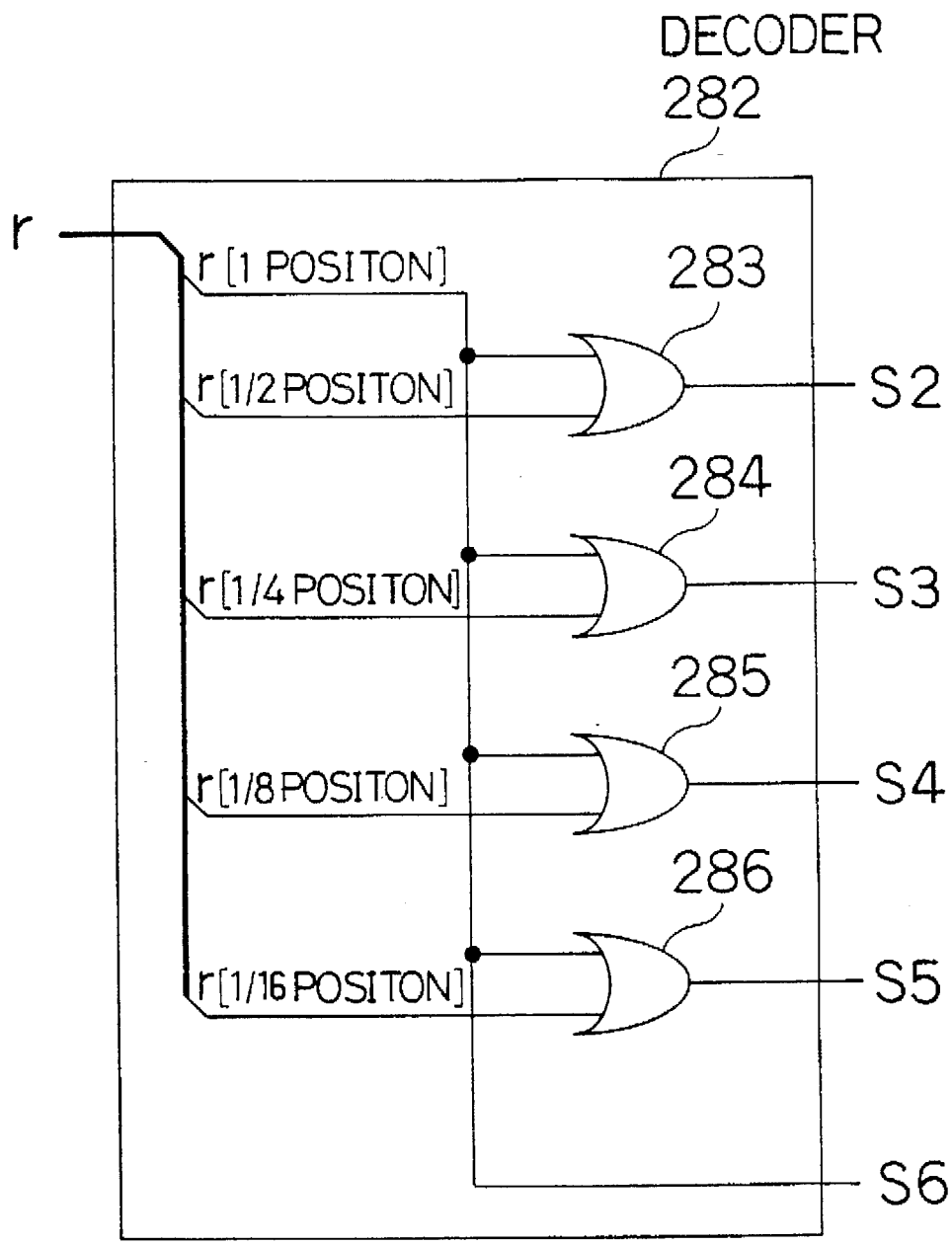
FIG. 36 is a logic circuit of a decoder in the third weighted average circuit.

FIG. 36 shows a circuit diagram of the decoder 282. In FIG. 36, 283–286 indicate 2-input OR circuits.

As in the first weighted average circuit, the addition circuit 201 inputs 8-bit binary numbers which have been multiplied by their respective weights (i.e., 1/2, 1/4, 1/8, 1/16 and 1/16) by means of digit shift, sums those products and outputs a sum.

The operation of the third weighted average circuit is described. An input r is applied to the decoder 282 by which the input r is converted into the selection control signals S2–S6. From the decoder 282, the selection control signals S2–S6 are output. The selectors 202–206 and the addition circuit 201 operate in the same way as in the first weighted average circuit. The weights (i.e., 1/2, 1/4, 1/8, and 1/16) corresponding to the selectors 202–206 form a geometrical progression of a common ratio of 1/2. Therefore, if S6=0, the circuit operates at the blend ratio $\alpha=S2/2+S3/4+S4/8+S5/16$ where (S2, S3, S4, S5) is regarded as representing 4 decimal places. The input r is a fixed-point binary number of 5 bits with its MSB being as a unit and represents a range from 0.0000 to 1.1111. If MSB of the input r is a 0, then the decoder 282 outputs the last four bits of the input r to (S2, S3, S4, S5) so that S6 becomes a 0. If MSB of the input r is a 1, the input r has a value equal to or greater than 1. In such a case, the operation is carried out taking the blend ratio $\alpha=1$. In other words, the blend ratio is so interpreted that it saturates at 1. Therefore, if MSB of the input r is a 1, S2=S3=S4=S5=S6=1.

The above will be specified. For example, if r=1.0110, (S2, S3, S4, S5, S6)=(1,1,1,1,1) because MSB of the input r is a 1. If r=0.1001, (S2, S3, S4, S5, S6)=(1,0,0,1,0) because MSB of the input r is a 0.

In the present embodiment, the weights of 1/2, 1/4, 1/8, 1/16, and 1/16 excluding the last 1/16 form a geometrical progression of a common ratio of 1/2 and the last weight (i.e., 1/16) and the second last weight (i.e., 1/16) are the same. As a result of such arrangement, a fixed-point number r as given, which represents the blend ratio $\alpha$ in a certain range, can be used as a selection control signal. Further, application of the fixed-point number r to the decoder 282 makes it possible to control a selector so that it (the selector) can operate adequately according to "r" even in a range within which the as-given r cannot be used. Therefore, the third weighted average circuit can operate adequately, regardless of the value of the fixed-point number r indicative of the blend ratio.

FOURTH EMBODIMENT OF WEIGHTED AVERAGE CIRCUIT

A fourth weighted average circuit of the present invention is now described below by making reference to the accompanying drawings.

Figure 37:
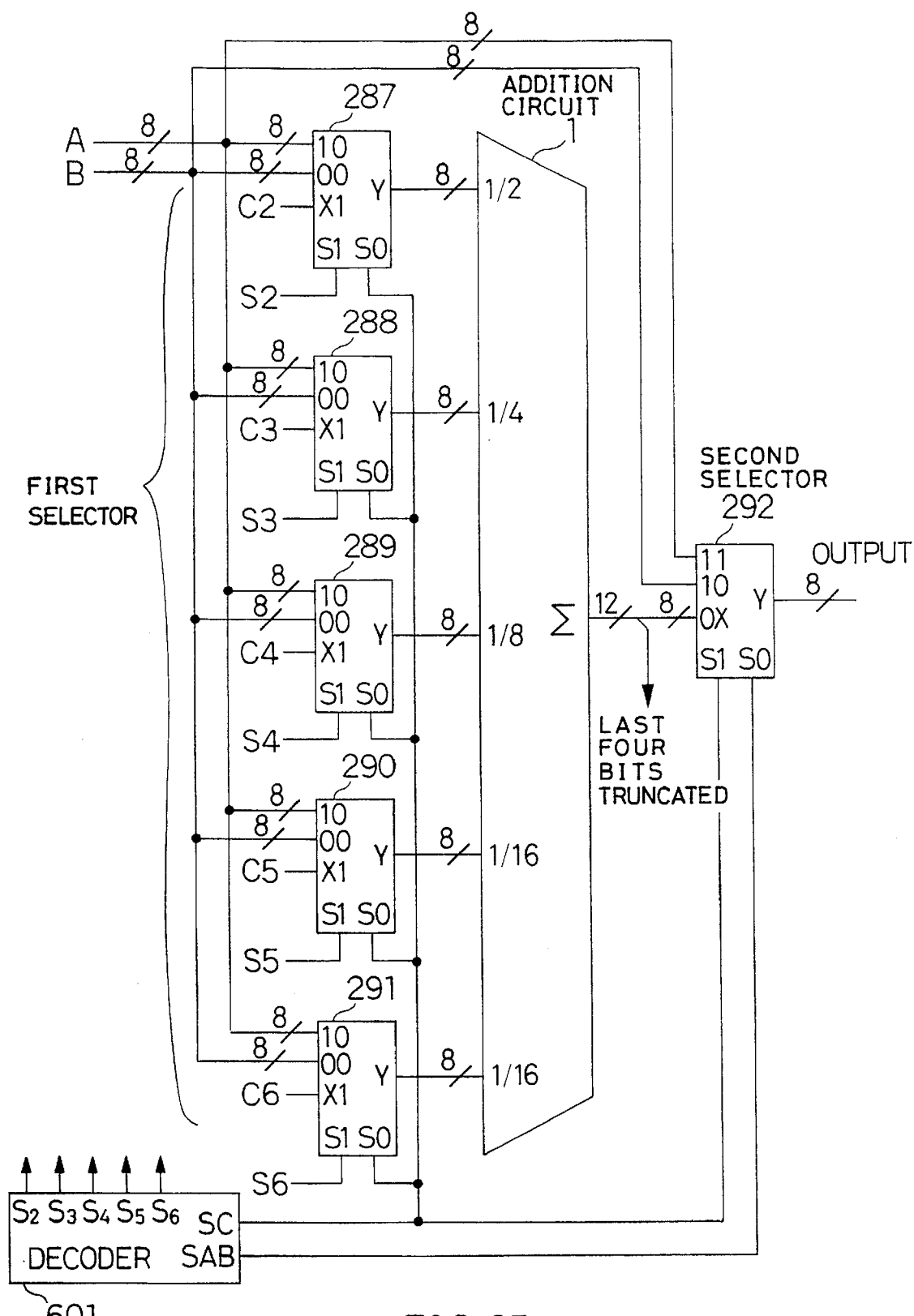
FIG. 37 is a block diagram of a fourth weighted average circuit according to the present invention.
Figure 38:
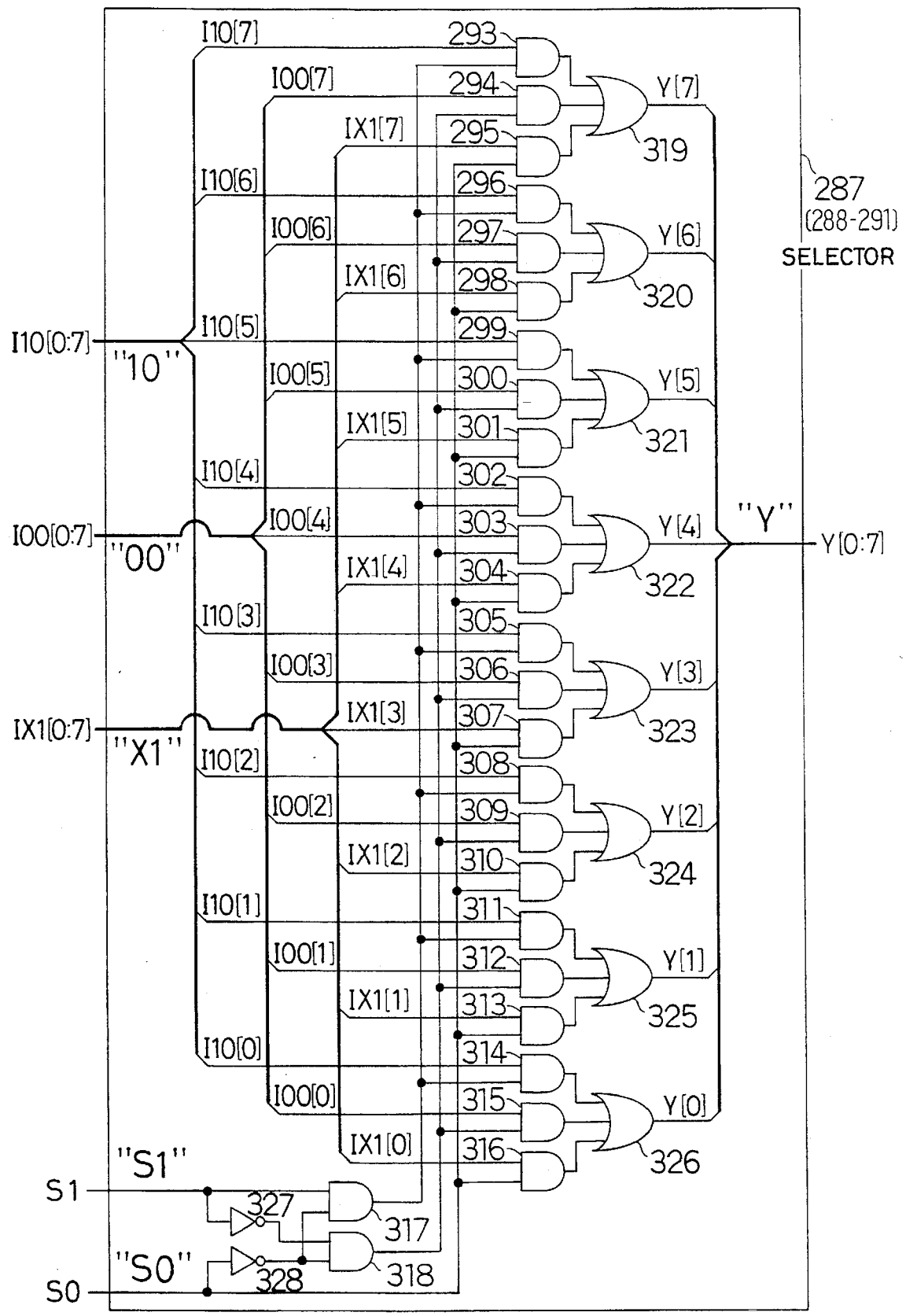
FIG. 38 is a logic circuit of a first selector in the fourth weighted average circuit.
Figure 39:
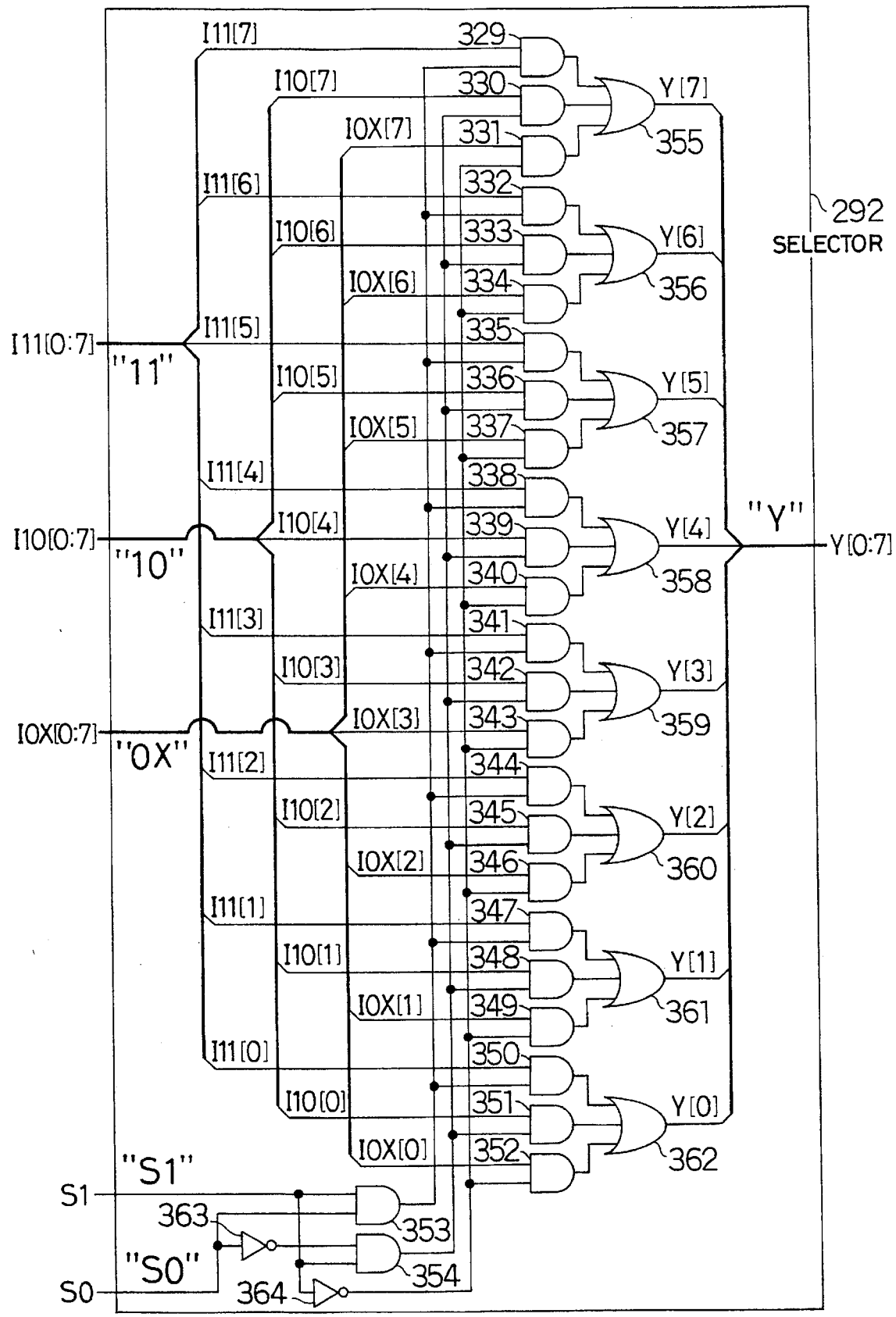
FIG. 39 is a logic circuit of a second selector in the fourth weighted average circuit.
Figure 40:
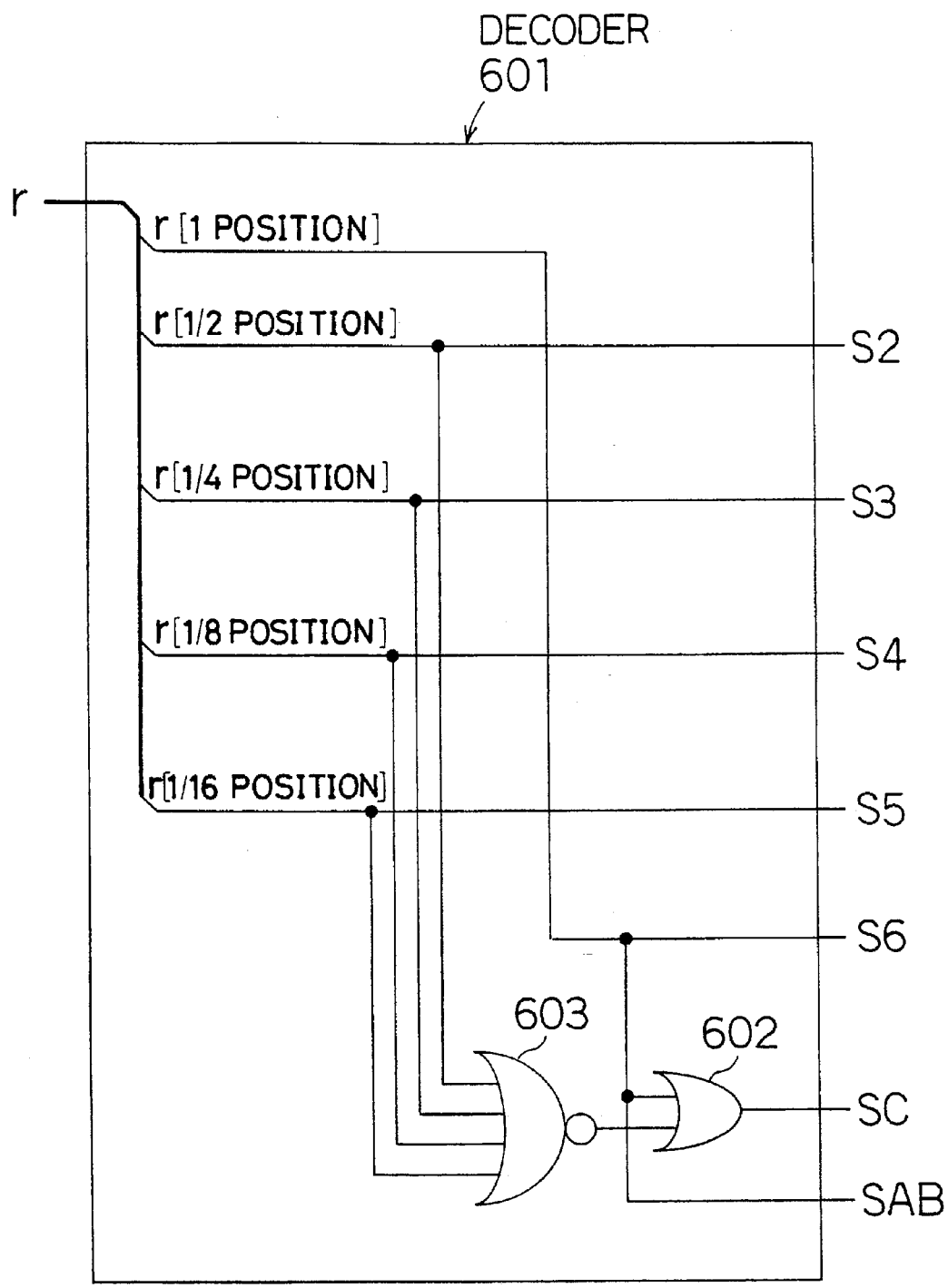
FIG. 40 is a logic circuit of a decoder in the second weighted average circuit.

FIG. 37 is a block diagram showing the fourth weighted average circuit. 287-291 are first selectors. 292 is a second selector. 601 indicates a decoder. The same reference numerals are used for like elements. FIG. 38 shows a logic circuit of the first selector 287 (288, 289, 290, 291). FIG. 39 shows a logic circuit of the second selector 292. FIG. 40 shows a logic circuit of the decoder 601.

In FIG. 38, 293-318 are 2-input AND circuits, 319-326 are 3-input OR circuits, and 327-328 are inverters. In FIG. 39, 329-354 are 2-input AND circuits, 355-362 are 3-input OR circuits, and 363 and 364 are inverters.

The process of weighting in the present embodiment is carried out in the same way as the first weighted average circuit. An output of the addition circuit 201 is formed by 12 bits of which the last four bits are truncated. As a result, an output of 8 bits is applied from the addition circuit 201 to the selector 292. The first selector 287 (288, 289, 290, 291) inputs a constant value C2 (C3, C4, C5, C6) as well as INPUT SIGNALS A and B, selects one from among these inputs, and provides a selected value to the addition circuit 201. The second selector 292 selects among an output of the addition circuit 201 (i.e., an output of 8 bits), INPUT SIGNAL A, and INPUT SIGNAL B thereby outputting what has been selected.

In the decoder 601 of FIG. 40, 602 is a 4-input OR circuit and 603 is a 2-input OR circuit.

The operation of the fourth weighted average circuit is considered below.

In SC (selection control signal)=0, the first selectors 287-291 each select either INPUT SIGNAL A or INPUT SIGNAL B according to their respective selection control signals S2–S6. The second selector 292 selects an output of the addition circuit 201. This is the same as a conventional technique. For synthesis, based on $\alpha$=S2/2+S3/4+S4/8+S5/16+S6/16, $\alpha \times A + (1-\alpha) \times B$ is calculated and the result is output.

Meanwhile, if SC=1, the selector 287 (288, 289, 290, 291) applies an input constant value C2 (C3, C4, C5, C6) to the addition circuit 201, at which time the second selector 292 selects either INPUT SIGNAL A or INPUT SIGNAL B according to an selection control signal SAB. If SAB=1, INPUT SIGNAL A is output. If SAB=0, INPUT SIGNAL B is output.

The fourth weighted average circuit and the third weighted average circuit are compared in power consumption. Suppose both the weighted average circuits use devices such as CMOS that consume only a negligible amount of direct current and power consumption takes place when a value is inverted at an output terminal of a logic gate including a full adder. It is to be noted that there exist no transitional inversions, that values at each output terminal should be inverted at least once during a period from a point at which an input changes until a point at which the following input changes, so that these values come to be correct ones, and that there is 25 µW power consumption per MHz at each output terminal.

In both of the circuits, suppose the operating frequency= 20 MHz, the blend ratio $\alpha$=1, and INPUT SIGNAL A is fixedly output, and suppose (0,0,0,0,0,0,0,0) and (1,1,1,1,1,1,1,1) are alternately input as INPUT SIGNAL A.

In the fourth weighted average circuit, if the blend ratio $\alpha$=1, SC=1. In this case, no values are inverted at any output terminals so that no power is consumed. Only outputs of 8 AND circuits and 8 OR circuits within the second selector 292 which are paths over which INPUT SIGNAL A travels are inverted for every pixel, so that power consumption is calculated by 25 (µW/MHz)×20 (MHz)×16=8000 (µW)=8 (mW).

In the first weighted average circuit, if the blend ratio $\alpha$=1, each of S2–S6 has a value of 1. The selectors 355-359 each let INPUT SIGNAL A pass through. Each selector operates in the same way that the second selector 292 does so that they consume 8 mW each. The total of power consumption by the five selectors 355-359 is 40 mw. Further, in the addition circuit 201, outputs of all the full adders, excluding 4 bits of Σ[3:0], are inverted for every pixel. The full adder count is 32 in all, and the output terminal count is 64 of which 60 output terminals invert values. Therefore, 25 (µW/MHz)×20 (MHz)×60=30000 (µW)=30 (mW). The power consumption of the first weighted average circuit totals to 70 mW.

Additionally, even if the blend ratio $\alpha$ lies between 0 and 1, the addition circuit 201 of the fourth weighted average circuit operates. In such a case, the fourth weighted average circuit consumes power more than a conventional one by an amount of 8 mW consumed by the second selector 292. If INPUT SIGNAL A is given under the foregoing conditions and INPUT SIGNAL B is given so that B=A, then the operation of the addition circuit 201 is the same as in the above-described case where $\alpha$=1. The power consumption of the fourth weighted circuit is 70+8=78 mW.

As described above, less power consumption can be realized in the fourth weighted average circuit not only when the blend ratio $\alpha$=1 but also when the blend ratio a is 0, as compared with the first weighted average circuit. If a control state in which the blend ratio=1 is maintained only for one pixel and is switched immediately, there are produced no effects of decreasing power consumption; however, such a utilization situation seldom occurs. Even if a state where the blend ratio $\alpha$=1 is semi-fixed or switched, there are produced effects of decreasing power consumption because a usual utilization situation is maintained for several hundreds of pixels.

In the fourth weighted average circuit, the selectors of the first weighted average circuit are replaced by the first selectors 202-206 capable of selecting among an output of the addition circuit 201, INPUT SIGNAL A, and INPUT SIGNAL B and the constant value. Also, the second selector 292 is provided thereby making it possible to stop the addition circuit 201 from operating when only selection between INPUT SIGNAL A and INPUT SIGNAL B is required.

FIFTH EMBODIMENT OF WEIGHTED AVERAGE CIRCUIT

A fifth weighted average circuit of the present invention is now explained below.

Figure 41:
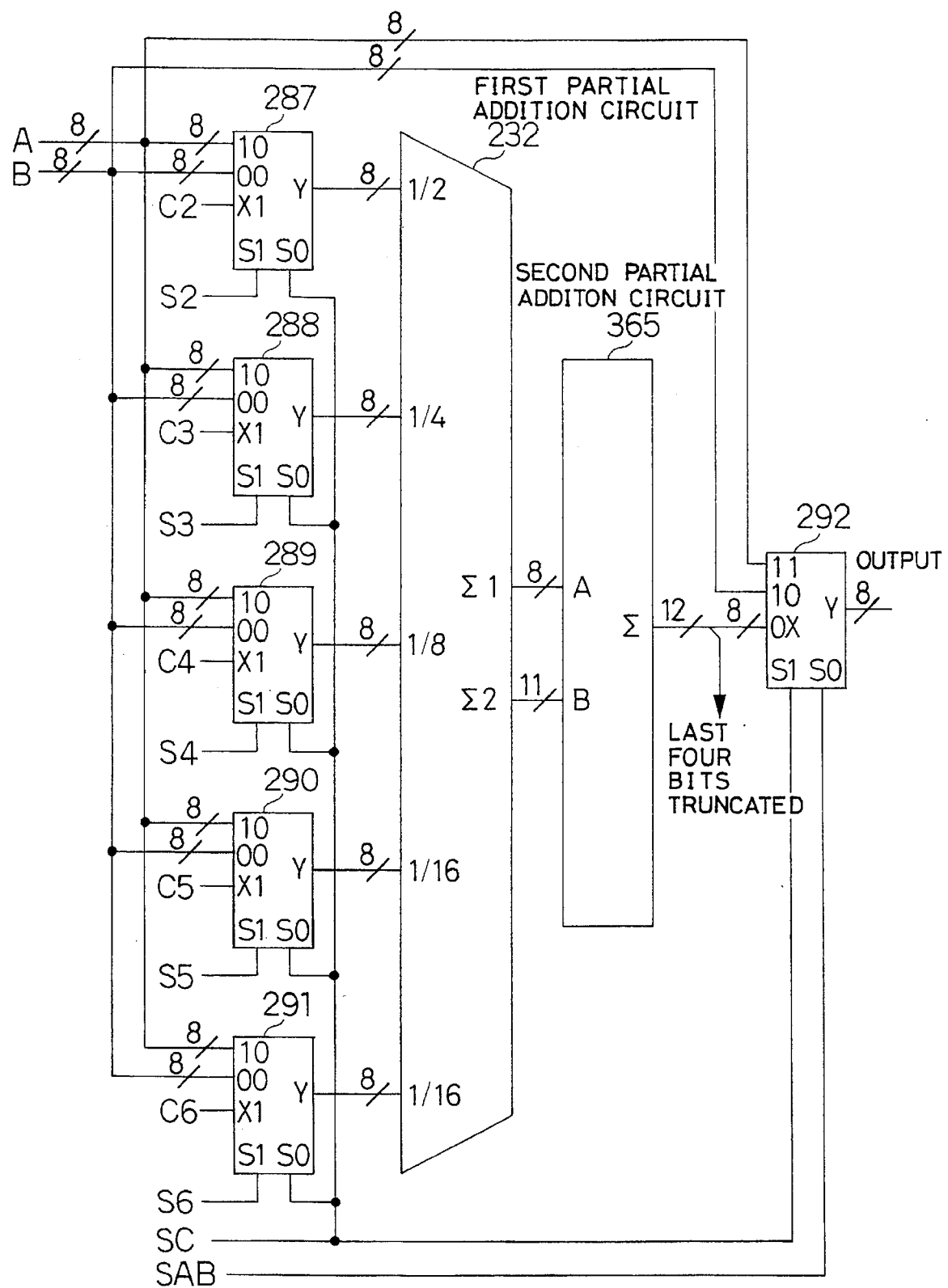
FIG. 41 is a block diagram of a fifth weighted average circuit according to the present invention.

FIG. 41 is a block diagram showing the fifth weighted average circuit. FIG. 41 shows a second partial addition circuit 365. The same reference numerals are used for like elements. FIG. 41 further shows a first partial addition circuit 232 which is identical in internal configuration with the partial addition circuit 232 of FIG. 30.

Figure 42:
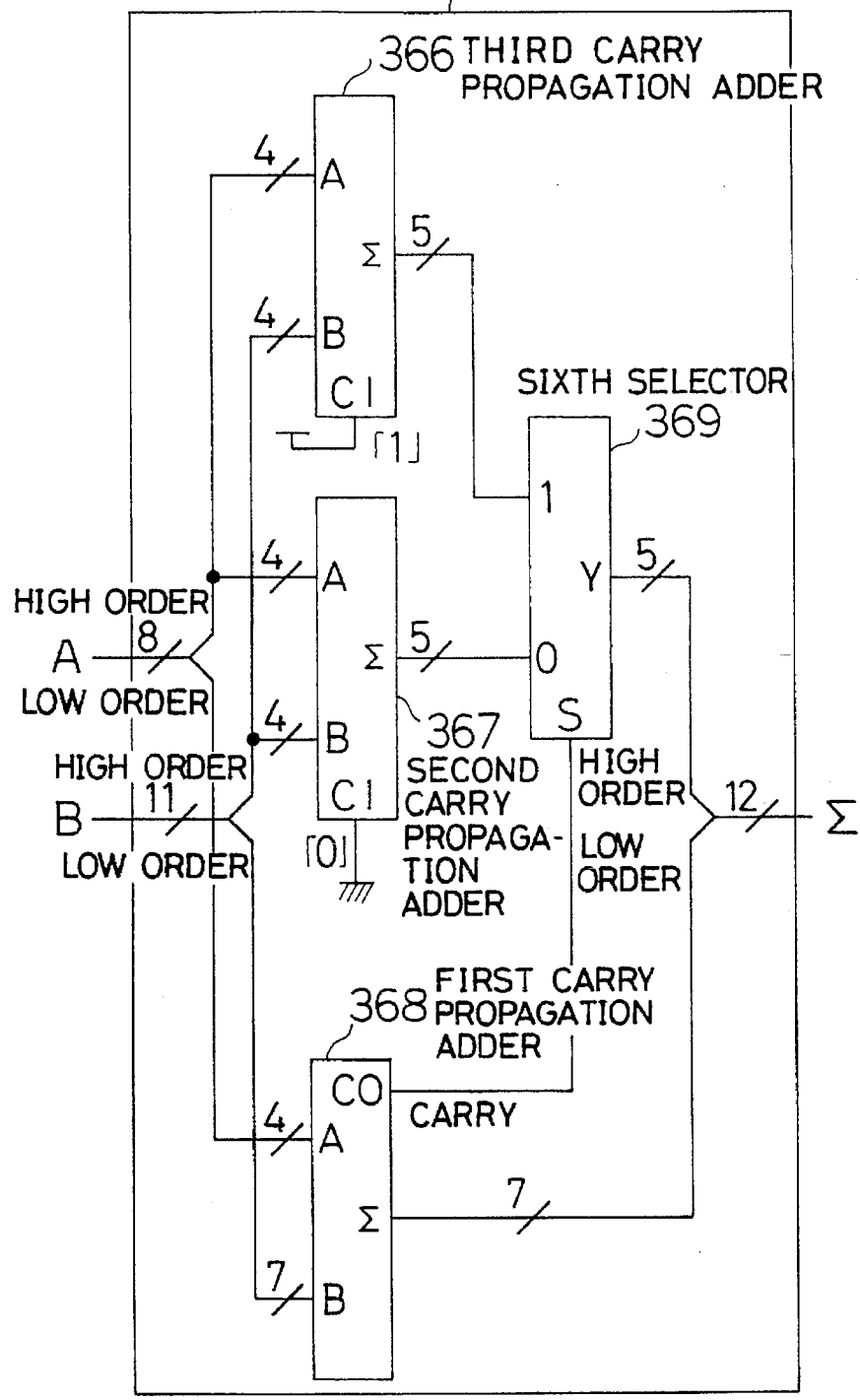
FIG. 42 is a block diagram of a second partial addition circuit in the fifth weighted average circuit.

FIG. 42 is a block diagram showing the second partial addition circuit 365. In FIG. 42, 366 and 367 indicate 4-bit carry propagation adders, 368 is a carry propagation adder capable of summing a 4-bit value and a 7-bit value, and 369 indicates a sixth selector.

Figure 43:
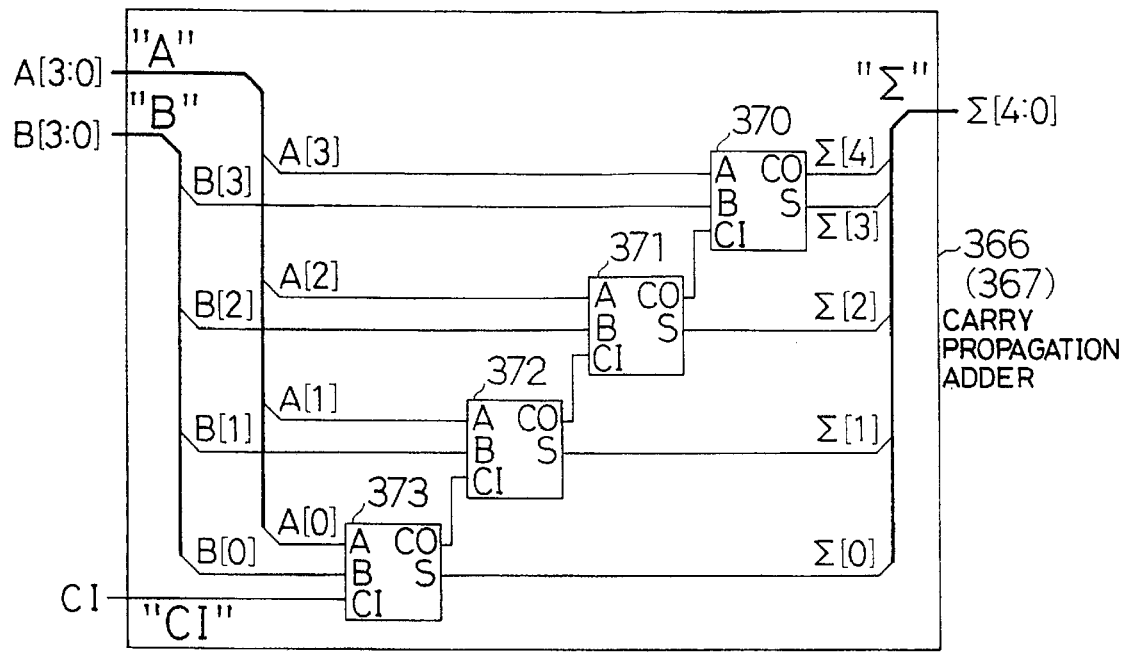
FIG. 43 is a block diagram of a 4-bit carry propagation adder in the fifth weighted average circuit.

FIG. 43 shows a circuit diagram of the carry propagation adder 366 (367). In FIG. 43, 370–373 indicate 1-bit full adders.

Figure 44:
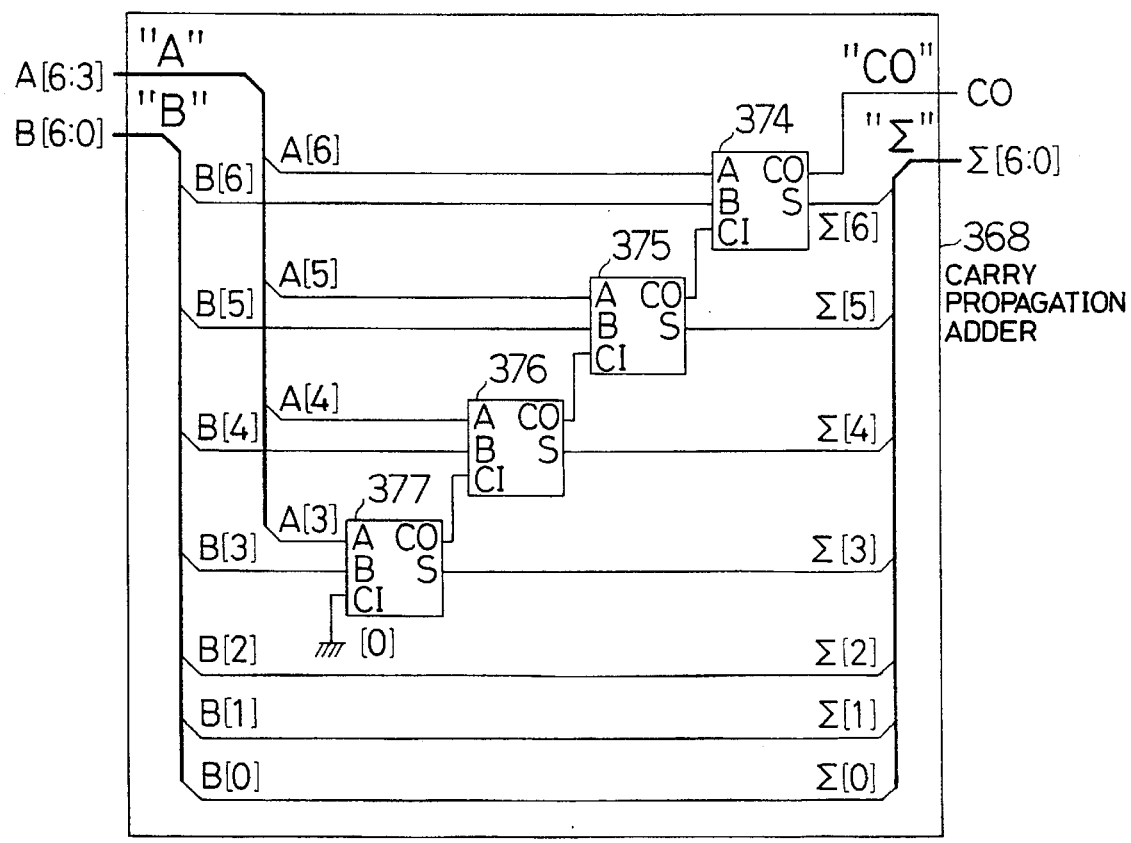
FIG. 44 is a block diagram of a carry propagation adder in the fifth weighted average circuit capable of adding a 4-bit value and a 7-bit value.

FIG. 44 shows a circuit diagram of the carry propagation adder 368. In FIG. 44, 374–377 indicate 1-bit full adders.

The carry propagation adder 368 sums LSB-to-intermediate bit outputs/inputs and outputs a carry generated from the intermediate bit. The carry propagation adder 367 sums intermediate bit-to-MSB outputs/inputs of the partial addition circuit 232 in the case of assuming a carry by the carry propagation adder 368=0. The carry propagation adder 366 sums intermediate bit-to-MSB inputs/outputs of the partial addition circuit 232 in the case of assuming a carry by the carry propagation adder 368=1. The sixth selector 369 selects an output of the carry propagation adder 367 if a carry value by the carry propagation adder 368=0. On the other hand, the sixth selector 369 selects an output of the carry propagation adder 366 if a carry value by the carry propagation adder 368=1.

The sixth selector 369 selects two different binary numbers each formed by 5 bits and has a configuration obtained by cutting by an amount of 3-bit circuitry from the selector shown in FIG. 29. For example, the selector 369 may be formed by removing the 2-input AND circuits 226–231 and the 2-input OR circuits 213–215 from the circuit of FIG. 29.

In the fifth weighted average circuit, the partial addition circuit 365 is used instead of using the partial addition circuit 257 of the fourth weighted average circuit. Both of the addition circuits 201 of the fifth and fourth weighted average circuits have the same computing capability. As in the fourth weighted average circuit, if SC=0, then $\alpha \times A + (1-\alpha) \times B$ is calculated. On the other hand, if SC=1, either one of INPUT SIGNAL A and INPUT SIGNAL B is selected based on SAB, and a selected signal is output. If SAB=1, then INPUT SIGNAL A is output. If SAB=0, then INPUT SIGNAL B is output.

In the first place, the fifth weighted average circuit is compared with the first weighted average circuit. First, their power consumption is considered. In the fifth weighted average circuit, if the blend ratio $\alpha=1$ or if the blend ratio $\alpha=0$, the partial addition circuits 232 and 365 each receive a fixed input. As a result, the selector 292 consumes a small amount of power (i.e., 8 mW).

Meanwhile, in performing blend calculations when the blend ratio $\alpha$ lies between 0 and 1, the partial addition circuits 232 and 365 come to consume power. Compared with the first weighted average circuit, the fifth weighted average circuit consumes slightly more power because of the increased circuitry. The fifth weighted average circuit is larger than the first weighted average circuit because of the provision of four full adders, one inverter, ten AND circuits and five OR circuits. Suppose all the output terminals (24 in all) of the four full adders, the inverter, the ten AND circuits and the five OR circuits invert respective values at 20 MHz (i.e., 25 (µW/MHz)×20 (MHz)×24=12000 (µW)=12 (mW)). Therefore, there is a 12 mw increase in power consumption. The total power consumption of the fifth weighted average circuit is 90 mw.

In the second place, the speed of operation is considered. In the fourth weighted average circuit, the longest path within the addition circuit 201 involves eleven full adders, namely the full adder 240 at which an input is applied, the full adders 248, 256, 265, 264, 263, 262, 261, 260, 259, and the full adder 258 at which an output is provided. On the other hand, in the fifth weighted average circuit, the longest path involves the full adder 240 at which an input is applied and the full adders 248, 256, 377, 376, 375, 374 within the partial addition circuits 232 and 365 and further involves one inverter, one AND circuit, and one OR circuit within the selector 329. In other words, the longest path in the fifth weighted average circuit is formed by seven full adders, one inverter, one AND circuit, and one OR circuit.

Whereas propagation delay of a full adder is about 3 ns, propagation delay of a logic circuit is about 1 ns. In the first weighted average circuit, about 33 ns are required until an output has become an definite output. In the fifth weighted average circuit, it is about 24 ns.

Suppose a calculation for synthesis involving the addition circuit is performed by the entire weighted average circuit. In the first weighted average circuit, the maximum delay from input to output is about 37 ns (i.e., about 33 ns (i.e., the addition circuit's 201 delay) plus delays of selectors provided before and after the addition circuit 201). In the fifth weighted average circuit, the maximum delay is about 28 ns.

This allows the fifth weighted average circuit to operate at a higher frequency, compared with the first weighted average circuit.

Accordingly, it is possible to provide a weighted average circuit capable of shortening computing time and of carrying out video signal processing at an adequate speed.

SIXTH EMBODIMENT OF WEIGHTED AVERAGE CIRCUIT

A sixth weighted average circuit of the present invention is explained.

Figure 45:
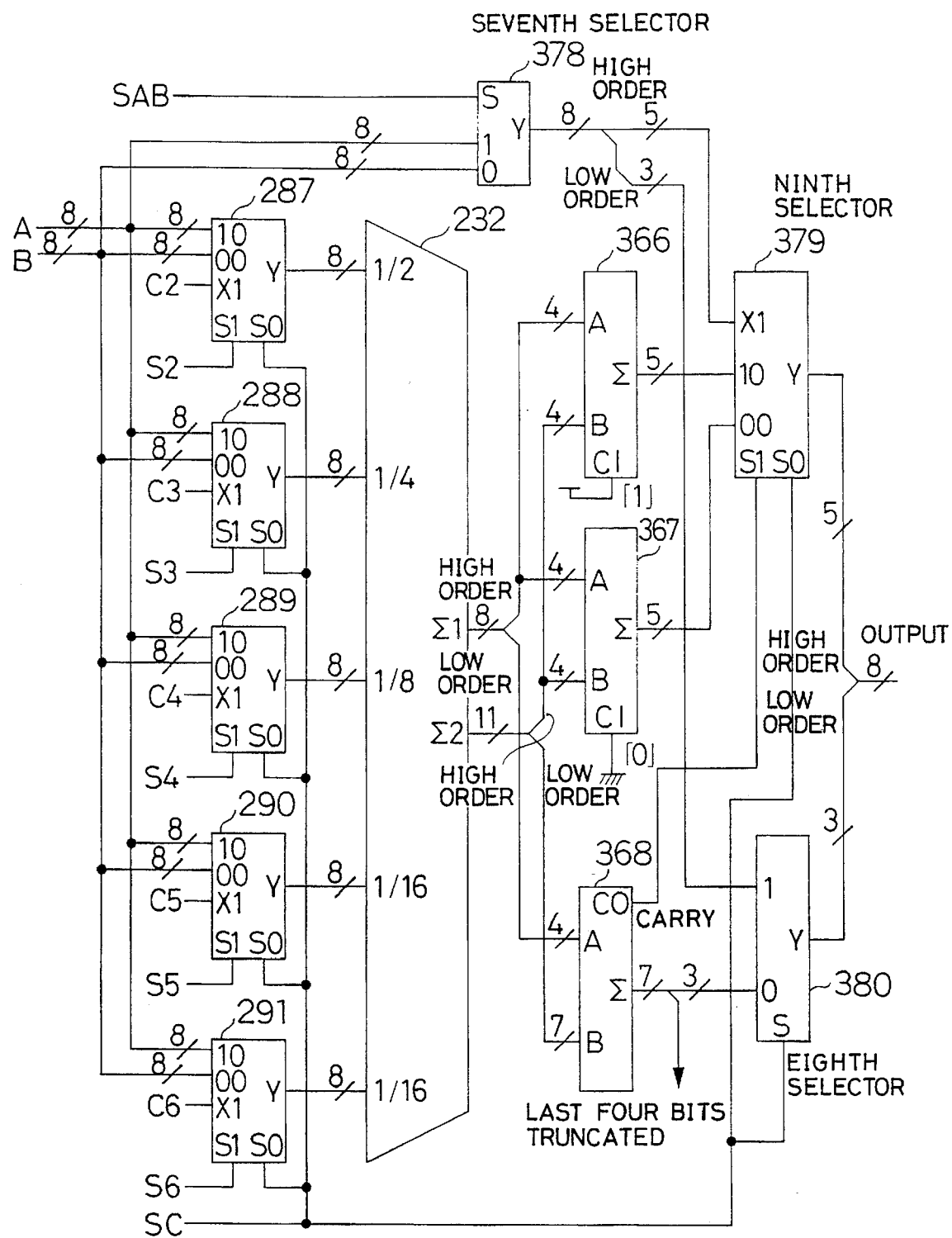
FIG. 45 is a block diagram of a sixth weighted average circuit according to the present invention.

FIG. 45 is a block diagram of the sixth weighted average circuit. 378 is a seventh selector. 380 is an eighth selector. 379 is a ninth selector. The same reference numerals are used for like elements.

The sixth weighted average circuit has a carry propagation adder 368 that is identical in configuration with the one of FIG. 44.

The sixth weighted average circuit has carry propagation adders 367 and 366 each of which is identical in configuration with the one of FIG. 43.

The seventh selector 378 has the same logic circuit as the selector as shown in FIG. 29.

The eighth selector 380 is identical in function with the seventh selector 378 and the number of bits thereof is reduced from 8 down to 3. Therefore, the eighth selector 380 has an internal configuration as a result of cutting by 5 bits from the logical circuit of the selector of FIG. 29. In other words, the selector 380 has a configuration less the AND circuits 222–231 and the OR circuits 211–215 of FIG. 29.

The ninth selector 379 is identical in selection function with each of the first selectors 287–291 and the number of bits thereof is reduced from 8 to 5. The ninth selector 379 has an internal configuration as a result of cutting by 3 bits from the logical circuit of the selector of FIG. 29. In other words, the selector 379 has a configuration less the AND circuits 293–301 and the OR circuits 319–321 of FIG. 39.

Next, the operation of the sixth weighted average circuit is considered.

If SC=0, (a) the selectors 287–291 each select either INPUT SIGNAL A or INPUT SIGNAL B according to their respective selection control signals S2–S6, (b) the selector 380 selects an output of the carry propagation adder 380, and (c) the selector 379 selects either an output of the carry propagation adder 367 or an output of the carry propagation adder 366 according to the carry propagation adder's 368 output.

Accordingly, the carry propagation adders 366–368 and the selectors 379 and 380 together serve as a carry selection adder thereby summing two outputs of the partial addition circuit 232 and outputting a sum. The sixth weighted average circuit, at this point in time, operates in the same way that a conventional example does, so that, based on the blend ratio α=S2/2+S3/4+S4/8+S5/16+S6/16, α×A+(1−α)×B is calculated for synthesis, and the result is output.

If SC=1, the selectors 287–291 apply their input constant values C2–C6 to the partial addition circuit 232. Then, the partial addition circuit 232, regardless of INPUT SIGNALS A and B, outputs a particularly constant value. This allows inputs/outputs of the carry propagation adders 366–368 to be constant values. The selector 380 selects the last three bits of the selector 378 and outputs them. The selector 379 selects the first five bits of the selector 378 and outputs them. The selector 378, regardless of SC, selects either INPUT SIGNAL A or INPUT SIGNAL B according to SAB and outputs a selected signal.

Accordingly, INPUT SIGNAL A is output as the output of the fifth weighted average circuit if SAB=1, whereas INPUT SIGNAL B is output as the output of the fifth weighted average circuit if SAB=0.

As described above, the sixth weighted average circuit is identical in function with the fourth weighted average circuit as well as with the fifth weighted average circuit.

Next, the sixth and fifth weighted average circuits are compared with each other in operating speed.

In the fifth weighted average circuit, the longest path across the addition circuit 232 and the addition circuit 365 passes through the full adder 240 at which an input is applied, the full adders 248, 256, 377, 376, 375, 374 and then through one inverter, one AND circuit, and one OR circuit within the selector 369. That is, the longest path involves seven full adders, one inverter, one AND circuit, and one OR circuit.

Accordingly, the longest path in the fifth weighted average circuit, including selectors arranged before and after the addition circuits 232 and 365, involves seven full adders, one inverter, three AND circuits, and three OR circuits. Propagation delay is about 28 ns.

Conversely, the sixth weighted average circuit has a configuration less the selectors 369 and 292 of the fifth weighted average circuit, but with the selectors 378–380 added thereto. Therefore, a part of the longest path in the sixth weighted average circuit, instead of passing through two selectors (i.e., the selectors 369 and 292), passes through one selector (i.e., the selector 328). The longest path of the sixth weighted average circuit is shortened by an amount of one selector and involves seven full adders, one inverter, two AND circuits, and two OR circuits.

The sixth weighted average circuit can cut by about 2 ns the delay time down to 26 ns.

The sixth weighted average circuit is faster than the fifth weighted average circuit.

In accordance with this embodiment, it is possible to provide a weighted average circuit capable of shortening computing time.

SEVENTH EMBODIMENT OF WEIGHT OF AVERAGE CIRCUIT

A seventh weighted average circuit of the present invention is explained by reference to the accompanying drawings.

Figure 46:
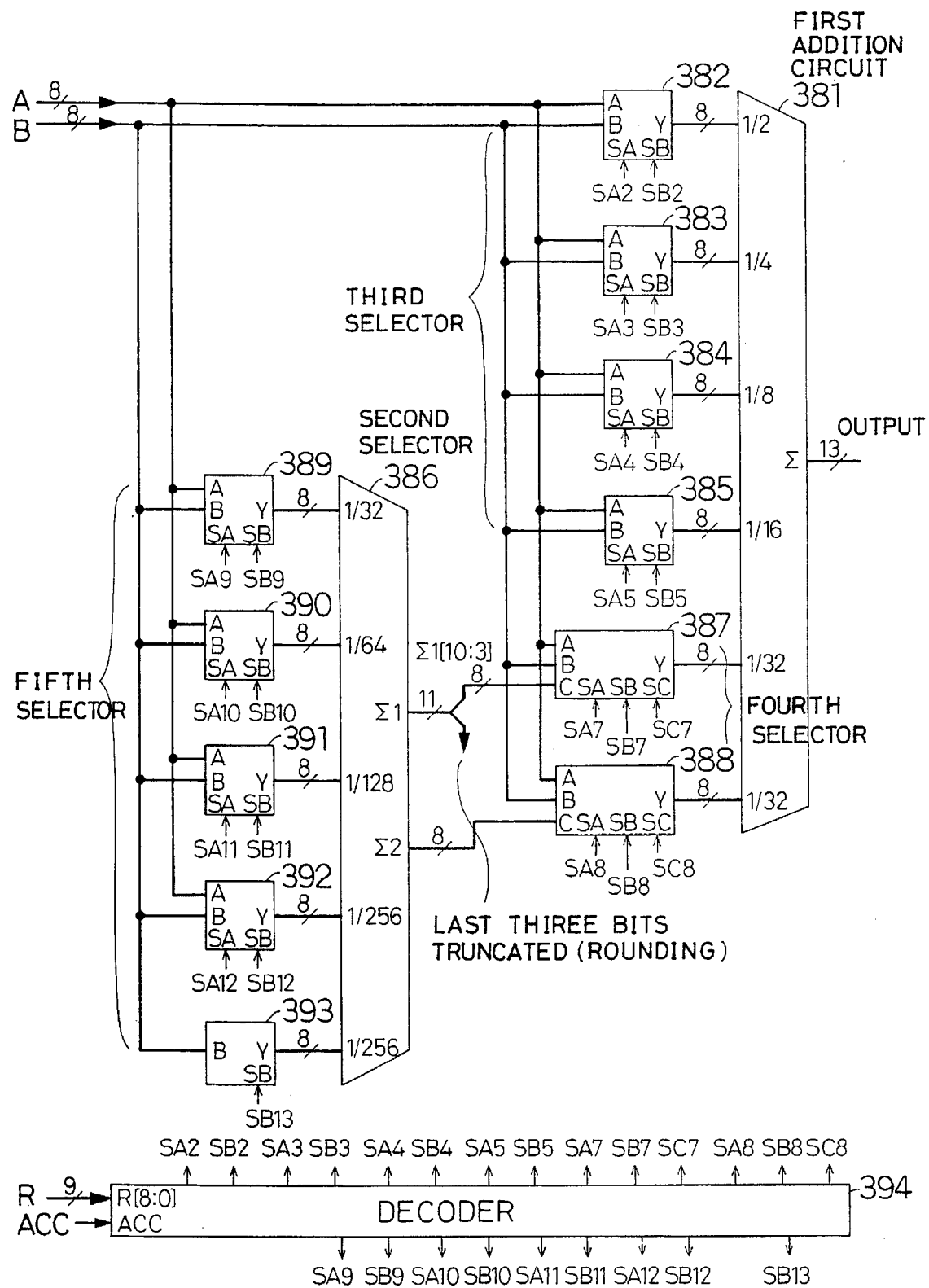
FIG. 46 is a block diagram of a seventh weighted average circuit according to the present invention.

FIG. 46 is a block diagram of the seventh weighted average circuit. 381 is a first addition or weighing circuit. 382–385 are third selectors. 386 is a second selector. 387 an 388 are fourth selectors. 389–393 are fifth selectors. 394 is a decoder. The fifth selectors 389–393 are divided into two types. That is, the fifth selectors 389–392 are of a first type and the fifth selector 393 is of a second type.

Figure 47:
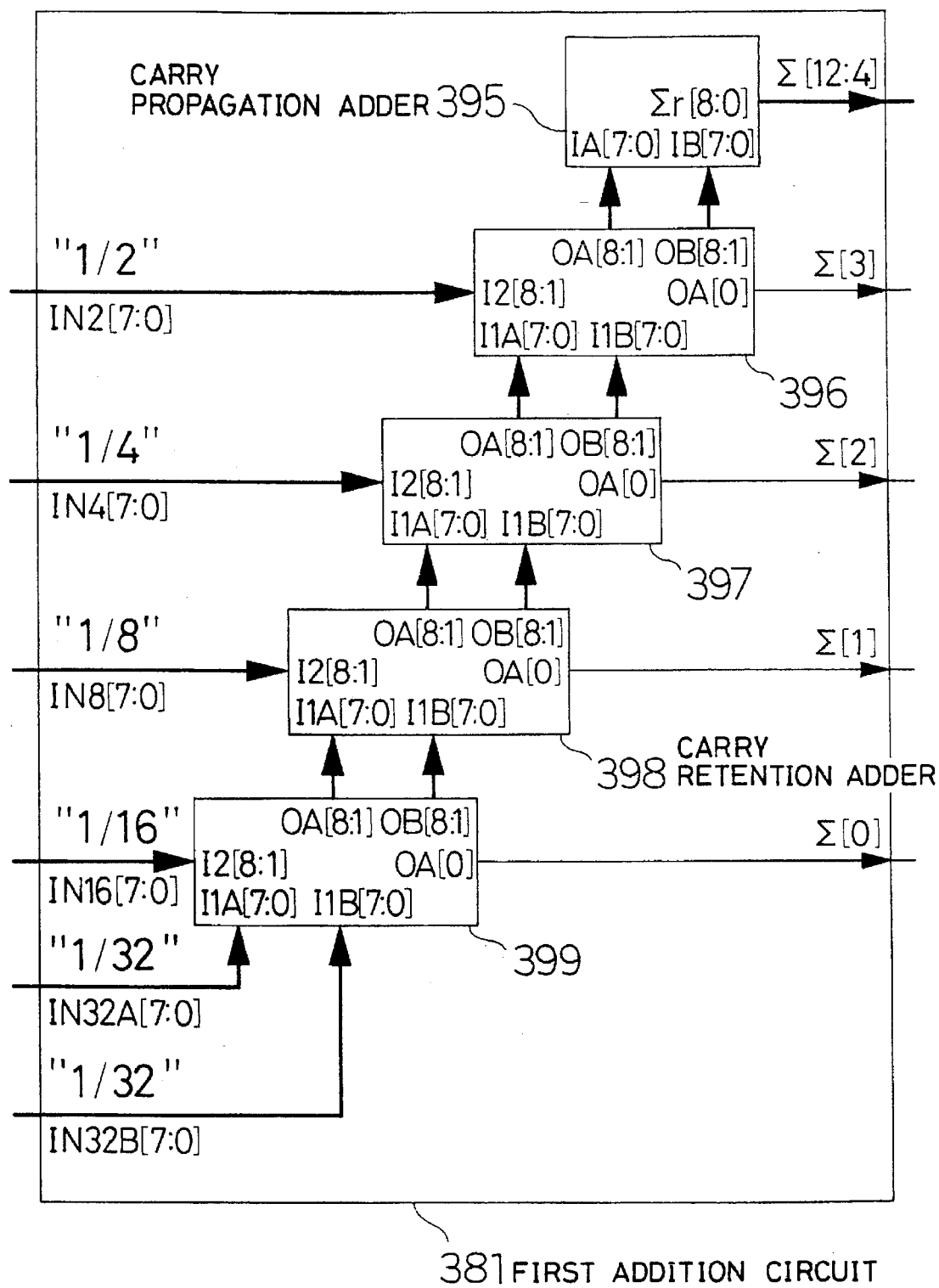
FIG. 47 is a block diagram of a first addition circuit in the seventh weighted average circuit.
Figure 48:
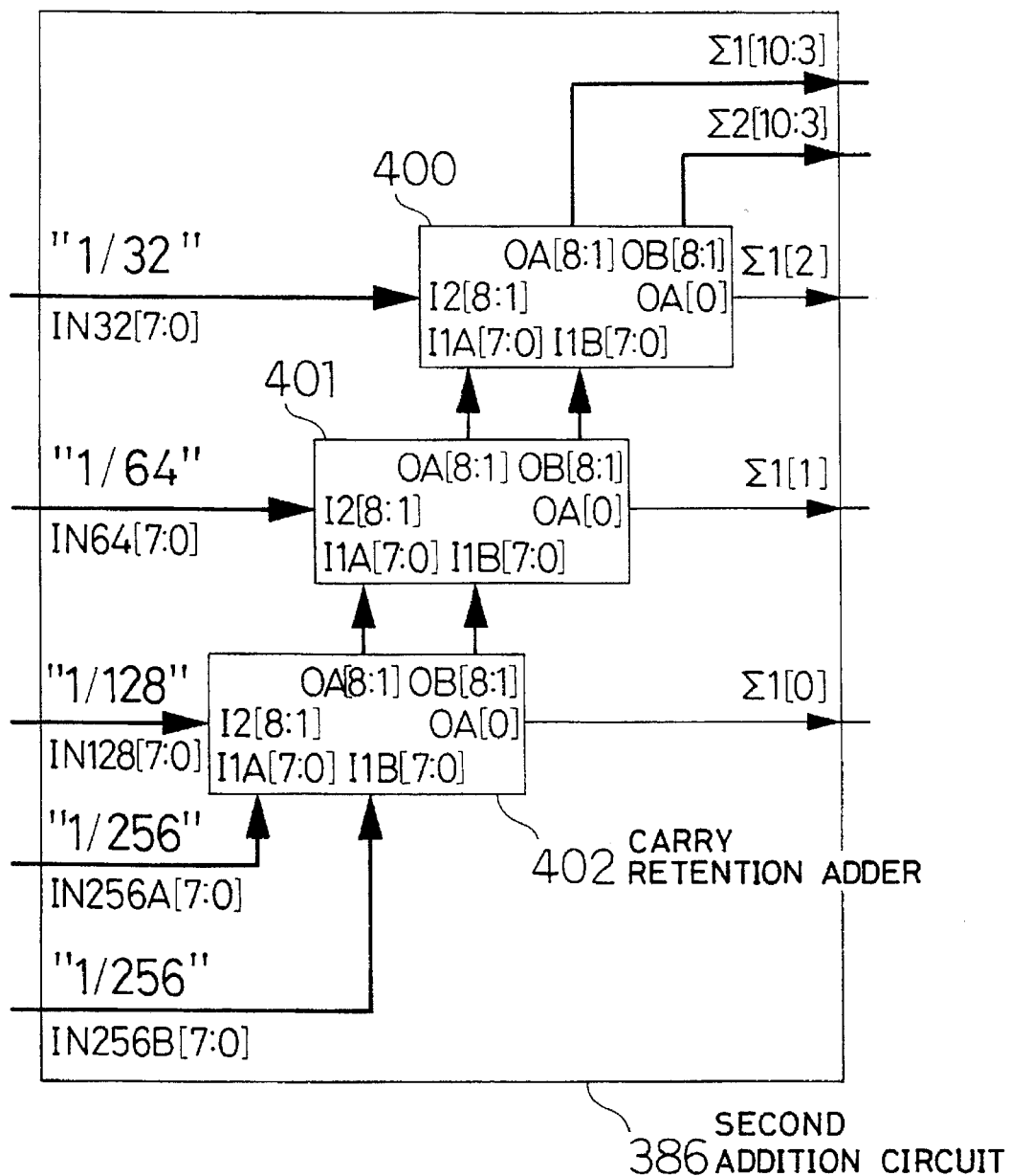
FIG. 48 is a block diagram of a second addition circuit in the seventh weighted average circuit.

FIG. 47 is a block diagram of the first addition circuit 381. FIG. 48 is a block diagram of the second addition or weighing circuit 386. 396–402 are carry retention adders and 395 is a carry propagation adder.

Here, connection of signals having a bit width is carried out in order of magnitude of subscripts added to them. For example, in FIG. 48, an output of OA[8:1] of the carry retention adder 402 is connected to an input of I1A[7:0] of the carry retention adder 401. Connections are made such that OA[8]–I1A[7], OA[7]–I1A[6], . . . OA[1]–I1A[0]. The bit width must be the same between two signals to be connected.

Figure 49:
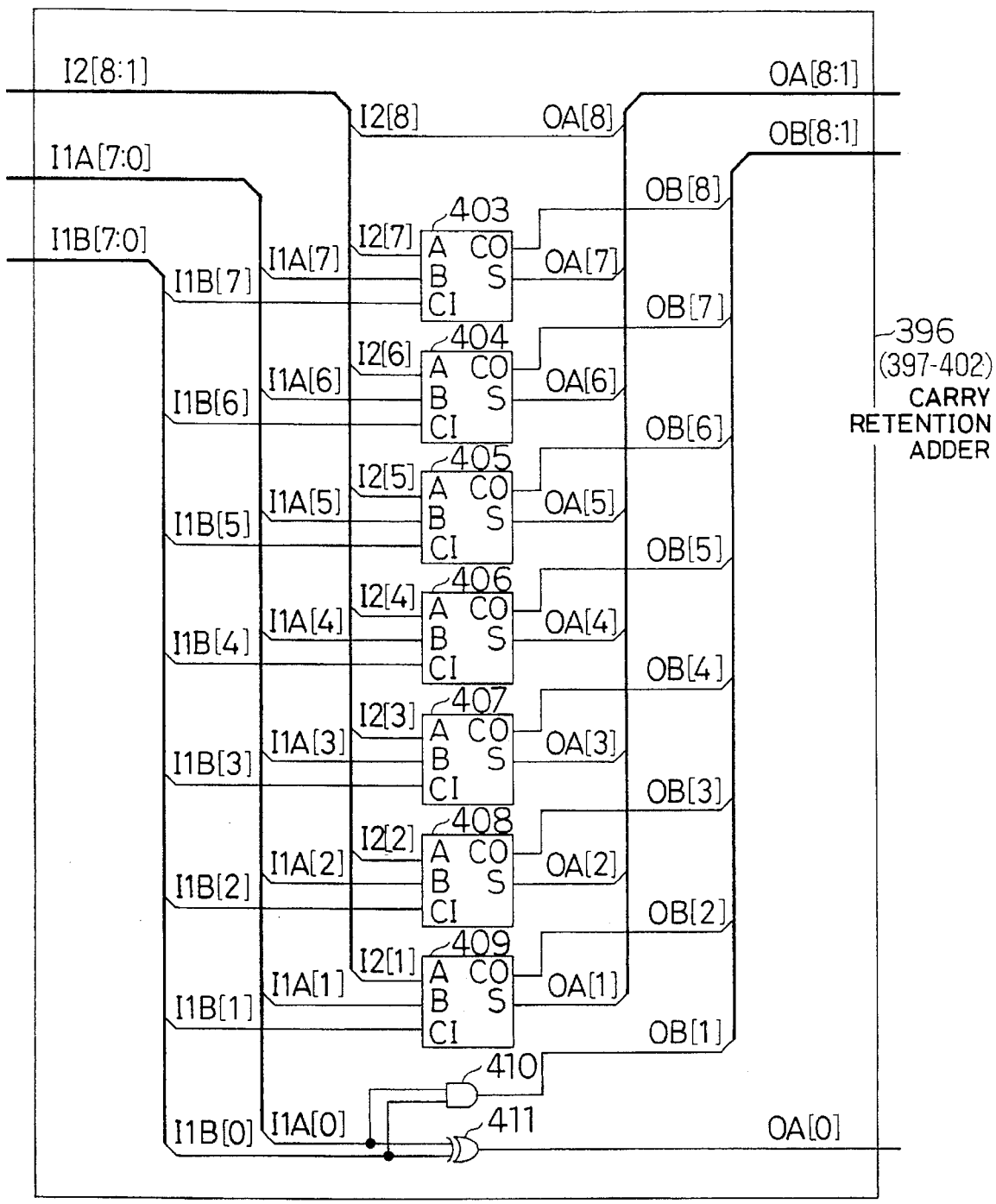
FIG. 49 shows an internal organization of a carry retention adder in the seventh weighted average circuit.
Figure 50:
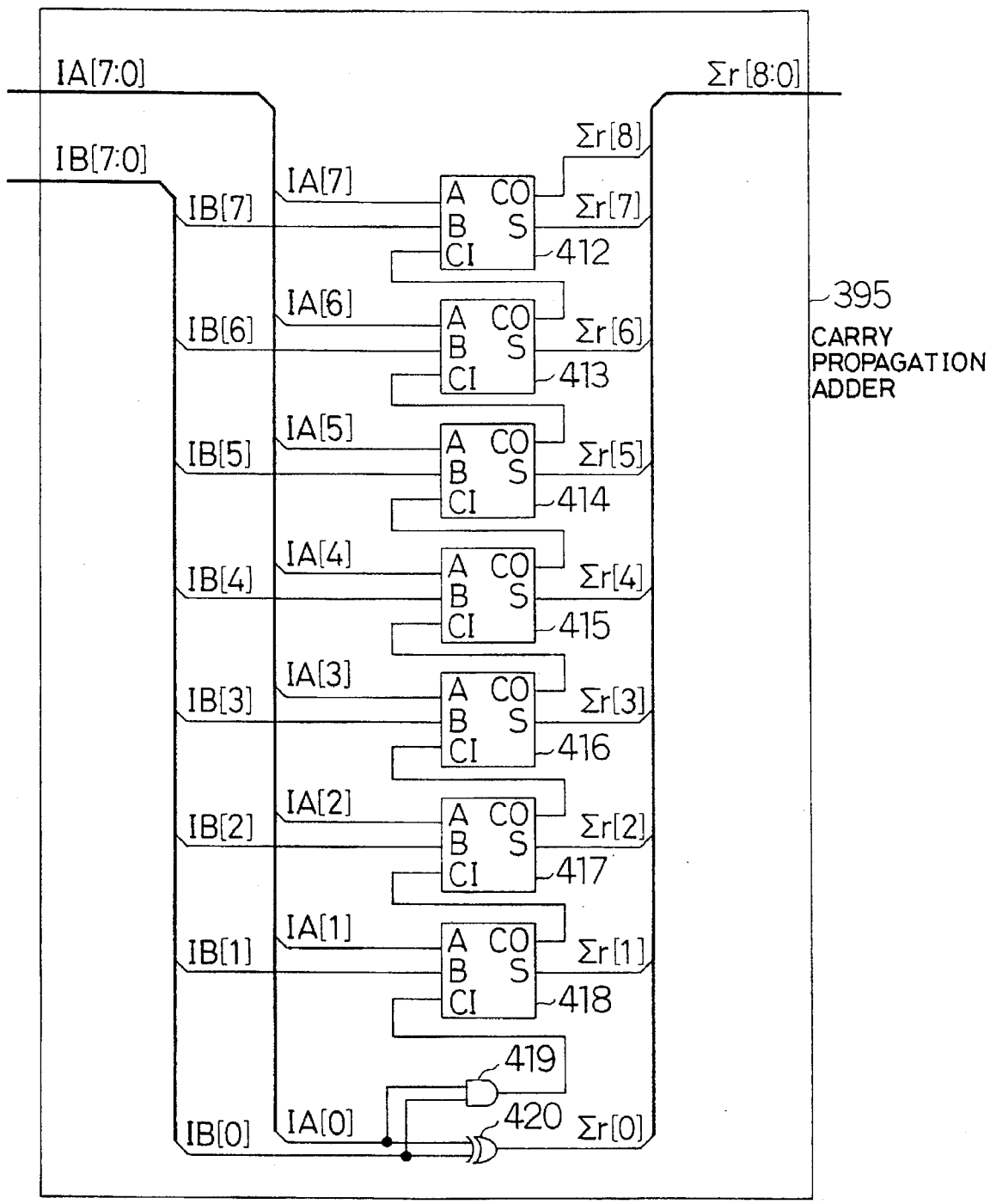
FIG. 50 shows an internal organization of a carry propagation adder in the seventh weighted average circuit.

FIG. 49 shows an internal organization of the carry retention adder. FIG. 50 shows an internal organization of the carry propagation adder. 403–409 and 412–418 are 1-bit full adders. 410 and 419 are 2-input AND circuits. 411 and 420 are 2-input XOR circuits. FIG. 32 shows a true table of a 1-bit full adder.

Figure 51:
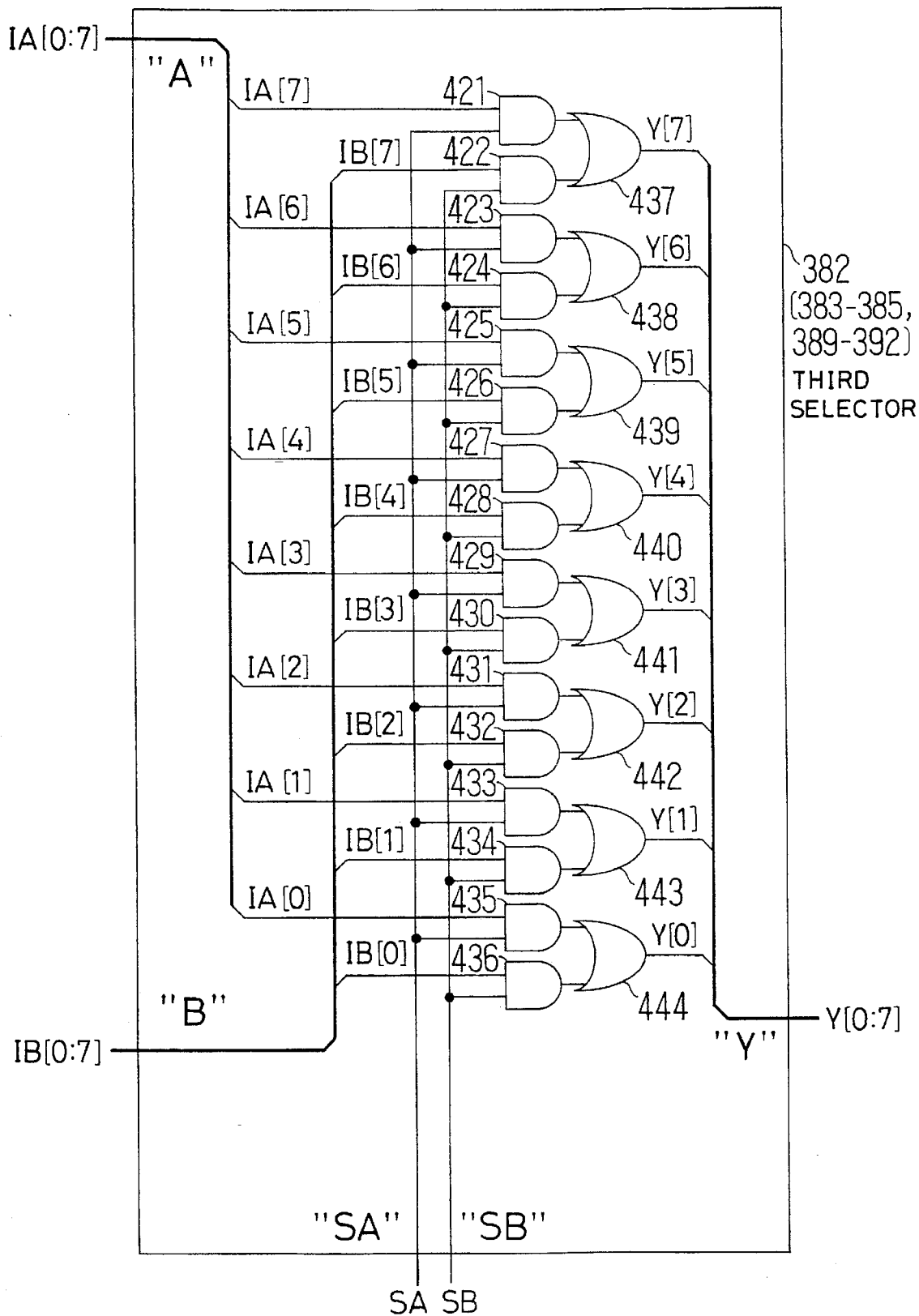
FIG. 51 a logic circuit of a third selector in the seventh weighted average circuit.

FIG. 51 shows a logic circuit of the third selector as well as a logic circuit of the fifth selector of a first type. 421–436 are 2-input AND circuits. 437–444 are 2-input OR circuits.

Figure 52:
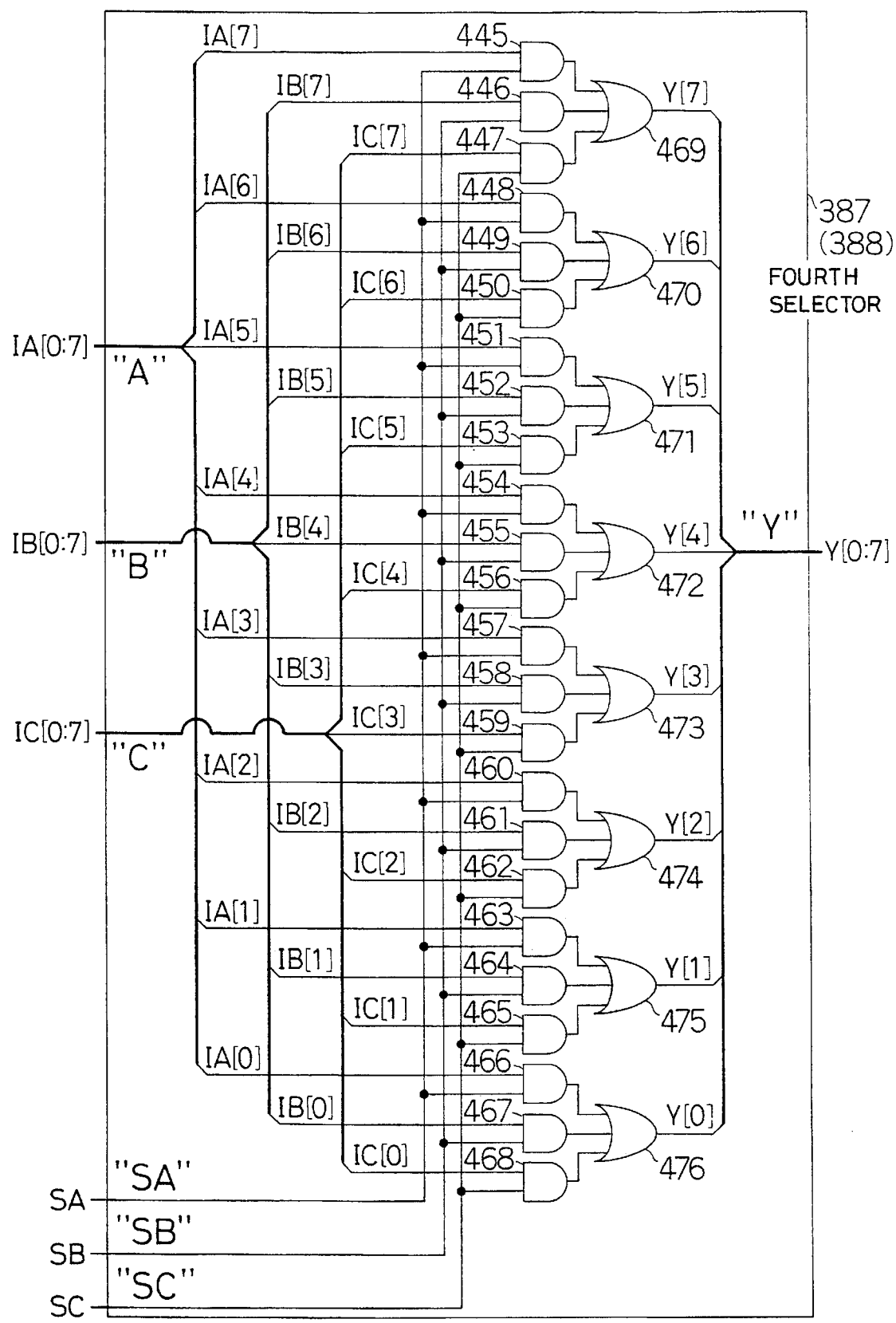
FIG. 52 is a logic circuit of a fourth selector in the seventh weighted average circuit.

FIG. 52 shows a logic circuit of the fourth selector. 445–468 are 2-input AND circuits. 469–476 are 3-input OR circuits.

Figure 53:
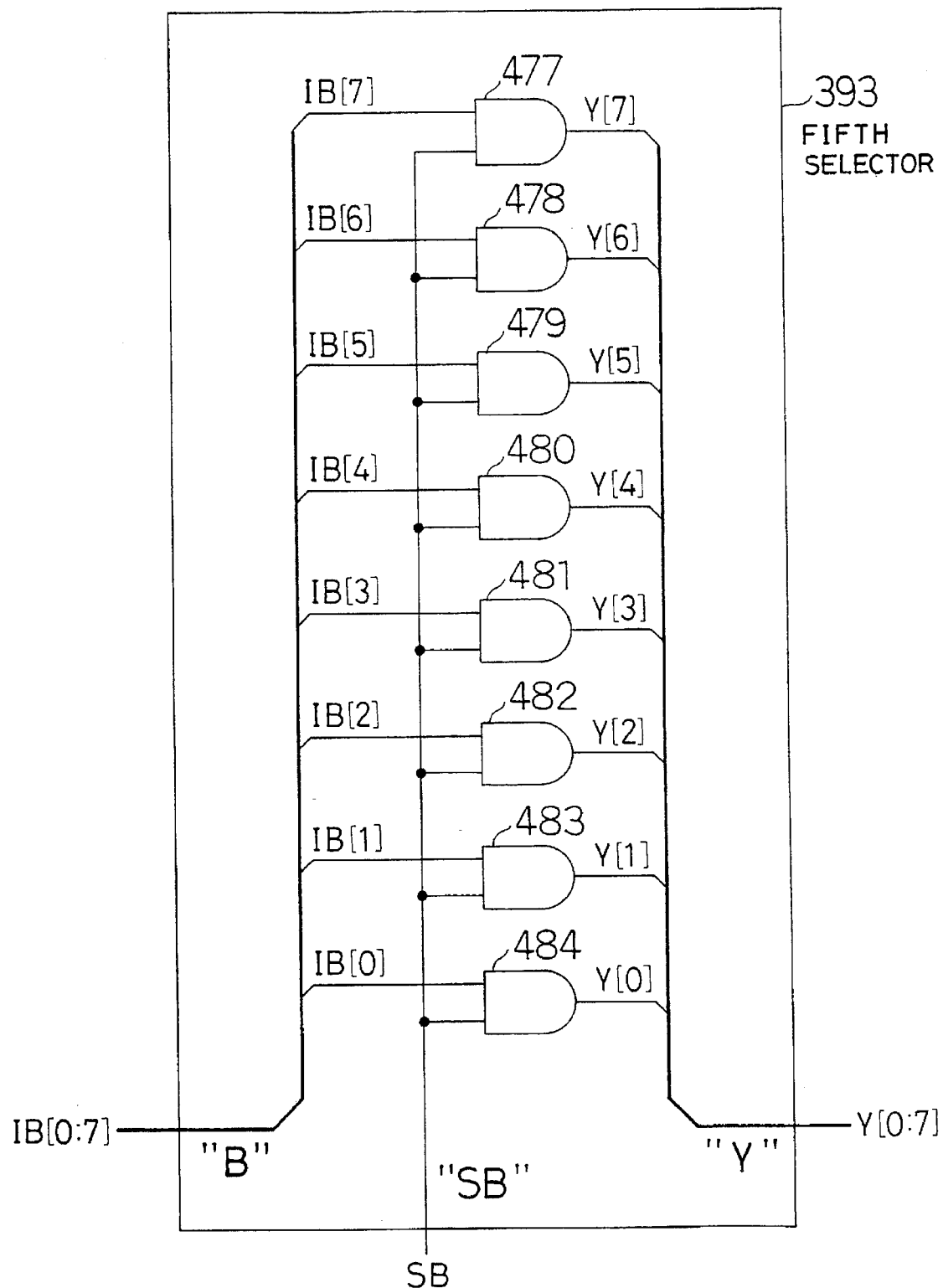
FIG. 53 is a logic circuit of a fifth selector in the seventh weighted average circuit.

FIG. 53 shows a logic circuit of the fifth selector of a second type. 477–484 are 2-input AND circuits.

Figure 54:
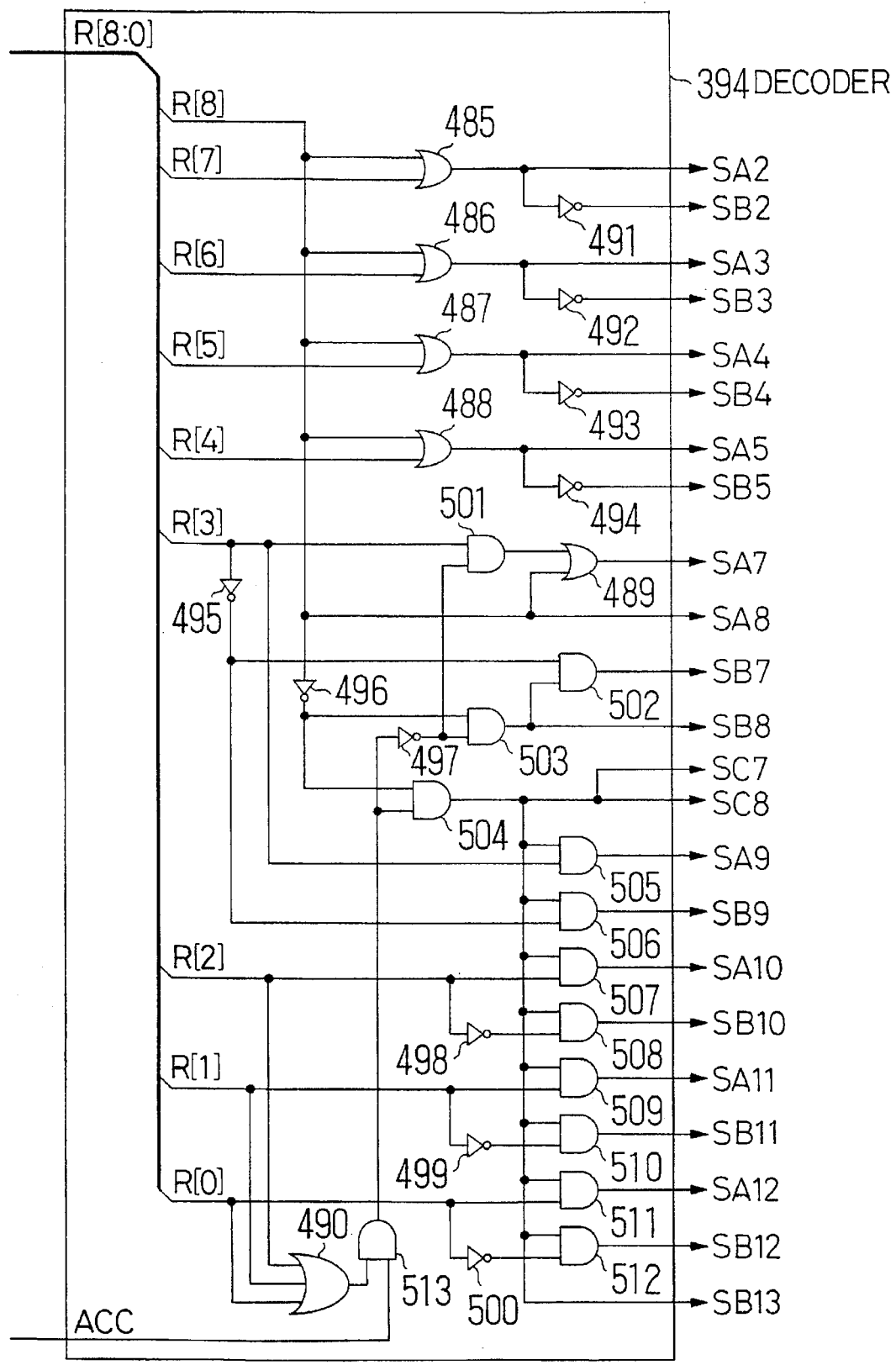
FIG. 54 is a logic circuit of a decoder in the seventh weighted average circuit.

FIG. 54 shows a logic circuit of the decoder 394. 485–489 are 2-input OR circuits. 490 is a 3-input OR circuit. 491–500 are inverters. 501–513 are 2-input AND circuits.

The operation of the seventh weighted average circuit is described in detail.

The carry retention adder of FIG. 49 inputs three different binary numbers each formed by 8 bits, multiplies each input by a respective weight (i.e., 2:1:1), sums those products, and outputs a sum in the form of two different binary numbers, namely an 8-bit binary number and a 9-bit binary number.

The carry propagation adder of the FIG. 50 inputs two different binary bits each formed by 8 bits, multiplies each input by a respective weight (i.e., 1:1), and sum those products, and outputs a sum in the form of a single binary number of 9 bits.

The addition circuit 381 continuous-connects four carry retention adders and one carry propagation adder so that it (the circuit 381) inputs six 8-bit binary numbers which have been multiplied by respective weights (i.e., 1/2, 1/4, 1/8, 1/16, 1/32, and 1/32) by means of digit shift, sums those products and outputs a sum. The total of these weights is 1. The weights 1/2, 1/4, 1/8, 1/16, 1/32, and 1/32 excluding the last weight is a geometrical progression of a common ratio of 1/2.

The weight of output is the total of the weights (i.e., 1), and is shifted 5 digits from the minimum weight of 1/32. Therefore, an output of 13 bits is given.

The second addition circuit 386 continuous-connects three carry retention adders (i.e., the carry retention adders 400–402) so that it (the circuit 386) inputs five binary numbers, multiplies each input binary number by a respective weight, sums those products, and outputs a sum in the form of an 8-bit binary number and an 11-bit binary number. If weights of these two outputs are 1/32 and 1/32, input weights are 1/32, 1/64, 1/128, 1/256, and 1/256. The weights 1/32, 1/64, 1/128, 1/256 and 1/256 excluding the last weight is a geometrical progression of a common ratio of 1/2.

The selector of FIG. 30 is able to select among INPUT SIGNAL A, INPUT SIGNAL B, and 0 (constant value). If SA=1 and if SB=0, then Y (output)=A. If SA=0 and if SB=1, then Y=B. If SA=SB=0, then Y=0.

The selector of FIG. 52 is able to select among INPUT SIGNAL A, INPUT SIGNAL B, and an INPUT SIGNAL C (a constant value of 0 may be a candidate for selection, but it is not used here). If SA=1 and if SB=SC=0, then Y=A. If SB=1 and SA=SC=0, then Y=B. If SC=1 and if SA=SB=0, Y=C.

In the selectors of FIGS. 51 and 52, input patterns of the selection signals SA, SB, and SC are limited to the above.

Instead of employing the selector 393, the selector of FIG. 51 may be used. However, since Y=A is not selected in any case, the selector of FIG. 53 can be used. In the selector of FIG. 53, if SB=1, then Y=B, and if SB=0, then Y=0.

As seen from the above, it is unnecessary for all the selectors to have a function of switching all the input digital signals for selection. If there is an overlap in blend ratios realized by combining selection control exerted by selection means, and if a selection function corresponding to its redundancy portion is removed or if the number of conditions where the blend ratio $\alpha$ is made selectable to reduce the amount of circuitry, this makes it possible to simplify circuitry by reducing the number of selectable digital input signals in some selection means.

A SIGN R and ACC are applied to the decoder 394. $\alpha$ (blend ratio) is designated by this SIGN R. In the present embodiment, SIGN R is a binary fixed-point number of 9 bits with 8 decimal places. Blend ratio precision is designated by ACC that is a 1-bit signal.

Operation conditions of the seventh weighted average circuit are classified into cases where any one of the following formulae (7), (8), and (9) holds by input to the decoder 394.

$$R[8]=1 \qquad (7)$$

$$R[8]=0; \{ACC=0 \text{ or } R[2]=R[1]=R[0]=0 \qquad (8)$$

$$R[8]=0; ACC=1; \{R[2]=1, R[1]=1, \text{ or } R[0]=1 \qquad (9)$$

As to output of the decoder 394 in the case of the formula (7), SA2=SA3=SA4=SA5=SA7=SA8=1 and SB2=SB3=SB4=SB5=SB7=SB8=SC7=SC8=SA9=SB9=SA10=SB10=SA11=SB11=SA12=SB12=SB13=0. As a result, the selectors 382– 385, 387, and 388 select INPUT SIGNAL A, and the remaining selectors 389–393 select a constant value of 0. Every input to the first addition circuit 381 is INPUT SIGNAL A. Therefore, the first addition circuit 381 performs a calculation of A/2+A/4+A/8+A/16+A/32+A/32 (=A) and gives an output equivalent to INPUT SIGNAL A. In this case, every input to the second addition circuit 386 is a constant value of 0, as a result of which it (the second addition circuit 386) stops operating.

Further, for the case of the formula (7), a fixed-point number of R[8:0] is equal to or greater than 1; however, since no blend is defined if $\alpha>1$, a case where $\alpha>1$ is regarded as $\alpha=1$. In other words, if R[8]=1, calculations are made taking $\alpha=1$ regardless of whichever value R[7:0] takes.

As to output of the decoder 394 in the case of the formula (8), SA2=!SB2=R[7], SA3=!SB3=R[6], SA4=!SB4=R[5], SA5=!SB5=R[4], SA7=!SB7=R[3], SB8=1, and SC7=SA8=SC8=SA9=SB9=SA10=SB10=SA11=SB11=SA12=SB12=SB13=0 wherein ! is a single term operand that instructs logic inversion. In this case, for example, the selector 382 is controlled by R[7] so that it (the selector 382) must select either INPUT SIGNAL A or INPUT SIGNAL B. If R[7]=1, then Y=A. If R[7]=0, then Y=B. Therefore, Y can be written {R[7]×A+(1−R[7])×B}. Likewise, the selectors 383, 384, 385, and 387 are controlled by R[6], R[5], R[4], and R[3] respectively so that they must select either INPUT SIGNAL A or INPUT SIGNAL B. The selector 388 selects INPUT SIGNAL B. The selectors 389–393 each select a constant value of 0. Each of outputs of the selectors 382–385, 387, and 388 is multiplied by a respective weight and the products are summed in the first addition circuit 381, which is given by the following formula (10).

$$\{R[7] \times A + (1 - R[7]) \times B\}/2 + \qquad (10)$$
$$\{R[6] \times A + (1 - R[6]) \times B\}/4 +$$
$$\{R[5] \times A + (1 - R[5]) \times B\}/8 +$$
$$\{R[4] \times A + (1 - R[4]) \times B\}/16 +$$
$$\{R[3] \times A + (1 - R[3]) \times B\}/32 + B/32$$

The formula (10) may be changed to the following formulae (11) and (12).

$$\{R[7]/2 + R[6]/4 + R[5]/8 + R[4]/16 + R[3]/32 \times \qquad (11)$$
$$A + \{(1 - R[7])/2 + (1 - R[6])/4 + (1 - R[5])/8 +$$
$$(1 - R[4])/16 + (1 - R[3])/32\} + 1/32\} \times B$$
$$\{R[7]/2 + R[6]/4 + R[5]/8 + R[4]/16 + R[3]/32\} \times \qquad (12)$$
$$A + \{(1 - R[7])/2 + R[6]/4 + R[5]/8 + R[4]/16 + R[3]/32\} \times B$$

Therefore, if the blend ratio $\alpha=R[7]/2+R[6]/4+R[5]/8+R[4]/16+R[3]/32$, the output=$\alpha \times A+(1-\alpha) \times B$.

For the case of the formula (8), it is possible to designate the blend ratio $\alpha$ at intervals of 1/32=0.3125 within the 0–0.96875 range so that 32 different blend ratio values can be obtained. In other words, the blend ratio can be represented by a fixed-point number with an integer part of 0 and a fraction part of 5 decimal places. R[2:0] is ignored or rounded down. At this point in time, every input to the second addition circuit 386 is a constant value of 0 so that it (the circuit 386) stops operating.

As to output of the decoder 394 in the case of the formula (9), SA2=!SB2=R[7], SA3=!SB3=R[6], SA4=!SB4=R[5], SA5=!SB5=R[4], SA7=SB7=SA8=SB8=0, SC7=SC8=1, SA9= !SB9=R[3], SB10=!SB10=R[2], SA11=!SB11=R[1], SA12=!SB12=R[0], and SB13=1. The selectors 382–385 are controlled by R[7:4] so that these selectors must select either INPUT SIGNAL A or INPUT SIGNAL B. The selectors 387 and 388 each select SIGNAL C that is an output of the second addition circuit 386. The selectors 389–392 are controlled by R[3:0] so that these selectors must select either INPUT SIGNAL A or INPUT SIGNAL B. The selector 393 selects INPUT SIGNAL B. Since the output of the second addition circuit 386 is applied through the selectors 387 and 388 to the first addition circuit 381, it is possible to regard these four elements as a single addition circuit that receives nine 8-bit binary numbers which have been multiplied by their respective weights, namely 1/2, 1/4, 1/8, 1/16, 1/32, 1/64, 1/128, 1/256, and 1/256, sums those products, and outputs a sum. From the above, an output of the first addition circuit 381 is given by the following formula (13).

$$\{R[7] \times A + (1 - R[7]) \times B\}/2 + \\ \{R[6] \times A + (1 - R[6]) \times B\}/4 + \\ \{R[5] \times A + (1 - R[5]) \times B\}/8 + \\ \{R[4] \times A + (1 - R[4]) \times B\}/16 + \\ \{R[3] \times A + (1 - R[3]) \times B\}/32 + \\ \{R[2] \times A + (1 - R[2]) \times B\}/64 + \\ \{R[1] \times A + (1 - R[1]) \times B\}/128 + \\ \{R[0] \times A + (1 - R[0]) \times B\}/256 + B/256 \quad (13)$$

The formula (13) may be changed to the following formulae (14) and (15).

$$\{R[7]/2 + R[6]/4 + R[5]/8 + R[4]/16 + \\ R[3]/32 + R[2]/64 + R[1]/128 + R[0]/256\} \times \\ A + \{(1 - R[7]/2 + (1 - R[6])/4 + (1 - R[5])/8 + \\ 1 - R[4])/16 + (1 - R[3])/32 + (1 - R[2])/64 + \\ (1 - R[1])/128 + (1 - R[0])/256 + 1/256\} \times B \quad (14)$$

$$\{R[7]/2 + R[6]/4 + R[5]/8 + \\ R[4]/16 + R[3]/32 + R[2]/64 + R[1]/128 + R[0]/256\} \times \\ A + \{1 - (R[7]/2 + R[6]/4 + R[5]/8 + R[4]/16 + \\ R[3]/32 + R[2]/64 + R[1]/128 + R[0]/256)\} \times B \quad (15)$$

Therefore, if the blend ratio α=R[7]/2+R[6]/4+R[5]/8+R[4]/16+R[3]/32+R[2]/64+R[1]/128+R[0]256, the output=α× A+(1−α)×B.

For the case of the formula (9), the blend ratio α may be designated at intervals of 1/256=0.00390625 within the 0.00390625–0.99609375 range by 8 bits of R[7:0]. There should be 255 different blend ratio values when designating the blend ratio α at intervals of 1/256; however, taking in account the formula (8), there are left 224 blend ratio values. In other words, the formula (9) is equal to a case where the blend ratio can be represented by a binary fixed-point number with an integer part of 0 and a fraction part of 6 to 8 decimal places. At this point in time, the second addition circuit 386, too, operates, thereby contributing to realizing a high precision blend ratio.

The seventh weighted average circuit is compared in power consumption with a modification of the first weighted average circuit whose blend ratio precision is expanded.

Figure 55:
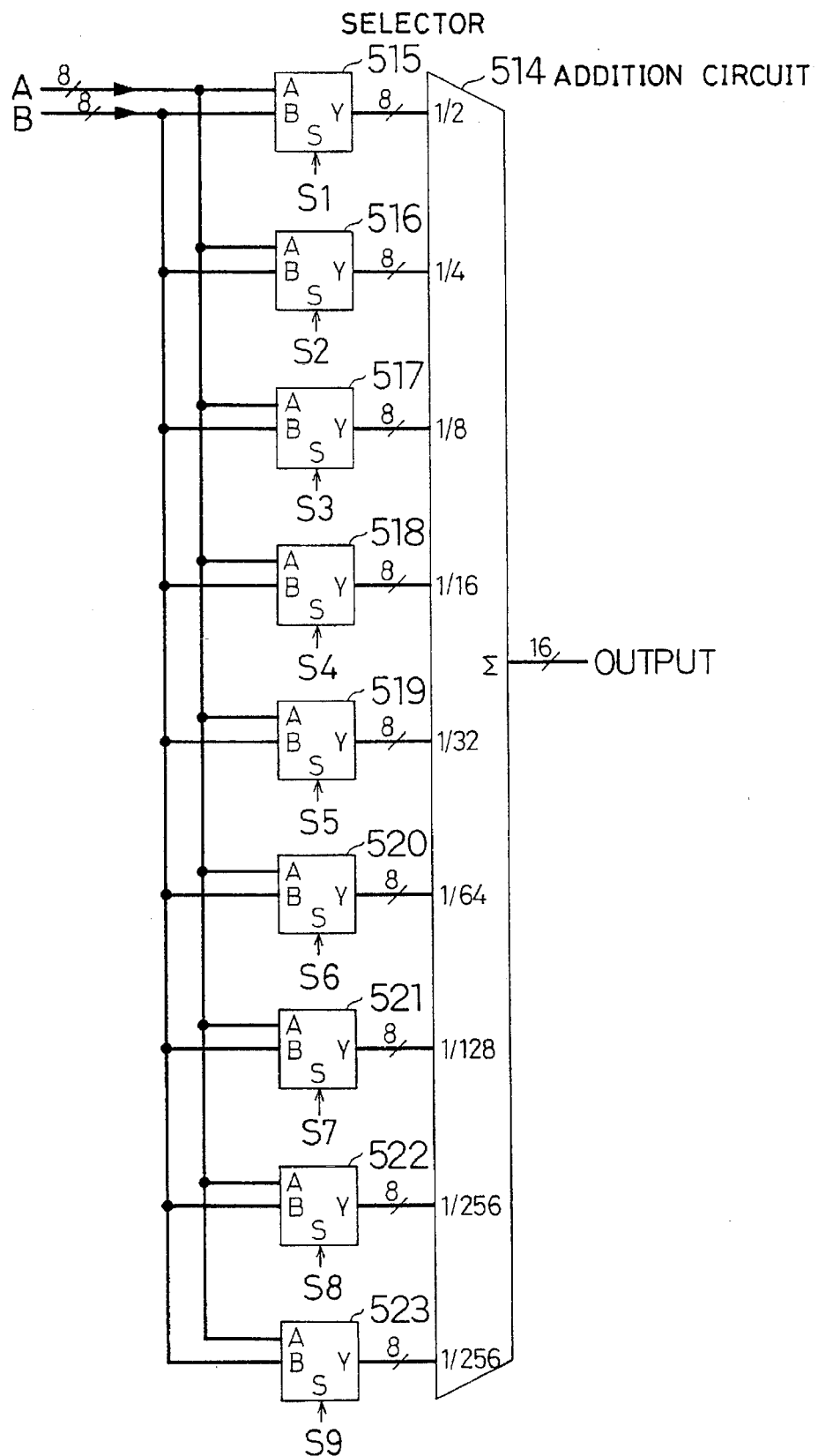
FIG. 55 shows a modification of the first weighted average circuit.

The first weighted average circuit must be expanded so as to have a minimum blend ratio interval of 1/256= 0.00390625. The expanded first weighted average circuit is shown in FIG. 55. 514 indicates an addition circuit. 515–523 are selectors. The same type of selector as shown in FIG. 29 is employed.

Figure 56:
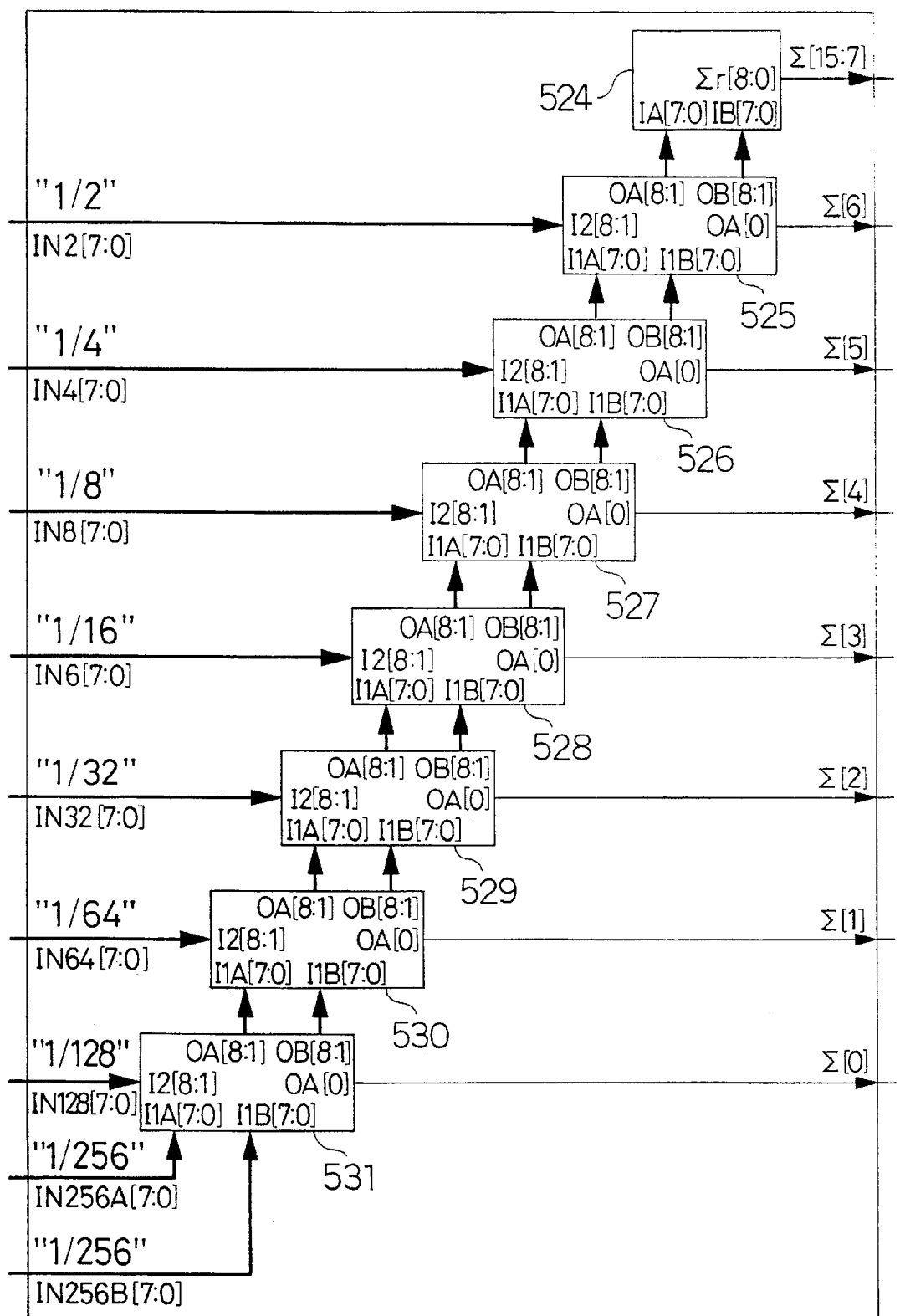
FIG. 56 shows an internal organization of a first addition circuit in another weighted average circuit.
Figure 57:
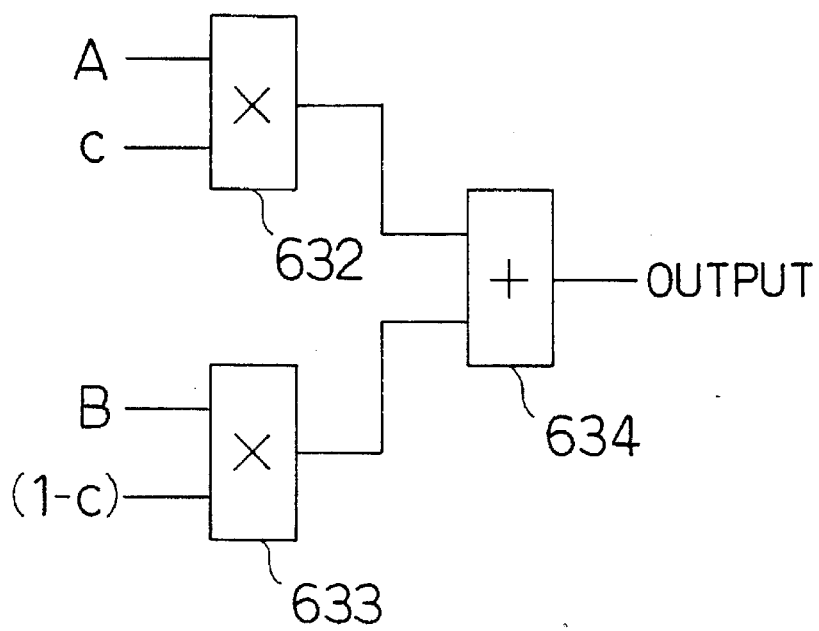
FIG. 57 is a block diagram of a conventional weighted average circuit.
Figure 58:
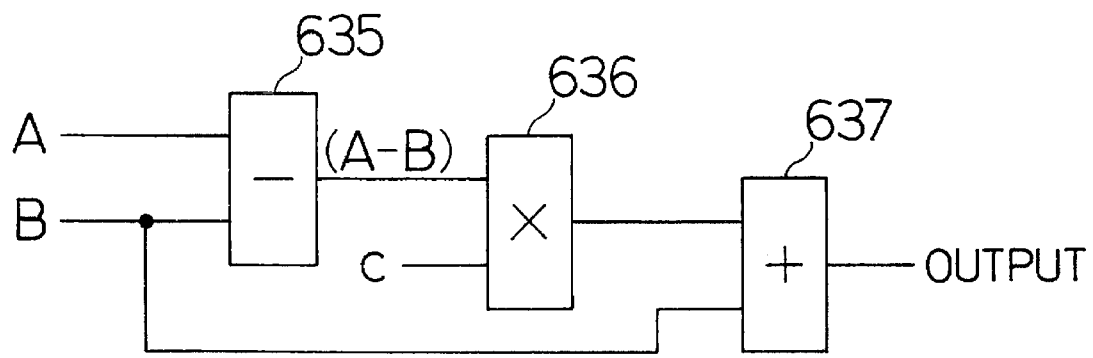
FIG. 58 is a block diagram of another conventional weighted average circuit.
Figure 59:
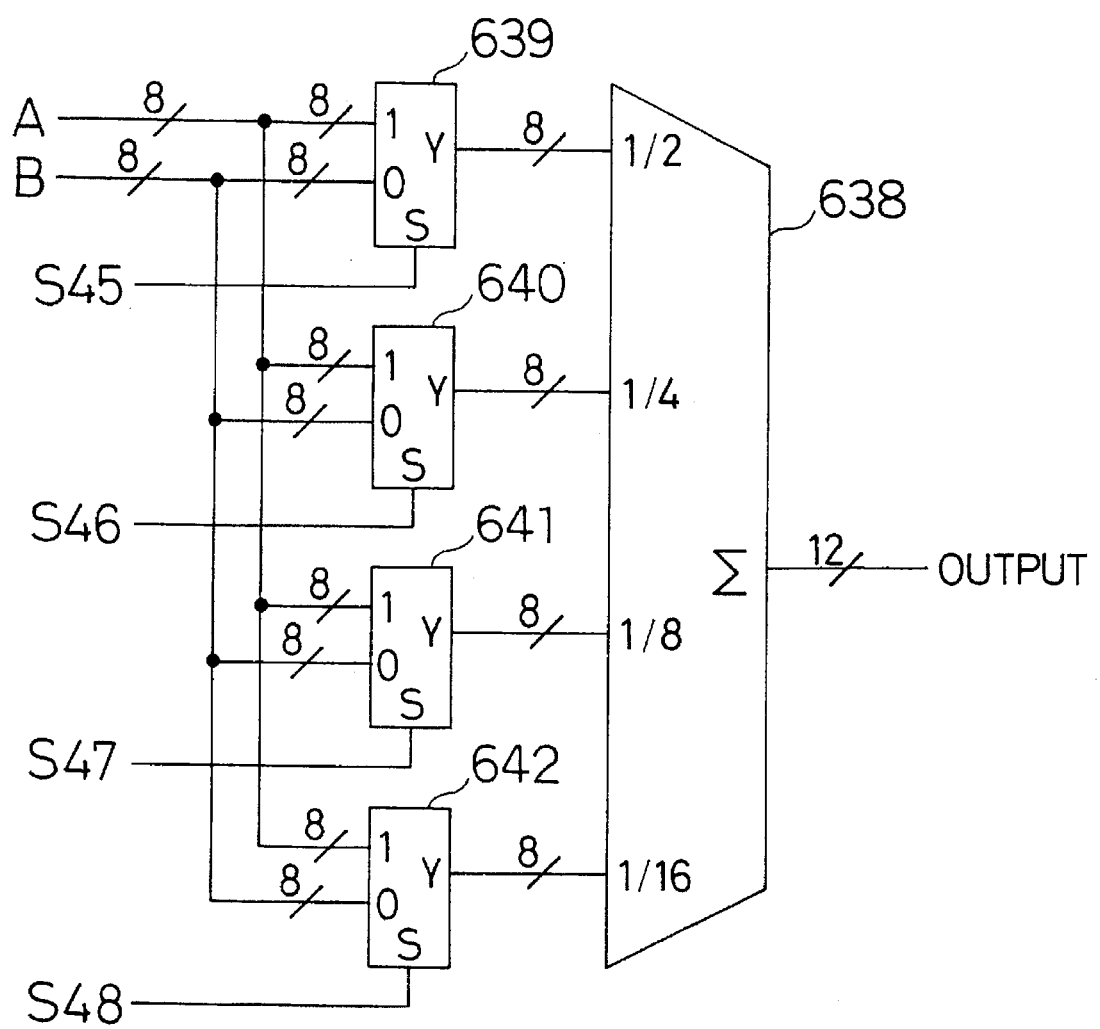
FIG. 59 is a block diagram of still another conventional weighted average circuit.

FIG. 56 shows an internal organization of the addition circuit 514. 525–531 are carry retention adders. 524 is a carry propagation adder.

In the weighted average circuit of FIG. 55, like the seventh weighted average circuit, it is possible to designate the blend ratio α at intervals of 1/256=0.00390625 within the 0–1 range so that 257 different blend ratio values can be obtained.

Suppose both these weighted average circuits use devices such as CMOS that consume only a negligible amount of direct current and power consumption occurs when an output value is inverted at an output terminal of a logic gate including a full adder. It is to be noted that there exist no transitional inversions, that values at each output terminal should be inverted at least once during a period from a point at which an input changes until a point at which the following input changes, so that these values come to be correct ones. Here, a part of the value of such consumed power that depends upon the capacitance of output load is ignored, and every output terminal consumes 25 µW per MHz.

Both of the weighted average circuits operate at an operation frequency of 20 MHz at a blend ratio of 1. The values of S1–S9, R, and ACC are fixed so that as-input INPUT SIGNAL A is output.

A pattern of (0,0,0,0,0,0,0,0) and a pattern of (1,1,1,1,1,1,1,1,) are alternately fed as INPUT SIGNAL A for every pixel so that the maximum power is consumed under the above assumption.

In the seventh weighted average circuit, the blend ratio α=1 is realized in the case of the formula (7). The selectors 382–385, 387, and 388 select INPUT SIGNAL A, and the selectors 389–393 select a constant value of 0. Therefore, the first eight bits of an output of each of the selectors 382–385, 387, 388 and the first addition circuit 381 are inverted for every pixel, and outputs of the selectors 389–393 and the second addition circuit 386 remain unchanged (i.e., 0).

Within the selectors 382–385, 387, and 388, outputs of eight AND circuits and eight OR circuits which INPUT SIGNAL A passes through are inverted for every pixel.

The first addition circuit 381 comprises blocks of four carry retention adders and one carry propagation adder, each block further comprising seven 1-bit full adders, one AND circuit, and one XOR circuit. Under the foregoing operation state, every output but output of the XOR circuit is inverted for every pixel. 15 outputs are inverted per block as a result.

The number of inverted outputs is 16 (per selector)×6+15 (per addition circuit block)×5=171, and the maximum power consumption is 25 (µW/MHz)×20 (MHz)×171=85500 (µW) =85.5 (mW).

In the modified first weighted average circuit, the blend ratio α=1 is realized when (S1,S2,S3,S4,S5,S6,S7,S8,S9)= (1,1,1,1,1,1,1,1,1). In this case, outputs of the selectors 515–523 are inverted for every pixel.

The addition circuit 514 has a block formed by seven carry retention adders and one carry propagation adder.

The number of inverted outputs of the selectors and the addition circuit block in the modified first weighted average circuit is the same as the seventh weighted average circuit. The inverted output count is 16 (per selector)×9+15 (per addition circuit block)×8=264, and thus the maximum power consumption is 25 (µW/MHz)×20 (MHz)×264= 132000 (µW)= 132 (mW).

As described above, where the blend ratio α=1, there is produced a difference of 46.5 mW in maximum power consumption between the seventh weighted average circuit and the modified first weighted average circuit.

Next, a case, where the blend ratio α is not 1, is considered. (0,0,0,0,0,0,0,0) and (1,1,1,1,1,1,1,1,) are alternately fed as signals equal to INPUT SIGNALS A and B for every pixel so that the maximum power is consumed.

In the modified first weighted average circuit, like cases where the blend ratio α=1, the same maximum power (i.e., 132 mW) is consumed because the number of inverted outputs stays unchanged although a different signal path is taken.

As to the seventh weighted average circuit, there are differences in power consumption between a case of the formula (8) and a case of the formula (9).

In the former, the selectors 382–385, 387, 388 select either INPUT SIGNAL A or INPUT SIGNAL B, and the selectors 389–393 select a constant value of 0 so that the second addition circuit 386 stops operating. Like cases where the blend ratio α=1, 85.5 mw power is consumed.

In the latter, the selectors 389–393 and the second addition circuit 386, too, operates, thereby consuming additional power.

As to the above case, the number of inverted outputs is 16×4+8+15×3=117, so that the additional power consumption is 25 (μW/MHz)×20 (MHz)×117=58500 (μW)=58.5 (mW). The total power consumption is: 85.5+58.5=144 mw.

If the blend ratio α is represented by a binary fixed-point number with a fraction part of 5 decimal places, power consumption of the seventh weighted average circuit is about ⅔, compared with power consumption of the expanded first weighted average circuit. If the blend ratio α is represented by a binary fixed-point number with a fraction part of 6 or more decimal places, however, power consumption of the seventh weighted average circuit increases by slightly less than 10%, compared with that of a conventional weighted average circuit.

Therefore, the blend ratio α should better be represented by a binary fixed-point number with a fraction part of up to 5 decimal places.

If the switching between the operation state and the stopped state of the second addition circuit 386 is carried out for every pixel, this consumes power. Therefore, the effect of decreasing the amount of power consumption may be ill-influenced. It is therefore preferable to avoid such switching.

However, usually, the switching of the blend ratio is done for every several hundreds of pixels so that effect of decreasing the amount of power consumption cannot be ill-influenced.

It is very hard for human eyes to visually identify individual blend ratio values to high precision. Therefore, there should be no problem to fix the blend ratio at a certain value represented by a number with a fraction part of up to 5 decimal places.

Human sight is sensitive to a change in blend ratio for use in image synthesis (i.e., a change in an image). The setting interval of the synthesis ratio must be controlled adequately enough not to generate a rapid fluctuation in an image in changing the synthesis ratio.

For example, for the case of a blend ratio represented by a number with a fraction part of up to 5 decimal places, the minimum interval is 1/32. In other words, the blend ratio is changed at intervals of 1/32. The flicker of a display screen occurs as a result of changing the blend ratio in the case of high-contrast images. Such a fluctuation is sensed by human eyes. For the case of a blend ratio represented by a number with a fraction part of 8 decimal places, the blend ratio can be changed at intervals of 1/256. In this case, changes in the display screen are made smoothly, with no flicker sensed by human eyes.

If the second addition circuit 386 is made to operate only at a transitional blend ratio change stage so as to realize a high precision blend ratio, then a change in the display screen due to blend ratio change can be made without causing any awkwardness to human eyes. In other words, if the second addition circuit 386 is brought into operation of the formula (9) only at such a transitional stage, the second addition circuit 386 operates less frequently thereby resulting in the decrease in power consumption.

In the seventh weighted average circuit, application of ACC (input signal) to the decoder 394 stops the second addition circuit 386 from operating. Such control may be exerted by R[2]=R[1]=R[0]=0. Where no control by ACC is exerted, a redundant circuit (i.e., the AND circuit 312) may be removed, taking ACC=1.

According to the seventh weighted average circuit, if a blend ratio value can be represented by a fixed-point number with a fraction part of up to 5 decimal places, then a fixed-point number can be selected as a sign representing a blend ratio. The seventh weighted average circuit is a circuit capable of being controlled easily by input of a fixed-point number with a fraction part of up to 5 decimal places or by an input signal used to control such input.

In the seventh weighted average circuit, there are provided the first and second addition circuits 381 and 386. Another additional circuit may be provided.

In the present invention, the decoder 394 is provided as a control means, which receives a blend ratio to generate a selection control signal for each selector. The decoder 394 may be replaced by a ROM. In this case, delay from a point at which a blend ratio is input until a point at which a selection control signal is provided does not vary very much. Additionally, delay can be limited. The decoder 394 may be formed by a CPU and its software, and if the CPU has marginal processing capabilities it is possible to aim at decreasing the amount of hardware.

What is claimed is:

1. An image blend circuit that displays a translucently synthesized image at an overlapping field between windows opened on a display screen in a multi-window information processor, said image blend circuit comprising:

(a) pixel location information supply means which outputs pixel location information containing a synchronous pixel clock signal so as to display an image on said display screen by means of a raster scan technique, (b) a plurality of image output means each of which sequentially outputs pixel information about an image whose dimensions are the same as those of said display screen according to said pixel location information, (c) blend ratio buffer means which stores blend ratio information corresponding to pixels of said display screen and sequentially outputs said stored blend ratio information according to said pixel location information, (d) blend ratio hold means which stores a blend ratio having a single value and repeatedly outputs said stored blend ratio according to said pixel location information, (e) attribute buffer means which stores selection information corresponding to said pixels of said display screen and sequentially outputs said stored selection information according to said pixel location information, (f) data selection means which selects between said blend ratio information from said blend ratio buffer means and said stored blend ratio from said blend ratio hold means and outputs a selected blend ratio according to said selection information from said attribute buffer means, (g) pixel blend means which synchronously receives said image information items from said plural image output means and said blend ratio information from said data selection means according to said pixel location information, blends said input image information items according to said input blend ratio information, and outputs blended image information, and (h) window control means which, in order to display a target image in a window opened on said display screen, stores window locations, window shapes, window dimensions, and display objects as control information, updates said control information at an operator's request, and forms and updates data held by said blend ratio buffer means and said attribute buffer means depending on said stored control information.

2. An image blend circuit that displays a translucently synthesized image at an overlapping field between windows opened on a display screen in a multi-window information processor, said image blend circuit comprising:

(a) pixel location information supply means which outputs pixel location information containing a synchronous pixel clock signal so as to display an image on said display screen by means of a raster scan technique, (b) a plurality of image output means each of which sequentially outputs pixel information about an image whose dimensions are the same as those of said display screen according to said pixel location information, (c) blend ratio buffer means which stores blend ratio information corresponding to pixels of said display screen and sequentially outputs said stored blend ratio information according to said pixel location information, (d) blend ratio hold means which stores a blend ratio information having a single value and repeatedly outputs said stored blend ratio information according to said pixel location information, (e) window information storage means which stores selection information of pixel zones corresponding to window locations on said display screen, (f) selection information output means which sequentially outputs said selection information stored by said window information storage means according to said pixel location information, (g) data selection means which selects between said blend ratio information from said blend ratio buffer means and said blend ratio information from said blend ratio hold means and outputs selected blend ratio information according to said selection information from said attribute buffer means, (h) pixel blend means which synchronously receives said image information items from said plural image output means and said blend ratio information from said data selection means according to said pixel location information, blends said input image information according to said input blend ratio information, and outputs blended image information, and (i) window control means which, in order to display a target image in a window opened on said display screen, stores window locations, window shapes, window dimensions, and display objects as control information, updates said control information at an operator's request, and forms and updates data held by said blend ratio buffer means and said window information storage means depending on said stored control information.

3. An image blend circuit as in claim 1 or claim 2, wherein said blend ratio hold means includes automatic update means which periodically updates said stored blend ratio information according to said pixel location information.

4. An image blend circuit as in claim 1 or claim 2, wherein said pixel blend means includes a plurality of weighted average means each of which blends said pixel information from said plural image output means by color component, said each weighted average means comprising:

(a) weighing means which inputs j signals represented by the base i number system, multiplies said j signals by j weights respectively, sums those products, and outputs a sum in the form of a signal represented by the base i number system, (b) j selection means each of which selects among m digital input signals represented by the base i number system, wherein j signals selected by said j selection means are applied to said weighing means, and (c) control means, on receipt of a blend ratio, controls said j selection means so that m digital input signals are merged at said received blend ratio, wherein the total of said j weights is a product of an x-th power of i, with x being a non-negative integer, and the maximum value of said j weights, with said numbers i, j, and m being integers equal to or greater than 2.

5. An image blend circuit as in claim 1 or claim 2, wherein said pixel blend means includes a plurality of weighted average means each of which blends said pixel information from said plural image output means by color component, said each weighted average means comprising:

(a) weighing means which inputs j signals represented by the base i number system, multiplies said j signals by j weights respectively, sums those products, and outputs a sum in the form of a signal represented by the base i number system, (b) j first selection means each of which selects one from among m digital input signals represented by the base i number system and a constant value signal, wherein j signals selected by said j first selection means are applied to said weighing means, (c) second selection means which selects one from among said output signal of said addition means and said m digital input signals, wherein the total of said j weights is a product of an x-th power of i, with x being a non-negative integer, and the maximum value of said j weights, and (d) control means, on receipt of a blend ratio, controls said j first selection means and said second selection means depending on said received blend ratio, with said numbers i, j, and m being integers equal to or greater than 2.

6. An image blend circuit as in claim 1 or claim 2, wherein said pixel blend means includes a plurality of weighted average means each of which blends said pixel information from said plural image output means by color component, said each weighted average means comprising:

(a) first weighing means which receives j signals as a result of summing a first signal set formed by k signals represented by the base i number system and a second signal set of j–k (j>k) signals represented by the base i number system, multiplies said j signals by j weights respectively, sums those products, and outputs a sum in the form of a signal represented by the base i number system, (b) k third selection means each of which selects one from among m digital input signals represented by the base i number system, wherein k signals selected by said k third selection means are applied to said first weighing means as said first signal set, (c) second weighing means which receives n signals, multiplies said n signals by n weights respectively, sums those products, and outputs a sum in the form of j–k signals represented by the base i number system, (d) j–k fourth selection means which are provided so as to correspond to the number of output signals of said second weighing means and each of which selects one from among j–k output signals of said second weighing means and said m digital input signals, wherein said j–k signals selected by said j–k fourth selection means are applied to said first weighing means as said second signal set, (e) n fifth selection means each of which selects one from among said m digital input signals and a constant value signal represented by the base i number system, wherein n signals selected by said n fifth selection means are applied to said second weighing means, and (f) control means, on receipt of a blend ratio, controls said j selection means so that m digital input signals are merged at said received blend ratio, with said numbers i, j, m, and n being integers equal to or greater than 2 and said number k being a natural number.

7. An image blend circuit as in claim 1 or claim 2, wherein said data selection means has a function of not only selecting between said blend ratio information from said blend ratio buffer means and said blend ratio from said blend ratio hold means but also selecting among said blend ratio information from said blend ratio buffer means, said blend ratio from said blend ratio hold means, and fixed blend ratio information for outputting a selected blend ratio information item.

8. A weighted average circuit comprising:

(a) weighing means which inputs j signals represented by the base i number system, multiplies said j signals by j weights respectively, sums those products, and outputs a sum in the form of a signal represented by the base i number system, (b) j selection means each of which selects among m digital input signals represented by the base i number system, wherein j signals selected by said j selection means are applied to said weighing means, and (c) control means, on receipt of a blend ratio, controls said j selection means so that m digital input signals are blended according to said received blend ratio, wherein the total of said j weights is a product of an x-th power of i, with x being a non-negative integer and the maximum value of said j weights, with said numbers i, j, and m being integers equal to or greater than 2.

9. A weighted average circuit as in claim 8, wherein said j weights totals to 1.

10. A weighted average means comprising:

(a) weighing means which inputs j signals represented by the base i number system, multiplies said j signals by j weights respectively, sums those products, and outputs a sum in the form of a signal represented by the base i number system, (b) j first selection means each of which selects one from among m digital input signals represented by the base i number system and a constant value signal, wherein j signals selected by said j first selection means are applied to said weighing means, (c) second selection means which selects one from among said output signal of said addition means and said m digital input signals, wherein the total of said j weights is a product of an x-th power of i, with x being a non-negative integer, and the maximum value of said j weights, and (d) control means, on receipt of a blend ratio, controls said j first selection means and said second selection means depending on said received blend ratio, with said numbers i, j, and m being integers equal to or greater than 2.

11. A weighted average circuit as in claim 10, wherein:

(a) said integer i is 2, (b) said addition means comprises:

(i) a first partial addition circuit which sums j signals which are input signals to said addition means or said first addition means and outputs a sum in the form of two binary signals, and (ii) a second partial addition circuit which sums said two binary signals from said first partial addition circuit and outputs a sum in the form of one binary signal, wherein said binary signal of said second partial addition circuit is an output of said addition means, and said first partial addition circuit is formed by connecting a plurality of carry retention adders in multilevel series, (c) said second partial addition circuit comprises:

(iii) a first carry propagation adder which sums least significant bits to intermediate bits of said two binary signals from said first partial addition circuit and outputs a sum as well as a carry result generated by the addition of said intermediate bits, (iv) a second carry propagation adder which, if said carry result="0", sums the remaining bits of said two binary signals and outputs a sum, and (v) a third carry propagation adder which, if said carry result="1", sums the remaining bits of said two binary signals and outputs a sum, and (d) said second selection means comprises:

(vi) seventh selection means which selects one from among m digital input signals, (vii) eighth selection means which selects either an output indicative of a sum found by said first carry propagation adder or a least significant bit-to-intermediate bit portion of an output of said seventh selection means, and (viii) ninth selection means which selects one from among an output of said second carry propagation adder, an output of said third propagation adder, and an intermediate bit-to-most significant bit portion of an output of said seventh selection means.

12. A weighted average circuit as in claim 10, wherein, if a given blend ratio indicates blending of said m digital input signals, said control means controls said first and second selection means so that said first selection means selects one from among said m digital input signals and said second selection means selects an output of said addition means, while on the other hand, if a given blend ratio is equivalent to selecting one from among said m digital signals, said control means controls said first and second selection means so that said first selection means selects a constant value and said second selection means selects one from among said digital input signals that is designated.

13. A weighted average means comprising:

(a) first weighing means which receives j signals as a result of summing a first signal set formed by k signals represented by the base i number system and a second signal set of j–k (j>k) signals represented by the base i number system, multiplies said j signals by j weights respectively, sums those products, and outputs a sum in the form of a signal represented by the base i number system, (b) k third selection means each of which selects one from among m digital input signals represented by the base i number system, wherein k signals selected by said k third selection means are applied to said first weighing means as said first signal set, (c) second weighing means which receives n signals, multiplies said n signals by n weights respectively, sums those products, and outputs a sum in the form of j–k signals represented by the base i number system, (d) j–k fourth selection means which are provided so as to correspond to the number of output signals of said second weighing means and each of which selects either its corresponding output signal from said second weighing means or one of said m digital input signals, wherein said j–k signals selected by said j–k fourth selection means are applied to said first weighing means as said second signal set, (e) n fifth selection means each of which selects one from among said m digital input signals and a constant value signal represented by the base i number system, wherein n signals selected by said n fifth selection means are applied to said second weighing means, and (f) control means, on receipt of a blend ratio, controls said j+n selection means so that m digital input signals are blended according to said received blend ratio, with said numbers i, j, m, and n being integers equal to or greater than 2 and said number k being a natural number.

14. A weighted average circuit as in claim 13, wherein the number of signals belonging to said second signal set, (j–k) is 2.

15. A weighted average circuit as in claim 14, wherein:

(a) said integer i is 2, (b) said weights of said first weighing means which, when arranged in order of magnitude, form a first geometrical progression of a common ratio of 1/2 except for the last term of said first geometrical progression and the first term thereof is 1/2, (c) the last term of said first geometrical progression has a value equal to that of a term next thereto, (d) weights of the last two terms of said first geometrical progression are respectively multiplied by two signals of said second signal set, (e) said weights of said second weighing means which, when arranged in order of magnitude, form a second geometrical progression of a common ratio of 1/2 except for the last term of said second geometrical progression and the first term thereof has a value equal to that of the last term of said first geometrical progression, and (f) the last term of said second geometrical progression has a value equal to that of a term next thereto.

16. A weighted average circuit as in claim 15, wherein said integers j, m, and n are 6, 2, and 5, respectively.

17. A weighted average circuit as in claim 13, wherein (a) said control means receives an operation mode selection signal for mode switching between the operation state and the stopped state of said second weighing means, (b) if said operation mode selection signal indicates the operation state of said second weighing means, said control means controls all of said fourth selection means and said third and fifth selection means so that said each fourth selection means selects a corresponding output of said second addition means and said third and fifth selection means each select one from among said m digital input signals according to said given blend ratio, and (c) if said operation mode selection signal indicates the stopped state of said second weighing means, said control means controls all of said fifth selection means and said third and fourth selection means so that said each fifth selection means selects a constant value signal and said third and fourth selection means each select one from among said m digital input signals according to said given blend ratio.

18. A weighted average circuit as in claim 13, wherein:

(a) each selection means receives a selection control signal so as to select one from among a plurality of signals according to said received selection control signal, (b) said control means is formed by a decoder to which a sign for blend ratio description is applied, and (c) said decoder generates, according to said input sign, said selection control signal and outputs said selection control signal to each selection means, and said decoder, instead of inputting said operation mode selection signal for mode switching between the operation state and the stopped state of said second weighing means, receives a sign to generate said operation mode selection signal on the basis of said received signal.

19. A weighted average circuit as in claims 8, 9, 10, or 13, wherein the number of digits representing an output signal of said addition means or said first weighing means is truncated a given number of positions from the low-order digit so that said weighing means or said first weighing means can output an approximate value of a sum found.

20. A weighted average circuit as in claim 19, wherein value rounding-down is carried out if the first position of said truncated digits has a value of logical "0" while rounding-up is carried out if the first position of said truncated digits has a value of logical "1", and further wherein said integer i is 2.

21. A weighted average circuit as in claim 19, wherein said weights of said weighing means or said first weighing means, when arranged in order of magnitude, form a geometrical progression of a common ratio of 1/2 except for the last term of said geometrical progression and said last term has a value equal to that of a term next thereto, and further wherein said integer i is 2.

22. A weighted average circuit as in claim 19, wherein said weighing means or said first weighing means comprises:

(a) a first partial addition circuit which sums j signals which are input signals to said weighing means or said first weighing means and outputs a sum in the form of two binary signals, and (b) a second partial addition circuit which sums said two binary signals from said first partial addition circuit and outputs a sum in the form of one binary signal, said binary signal of said second partial addition circuit being an output of said weighing means or said first weighing means, said first partial addition circuit being formed by connecting a plurality of carry retention adders in multilevel series, and said second partial addition circuit comprising:

(i) a first carry propagation adder which sums least significant bits to intermediate bits of said two binary signals from said first partial addition circuit and outputs a sum as well as a carry result generated by the addition of said intermediate bits, (ii) a second carry propagation adder which, if said carry result="0", sums the remaining bits of said two binary signals and outputs a sum, (iii) a third carry propagation adder which, if said carry result="1", sums the remaining bits of said two binary signals and outputs a sum, and (iv) sixth selection means which selects an output given by said second carry propagation adder if said carry result="0" while on the other and said sixth selection means selects an output given by said third carry propagation adder if said carry result="1", wherein said integer i is 2, and further wherein the number of digits representing an output signal of said weighing means or said first weighing means is truncated a given number of positions from the low-order digit so that said weighing means or said first weighing means can output an approximate value of a sum.

23. A weighted average circuit as in claims 8, 9, 10, or 13, wherein said integer i is 2.

24. A weighted average circuit as in claim 19, wherein said weights of said addition means or said first addition means, when arranged in order of magnitude, form a geometrical progression of a common ratio of 1/2 except for the last term of said geometrical progression and said last term has a value equal to that of a term next thereto.

25. A weighted average circuit as in claim 23, wherein said weighing means or said first weighing means comprises:

(a) a first partial addition circuit which sums j signals which are input signals to said addition means or said first addition means and outputs a sum in the form of two binary signals, and (b) a second partial addition circuit which sums said two binary signals from said first partial addition circuit and outputs a sum in the form of one binary signal, said binary signal of said second partial addition circuit being an output of said addition means or said first addition means, said first partial addition circuit being formed by connecting a plurality of carry retention adders in multilevel series, and said second partial addition circuit comprising:

(i) a first carry propagation adder which sums least significant bits to intermediate bits of said two binary signals from said first partial addition circuit and outputs a sum as well as a carry result generated by the addition of said intermediate bits, (ii) a second carry propagation adder which, if said carry result="0", sums the remaining bits of said two binary signals and outputs a sum, (iii) a third carry propagation adder which, if said carry result="1", sums the remaining bits of said two binary signals and outputs a sum, and (iv) sixth selection means which selects an output given by said second carry propagation adder if said carry result="0" while on the other and said sixth selection means selects an output given by said third carry propagation adder if said carry result="1".

26. A weighted average circuit as in claims 8, 9, 10, or 13, wherein the number of digits representing an output signal of said addition means or said first addition means is truncated a given number of positions from the low-order digit so that said addition means or said first addition means can output an approximate value of a sum found, and further wherein said integer i is 2.

27. A weighted average circuit as in claims 8, 9, 10, or 13, wherein:

(a) each selection means receives a selection control signal so as to select one from among a plurality of signals according to said received selection control signal, (b) said control means is formed by a decoder to which a sign for blend ratio description is applied, and (c) said decoder generates, according to said input sign, said selection control signal and outputs said selection control signal to each selection means.

* * * * *

UNITED STATES PATENT AND TRADEMARK OFFICE
CERTIFICATE OF CORRECTION

PATENT NO. : 5,625,764
DATED : April 29, 1997
INVENTOR(S) : TSUJIMOTO et al.

It is certified that error appears in the above-identified patent and that said Letters Patent is hereby corrected as shown below:

Col. 44, line 58: Before "digital" insert --m--

Signed and Sealed this

Twenty-third Day of March, 1999

Attest:

Q. TODD DICKINSON

*Attesting Officer*  *Acting Commissioner of Patents and Trademarks*